US006285823B1

(12) United States Patent
Saeki et al.

(10) Patent No.: US 6,285,823 B1
(45) Date of Patent: Sep. 4, 2001

(54) MACHINE-READABLE DATA MEDIUM HAVING INTERACTIVE REPRODUCTION PROCEDURES WITH MENU RESTORATION AFTER BRANCHING, A REPRODUCTION APPARATUS AND METHOD OF RESTORING A MENU

(75) Inventors: Shinichi Saeki, Sakai; Kazuhiro Tsuga, Takarazuka; Kazuhiko Yamauchi; Masayuki Kozuka, both of Neyagawa; Kaoru Murase, Nara-ken, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/412,271

(22) Filed: Oct. 5, 1999

Related U.S. Application Data

(62) Division of application No. 08/826,198, filed on Mar. 27, 1997, now Pat. No. 6,067,400.

(30) Foreign Application Priority Data

Mar. 29, 1996  (JP) ..................................... 8-076124

(51) Int. Cl.[7] ....................................................... H04N 5/76
(52) U.S. Cl. .............................. 386/95; 386/125; 386/126
(58) Field of Search ................................... 386/46, 95, 98, 386/111, 112, 125, 126, 82, 96, 104; H04N 5/76

(56) References Cited

U.S. PATENT DOCUMENTS

| | | |
|---|---|---|
| 4,953,035 | 8/1990 | Yoshio . |
| 5,400,077 | 3/1995 | Cookson et al. . |
| 5,432,767 | 7/1995 | Utsumi et al. . |
| 5,479,268 | 12/1995 | Young et al. . |
| 5,613,109 | 3/1997 | Yamauchi et al. . |
| 5,701,385 | * 12/1997 | Katsuyama et al. .................. 386/125 |
| 5,793,872 | 8/1998 | Hirayama et al. ...................... 386/95 |
| 5,819,004 | 10/1998 | Azadegan et al. .................... 386/112 |
| 5,963,704 | 10/1999 | Mimura et al. ......................... 386/95 |

FOREIGN PATENT DOCUMENTS

| | | |
|---|---|---|
| 607904 | 7/1994 | (EP) . |
| 687109 | 12/1995 | (EP) . |
| 738078 | 10/1996 | (EP) . |
| 746162 | 12/1996 | (EP) . |
| 5307373 | 11/1993 | (JP) . |
| 8140033 | 5/1996 | (JP) . |
| 8339663 | 12/1996 | (JP) . |
| 247360 | 5/1995 | (TW) . |
| 9512276 | 5/1995 | (WO) . |

* cited by examiner

*Primary Examiner*—Huy Nguyen
(74) *Attorney, Agent, or Firm*—Price and Gess

(57) ABSTRACT

A multimedia optical disc comprising a data area for storing at least one object that has sub-picture data and moving picture data, wherein the data area includes a plurality of small areas, each of which includes a first sub-area and a second sub-area, with the object in the data area being storeed over consecutive small areas; the first sub-area stores the moving picture data having a certain time period and the sub-picture data being reproduced at the same timing as the moving picture data, the sub-picture data being a menu image which, includes a plurality of buttons for showing menu items for display; and the second sub-area stores control information including button control data for responding to a user's operation applied onto a menu image reproduced in the first sub-area in the same small area and auxiliary control data for substituting the user's operation applied onto the menu.

8 Claims, 36 Drawing Sheets

Fig. 1 PRIOR ART

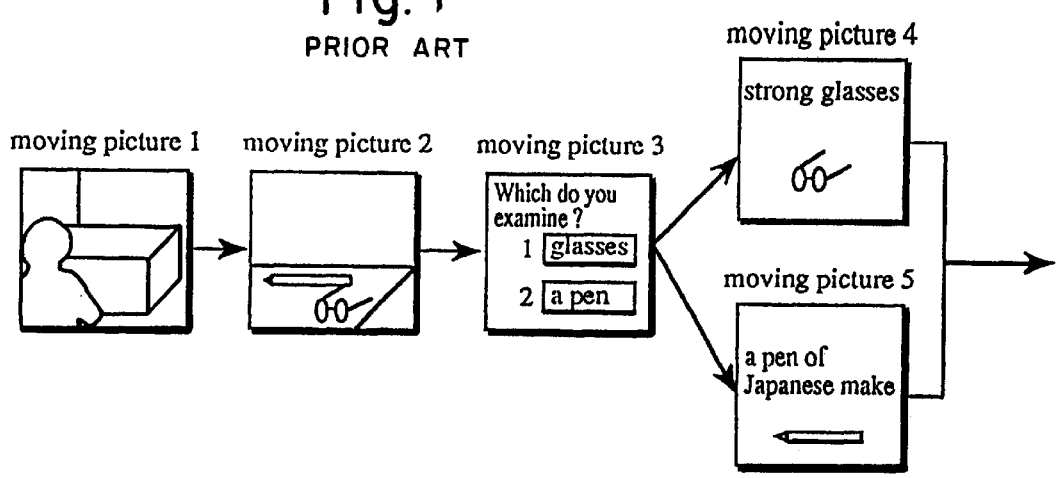

Fig. 2 PRIOR ART

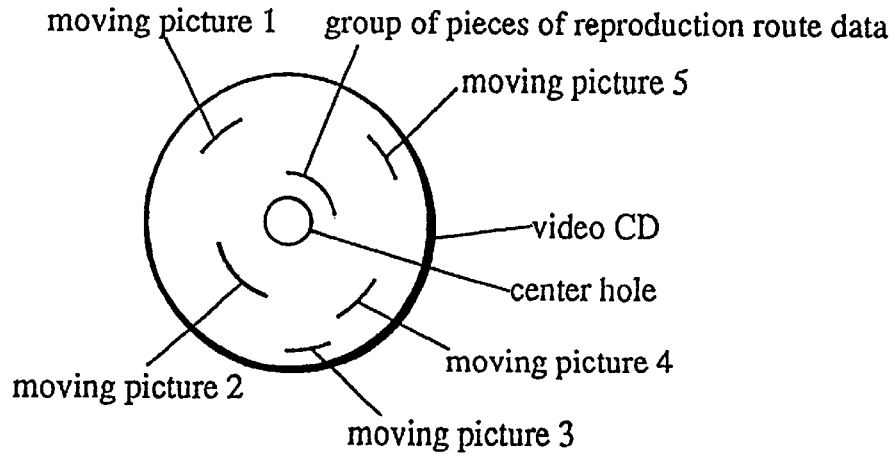

Fig. 3 PRIOR ART group of pieces of reproduction route data

|  | route type | route data |
|---|---|---|
| reproduction route data 1 | consecutive reproduction | reproduce moving picture 1, then moving picture 2, and go to reproduction route data 2 |
| reproduction route data 2 | branch reproduction | reproduce moving picture 3 (menu)<br>go to reproduction route data 3 if (a) is selected<br>go to reproduction route data 4 if (b) is selected |
| reproduction route data 3 | consecutive reproduction | reproduce moving picture 4, and go to reproduction route data n |
| reproduction route data 4 | consecutive reproduction | reproduce moving picture 5, then moving picture k, and go to reproduction route data j |
| ⋮ | ⋮ | ⋮ |

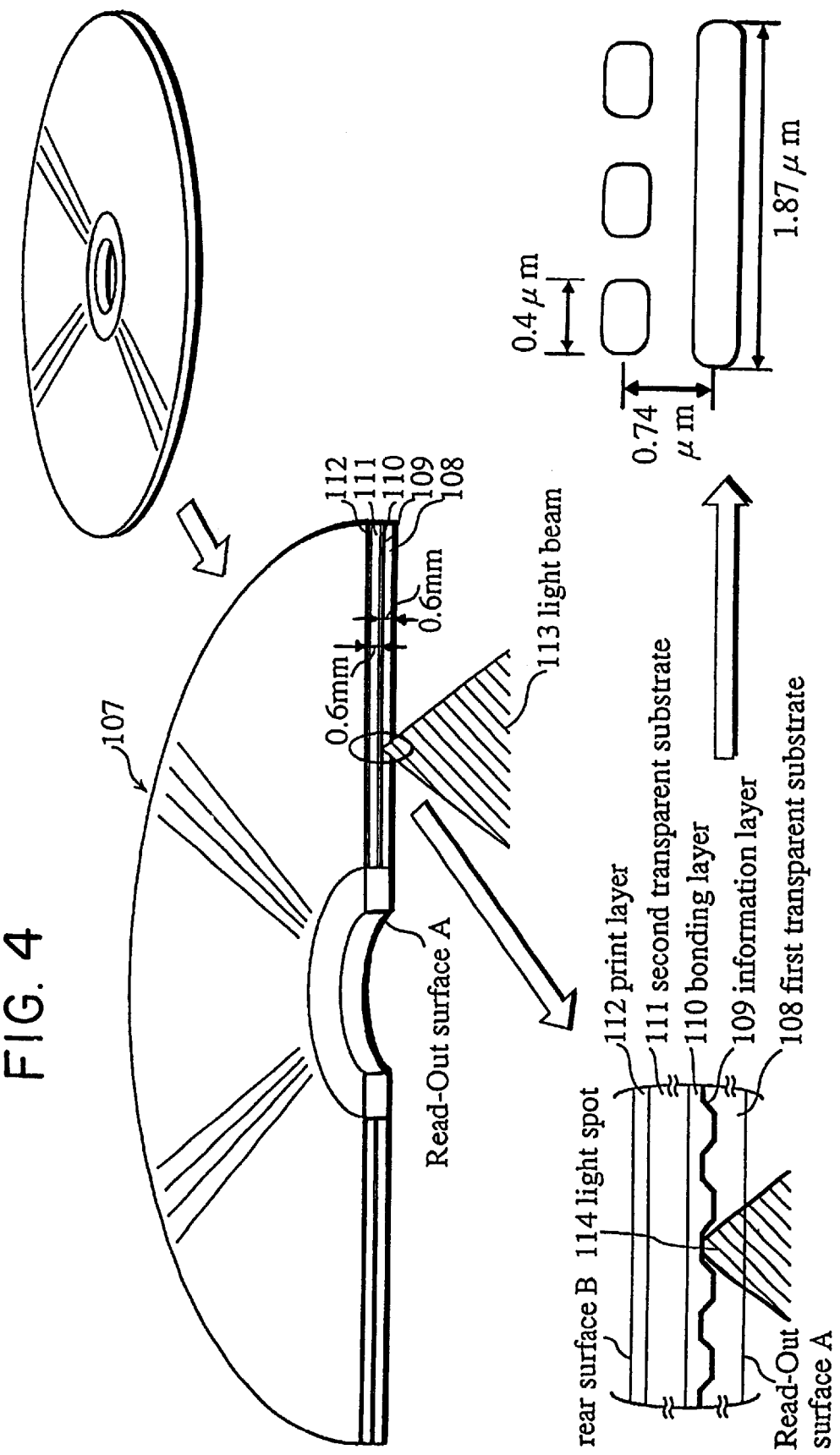

Fig. 15

| operation code | operand | outline |
|---|---|---|
| Link | branch destination program chain number | branch to the designated program chain |
| CmpReg Link | register number, integer, branch condition, branch destination PGC number | branch to the PGC only when the register value satisfies the branch condition for the integer |
| SetReg Link | register number, integer, , branch destination PGC number | branch to the PGC after storing the value obtained from operating the register value and the integer into the register |
| SetReg | register number, integer, , | store the operation-performed register number and integer into the register |
| Random | register number, integer | generate an integral random number from 1 to the integer value to be stored into the register |

Fig. 23

Button State Transfer Table

| highlight information / current state | arrow key transfer information ← | arrow key transfer information → | arrow key transfer information ↑ | arrow key transfer information ↓ | highlight display information | numeral key allowance | selected = determined | button color number | button command |
|---|---|---|---|---|---|---|---|---|---|
| S1 : button 1 in selected state | S2 | S2 | no | S3 | highlight area 1 | yes | no | 1 | Link PGC #4 |
| S2 : button 2 in selected state | S1 | S1 | no | S4 | highlight area 2 | yes | no | 1 | Link PGC #5 |
| S3 : button 3 in selected state | S4 | S4 | S1 | S5 | highlight area 3 | yes | no | 1 | Link PGC #6 |
| S4 : button 4 in selected state | S3 | S3 | S2 | no | highlight area 4 | yes | no | 1 | Link PGC #7 |
| S5 : button 5 in selected state | no | no | no | no | highlight area 5 | no | yes | 2 | Link PGC #3 |

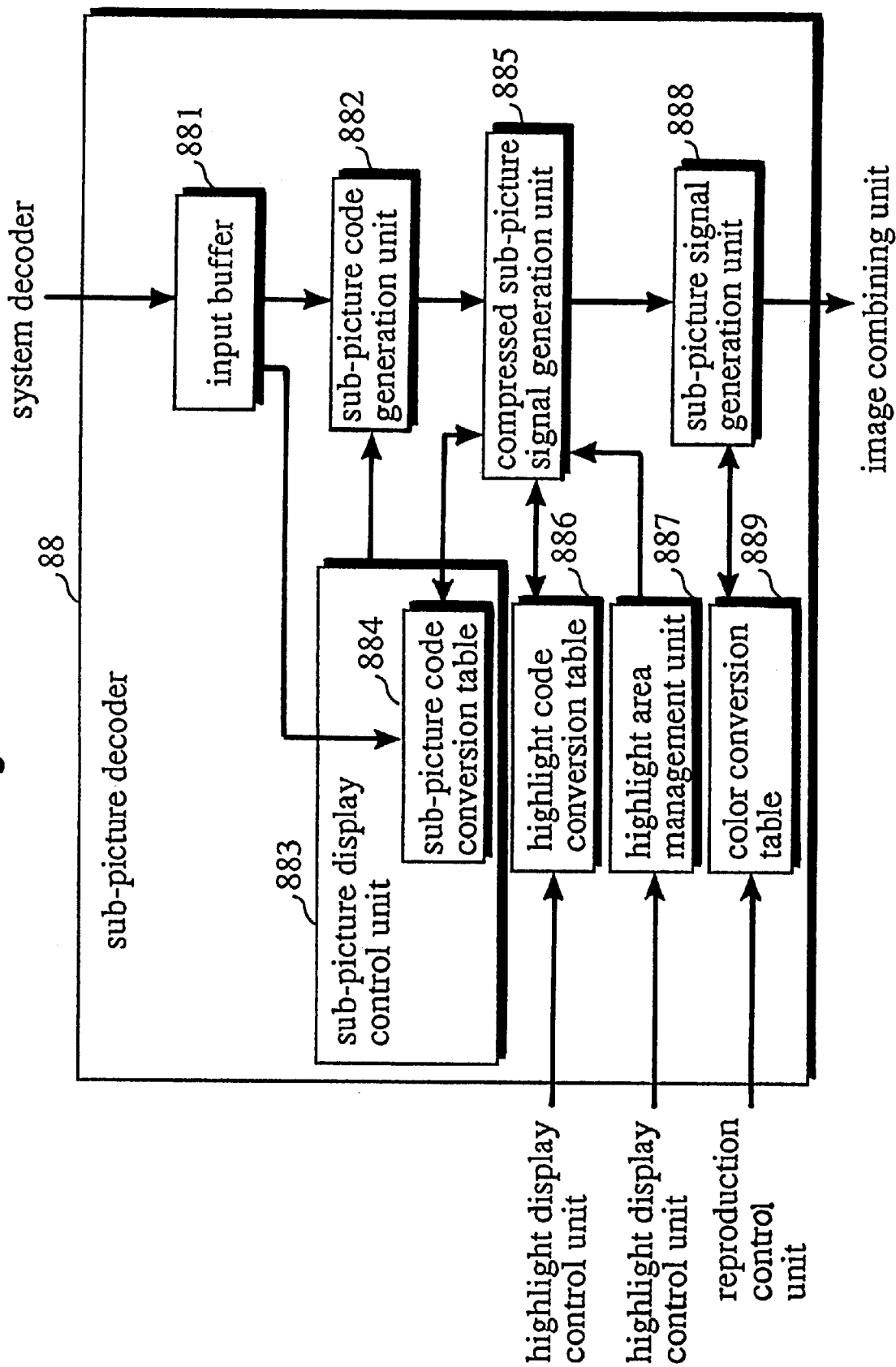

MACHINE-READABLE DATA MEDIUM HAVING INTERACTIVE REPRODUCTION PROCEDURES WITH MENU RESTORATION AFTER BRANCHING, A REPRODUCTION APPARATUS AND METHOD OF RESTORING A MENU

RELATED APPLICATIONS

This application is a divisional of U.S. Ser. No. 08/826,198 filed on Mar. 27, 1997, U.S. Pat. No. 6,067,400.

BACKGROUND OF THE INVENTION (1). Field of the Invention

The present invention relates to an optical disc which stores multimedia data, a reproduction apparatus, and a reproduction method for reproducing such an optical disc; among them all, especially, to improving reproduction function in the interactive application.

(2) Description of the Related Art

Laser discs and video CDs are well known as optical information storage media and the reproduction apparatus for audio information and moving picture information.

Laser discs are optical discs with a diameter of about 30 cm storing analogue moving picture data of about an hour. They have been often utilized as storage media for movies and music videos. However, their size is not necessarily optimal in terms of transportation or storage, there has been an increasing demand for more compact storage media.

A video CD was realized by tailoring an audio compact disc as follows: a large amount of moving picture images were stored onto the compact disc with a diameter of 12 cm by MPEG (Moving Picture Expert Group) system. Even though, a compact disc size was realized, resolution of the moving pictures was only about 352*240.

Interactive Application

Recently, there is an increasing demand for new storage media capable of storing high-quality movie applications and also can be used in the field of "interactive application". Here, the "interactive application" has a plurality of reproduction routes and allows the user to control the direction that the application takes. Some of the examples are: an aerobics software for self-exercise; and a guide video of an overseas travel. Among them all, what is notable is that certain applications which are called "interactive movies" have been developed, which can be distinguished from the conventional movies for the interactive functions. In interactive movies, a plurality of stories are stored in parallel. Users determine the direction in the course of the story at times so that they can get the feel of reality and excitement. Here is an example of a story about a dragon and a warrior. A dragon suddenly appears in front of the warrior and a menu is displayed as follow. Option 1: Get Away. Option 2: Fight. In this way, the direction of the story is determined. Reproduction of the story keeps going, branching to the screen images which corresponds to the user's option.

Control of the Interactive Application

A conventional interactive application in the case of video CD can be explained as follows by means of FIGS. 1–3. Here is an example of a multistory-detective story (multistory means that there are several possible direction of the story).

FIG. 1 shows moving pictures 1–5 of the detective story, which are arranged according to the order of reproduction. In moving picture 1, a detective enters a room. In moving picture 2, a pen and glasses on a desk is zoomed in for close-ups. In moving picture 3, a menu is displayed, asking the user to select either "1: glasses" and "2: a pen". In moving picture 4, glasses are zoomed in for close-ups according to the selection of "1: glasses". In moving picture 5, a pen is zoomed in for close-ups according to the selection of "2: a pen".

FIG. 2 is an example showing how the respective digital data of moving picturers 1–5 is stored on the video CD. Aside from the digital data, the video CD stores a plurality of reproduction route data which controls the order of reproduction of moving pictures 1–5. Digital data for one moving picture is stored in a series of areas. However, the respective digital data should not necessarily be stored in a series of areas. They can be stored on different areas of a disc as shown in FIG. 2.

FIG. 3 shows a plurality of reproduction route data stored on the video CD. There are two types of reproduction route data: one is giving reproduction order to a plurality of moving picture data; and the other is to switch branch destination as the reproduction proceeds.

The former type is called a "play list", in which the reproduction order of the moving pictures is designated. Also, the play list includes a piece of link information which designates the next reproduction route after the reproduction of the designated moving picture ends.

The latter type is called a "selection list". The selection list includes a plurality of reproduction routes as branch target candidates and a menu address. The menu address is a record address for a menu image that provides a plurality of branch targets. The menu image includes a plurality of items whose identification numbers correspond to identifiers of reproduction routes as the branch targets.

In FIG. 3, reproduction route data 1, 3, and 4 are play lists, and reproduction route data 2 is a selection list. The identification number of each menu item corresponds to the numeral key on the remote control panel. When the user presses a numeral key, branch occurs to the corresponding destination.

How the video CD in FIG. 2 is reproduced by its reproduction apparatus can be explained as follows.

When designated to start the reproduction, the reproduction apparatus reads the leading reproduction route data 1 from the optical disc, and stores it into an internal memory. According to the reproduction order of the moving picture designated by the reproduction route data 1, the reproduction apparatus determines the moving picture to be reproduced. After that, the reproduction apparatus moves a pickup to the position designated by the record address of the moving picture, and reads the digital data of the moving picture from the optical disc. The reproduction apparatus converts the digital data into a picture output signal and an audio output signal through a certain signal process, then outputs the signals to the display end speaker.

After the above processing, the scene of moving picture 1 is reproduced for a few seconds: a detective is entering a room in which a desk is placed. When the reproduction of moving picture 1 ends, reproduction of moving picture 2 starts. The desk is zoomed in for close-ups and the pen and glasses are displayed for a few seconds. When all motion pictures stored in the reproduction route data are reproduced, by referring to the link information of reproduction route data 1, the reproduction apparatus reads the next reproduction route data through the pickup. The reproduction apparatus, then, discards the reproduction route 1 and optically reads the next reproduction data into the internal memory. In the case of the present example, instead of the reproduction route data 1, the reproduction route data 2 is stored into the memory. In the present example, as the newly stored reproduction route data 2 is a selection list, a menu which displays a plurality of branch destinations is displayed. In this case, moving picture 3 is displayed, allowing users to select "1: glasses" or "2: pen".

When the user presses a numeral key on a remote controller corresponding to the item in the menu, the reproduction apparatus determines reproduction route data which is the branch target corresponding to the numeral. After that, the reproduction apparatus discards the reproduction route 2 and optically reads the determined reproduction data into the internal memory. In the present example, the reproduction route data 3 is read into a memory if the user selects item "1;"; and reproduction route data 4 if the user selects item "2". The reproduction apparatus continues the reproduction according to the new reproduction route data stored in the memory. If the reproduction route data 3 is stored in the memory, moving picture 4, an image of close-up glasses, is reproduced. If the reproduction route data 4 is stored in the memory, moving picture 5, an image of close-up pen, is reproduced.

When the reproduction apparatus continues the above mentioned operations to the optical disc, moving pictures are reproduced, with the route being changed according to the user's selection of the menu item. As the user can control the direction of the interactive software in a various way, he/she can get the feel of being the detective in the story. The Task That the Present Invention is going to Solve However, the interactive application mentioned above has the following shortcomings.

(1) Response in Interaction

In order to realize a branch of a video CD, the optical pickup alternatively has to read the moving pictures and the reproduction route data: e.g. moving picture 2, reproduction route data 2, moving picture 3, reproduction route data 3 or 4, moving picture 4 or 5. Switching the readout of the moving picture and reproduction route data entails a seek operation of the pickup, which causes interruption in the course of reproduction of the program. Especially, if the branch should occur many times, the response of the interactive reproduction deteriorates greatly, which makes the interactive application less appealing to the user.

As mentioned above, it has been difficult to realize a responsive interactive application so that a smooth reproduction of the program is kept going.

(2) A Menu

If the user does not designate the selection item on the menu screen (branch point of the reproduction), it creates a pause in the course of reproduction. In the case of the foregoing story of the dragon and the sword, the moment the dragon appears above the horizon, a menu of "Get Away" and "Fight" is displayed. Here, if the user has some hesitation to determine which course to take, the reproduction is paused. Like this, according to the conventional interactive software, normal reproduction was not realized unless the user gets devoted to the pursuit of the story or he/she immediatly selected the direction of the story at the branch point.

SUMMARY OF THE INVENTION

It is an object of the present invention to provide a multimedia optical disc and a reproduction apparatus for a disc which can achieve a highly-responsive, highly-interactive, and efficient reproduction of an application using a simplified menu operation by the user. In other words, smooth reproduction of the application keeps going by the user's simple and proper operation depending on the contents of the application when a branch should occur.

It is another object of the present invention to provide a multimedia optical disc and a reproduction apparatus for the disc which realize the best operation that satisfies the user's preference or wish depending on the contents of the story or the scenes at the points of branching.

The objects can be achieved by the optical disc characterized by the following constructions.

(1) A multimedia optical disc comprising a data area for storing at least one object that has sub-picture data and moving picture data, wherein the data area includes a plurality of small areas, each of which includes a first sub-area and a second sub-area, with the object in the data area being stored over consecutive small areas; the first sub-area stores the moving picture data having a certain time period and the sub-picture data being reproduced at the same timing as the moving picture data, the sub-picture data being a menu image which includes a plurality of buttons for showing menu items for display; and the second sub-area stores control information including button control data for responding to a user's operation applied onto a menu image reproduced in the first sub-area in the same small area and auxiliary control data for substituting the user's operation applied onto the menu.

According to the above construction, as the video object comprises the sub-picture data for showing the menu including a plurality of buttons, the button control data and the auxiliary control data by the small area, high responsiveness and excellent interactiveness can be realized by the unit of small area. Also, efficiency of reproducing the interactive application improves as the auxiliary control data can substitute for the user's operation by the unit of small area.

(2) The button control data may include a selection color for coloring one of the buttons in a selected state, an activation color for coloring one of the buttons in an activated state, and a command for each button, the command being executed when the button is placed into an activated state; and the auxiliary control data may include an end time of the user's operations applied onto the menu and forcedly activating button information showing a button which should be forcedly placed into the activated state at the end time.

According to the above construction, even if the button is not activated by the user's operation at the point of branching during reproduction, the reproduction of the application keeps going in accordance with the intention of the application creator due to the forcedly activated button information. Then, even if the user is not used to an interactive application, the reproduction continues automatically. Moreover, the reproduction apparatus can reproduce the application as an interactive movie or an ordinary movie according to the user's wish.

(3) The forcedly activated button information may designate at least one of a button having a specific button number as a forcedly activated button and a button in the selected state at the end time.

(4) The button control data may include a selection color for coloring one of the buttons in a selected state, an activation color for coloring one of the buttons in an activated state, and a command for each button, the command being executed when the button is placed into an activated state; and the auxiliary control data may include automatic activation button information for specifying which button should be forcedly placed into an activated state when a user's operation for placing the button into the selected state is applied.

According to the above constructions, by setting the automatic activation button, it is possible to reduce the two-fold operations comprising selection and activation into a single operation. This is especially effective for the menu used when responsiveness is demanded.

(5) The auxiliary control data may include prohibition information which shows which buttons should not be inputted with the numeral key by the user; the prohibition information may be a threshold; and input with the numeral key by the user may be prohibited regarding the buttons having a greater button number than the threshold.

According to the above construction, by setting two types of buttons, one of which can be selected by numerals and the other which cannot, misoperations by the user can be prevented. Moreover, numeral keys and arrow keys can be jointly used depending on the story and scene at the points of branching.

(6) The sub-picture data in the first sub-areas in a given section of an object may constitute one still-image to be superimposed with the moving picture data; and the auxiliary control data may include address information which shows storage position of the first small area in the given section in order to return to the original data after branch to another object occurred.

According to the above construction, when a still image like a menu image is stored by the leading sub-picture data in a given section and the still image is still being reproduced in the small area afterwards, it is possible to resume the reproduction from the original sub-picture data after temporarily calling other video data.

The foregoing objects can be achieved by the reproduction apparatus characterized by the following constructions.

(7) A reproduction apparatus for reproducing a multimedia optical disc comprising a data area for storing a plurality of objects, each having sub-picture data and moving picture data, wherein the data area may include a plurality of small areas, each of which includes a first sub-area and a second sub-area, with the object in the data area being stored over consecutive small areas; the first sub-area may store the moving picture data having a given time period and the sub-picture data being reproduced at the same timing as the moving picture data, the sub-picture data being a menu image which includes a plurality of buttons for showing menu items for display; and the second sub-area may store control information including button control data for responding to a user's operation applied onto a menu image reproduced in the first sub-area in the same small area and auxiliary control data for substituting the user's operation applied onto the menu, the reproduction apparatus comprising: a readout device for reading data on the multimedia optical disc; a reproduction device for reproducing the moving picture data and sub-picture data in the first sub-area read by the readout device and outputting the moving picture data and sub-picture data as a video signal for display; a reception device for receiving a user's operation applied onto the menu by the sub-picture data; a first control device for responding to the user's operation according to the button control data read from the second sub-area by the readout device; and a second control device for substituting for the user's operation according to the auxiliary control data read from the second sub-area by the readout device.

According to the above construction, as the video object comprises the sub-picture data for showing the menu including a plurality of buttons, the button control data and the auxiliary control data by the unit of small area, the first control device achieves highly-responsive, highly-interactive, and excellent reproduction by the small area. Also, efficiency of reproducing the interactive application improves as the second control device can substitute for the user's operation according to the auxiliary control data by the unit of small area.

(8) The forcedly activating device may place the button into the activated state if the forcedly activated button information shows the button number, and may place the button in the selected state into the activated state at the end time if not so.

According to the above construction, even if the button is not activated by the user's operation at the point of branching during reproduction, the timer device and the forcedly activating device reproduce the application in accordance with the intention of the application creator due to the forcedly activated button information. Then, even if the user is not used to an interactive application, the reproduction continues automatically.

(9) The auxiliary control data may include automatic activation button to be information which specifies a button forcedly placed into activated state when the user's operation for placing the button into the activated state is applied, the first control device comprising: a holding device for holding button number, selection color, activation color, command for each button, end time, and forced button number by analyzing control information every time the second sub-area is read by the readout device; a button control device for controlling change of state of each button according to the user's operation received by the reception device; a button display control device for instructing the reproduction device on the selection color and the activation color of the button on the menu image; and an execution device for executing the command of the button placed into the activated state, and the second control device comprising a "selected=activated" device for placing the button placed into the selected state from the non-selected state by the button control device into the activated state.

According to the above construction, by setting an automatic activation button, it is possible to reduce the two-fold operations comprising selection and activation into a single operation.

(10) The auxiliary control data may include prohibition information that shows which buttons should not be inputted with the numeral key by the user, and the second control device comprising a prohibition device which prohibits change to the selected state by the button control means if the numeral key is related to the prohibition by the prohibition information when the user's operation received by the reception device is operating a numeral key.

According to the above construction, by setting two type of buttons, one of which can be selected by numerals and the other which cannot, misoperations by the user can be prevented. Moreover, numeral keys and arrow keys can be jointly used depending on the story and scene at the points of branching.

(11) The sub-picture data in the first sub-areas in a given section of the object may constitute a still image to be superimposed with the moving picture data; and the auxiliary control data may include address information which shows storage position of the first small area in the given section in order to return to the original data after a branch to another object occurred, the first control means comprising: a holding device for holding button number, selection color, activation color, command for each button, end time or set time period, and forced button number by analyzing control information every time the second sub-area is read by the readout device; a button control device for controlling a change of state of each button according to the user's operation received by the reception device; a button display control device for instructing the reproduction device on the selection color and the activation color of the button on the menu image; and an execution device for executing the command of the button placed into the activated state, and the second control means comprising: a detection device for detecting that the user's operation received by the reception device is a designation of a temporary reproduction of another object; a call device for storing the address information and designating the reproduction device to reproduce another object when the reproduction designation is detected; and a resume device for resuming reproduction of the object based on the stored address information after the reproduction of another object is completed.

According to the above construction, when a still image like a menu image is stored by the leading sub-picture data in a given section and the still image is still being reproduced in the small area afterwards, it is possible to resume the reproduction from the original sub-picture data after temporarily calling other video data.

The foregoing objects can be achieved by the reproduction method of the following construction.

(12) A reproduction method for reproducing multimedia data comprising a plurality of objects, each having sub-picture data and moving picture data, wherein the multimedia data may include a plurality of small data, each of which includes a first sub-data and a second sub-data, with the object being constructed over an arrangement of consecutive small data; the first sub-data may include the moving picture data having a given time period and the sub-picture data being reproduced at the same time period as the moving picture data, the sub-picture data being a menu image which may include a plurality of buttons for showing menu items for display; and the second sub-data may include control information including button control data for responding to a user's operation applied onto the menu image reproduced in the first sub-data in the same small area and auxiliary control data for substituting the user's operation applied onto the menu, the reproduction method comprising the steps of: inputting the multimedia data via a data obtaining unit; making a decoder reproduce the moving picture data and sub-picture data in the inputted first sub-data and outputting the moving picture data and sub-picture data as a video signal for display; receiving the user's operation applied onto the menu by the sub-picture data; first controlling the data obtaining unit and the decoder so that the reproduction apparatus responds to the received user's operation according to the button control data in the inputted second sub-data; and second controlling the data obtaining unit and the decoder so that the reproduction apparatus substitutes for a given user's operation according to the auxiliary control data in the inputted second sub-data.

According to the above construction, as the video object comprises the sub-picture data for showing the menu including a plurality of buttons, the button control data and the auxiliary control data by the unit of small area, the first control device realizes high responsiveness and excellent interactiveness by the unit of small area. Also, efficiency in reproducing the interactive application improves as the second control device can substitute for the user's operation according to the auxiliary control data by unit of a small area.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 1 shows moving pictures 1–5 of a detective story, which are arranged according to the order of reproduction in the conventional art;

FIG. 2 is an example showing how the respective digital data of moving picturers 1–5 is stored on the video CD in the conventional art;

FIG. 3 shows a plurality of reproduction route data stored onto the video CD in the conventional art;

FIG. 4 shows an appearance, a cross-section, an enlarged cross section, and pit shapes of the DVD;

FIG. 15 shows concrete examples of instructions used as button commands, each command set for each button;

FIG. 23 is a concrete example of a button state transfer table;

FIG. 24 is a block diagram showing construction of sub-picture image decoder;

DESCRIPTION OF THE PREFERRED EMBODIMENT

Figure 5:
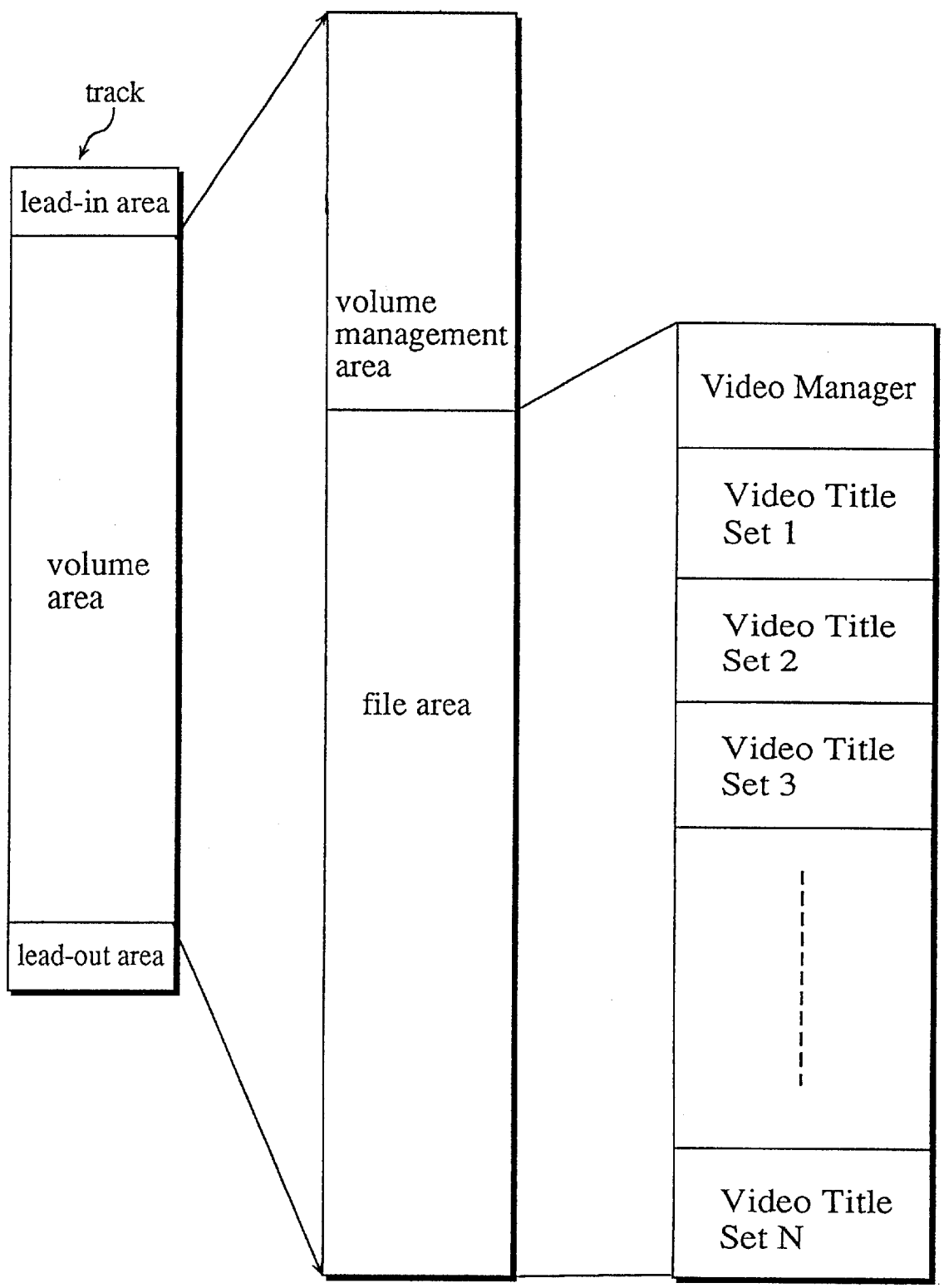
FIG. 5 shows the entire data construction stored onto the DVD.

Physical Construction of the Multimedia Optical Disc

Physical construction of the multimedia optical disc (hereinafter referred to as DVD: Digital Video Disc) of the present embodiment can be explained as follows. FIG. 4 shows an appearance, a cross-section, an enlarged cross-section, and pit shapes of the DVD.

The DVD has a diameter of 120 mm, which is the same size as CDs.

Starting from the bottom, DVD 107 is formed of a first transparent substrate 108 of 0.6 mm in thickness, an information layer 109 which is made of a reflective film like a metal thin film, a binding layer 110, a second transparent substrate 111, and a print layer 112 on which a label is printed.

The print layer 112 is not a requisite for the DVD 107. The second transparent substrate 111 can be unprotected.

The lower surface of the DVD 107 is a read-out surface A: a light beam 113 is shone onto it so that information is reproduced. The upper surface of the DVD 107 is a rear surface B, which is formed by the print layer 112.

As shown in FIG. 4, the surface of the first transparent substrate 108 in contact with the information layer 109 has pits and projections. Information is stored by changing the length and interval of the pits. In other words, the information layer 109 has the pits and projections. The length of a pit ranges from 6.4 $\mu$m to 2.13 $\mu$m. A whole series of pits form a spiral track with a radial distance of 0.74 $\mu$m. Compared to the conventional CDs, the length of pits are shorter and truck pitch is narrower, thereby increasing the storage density.

The read-out surface A is flat. The second transparent substrate is a reinforcer of the same material as the first transparent substrate 108, having 0.6 mm thickness.

The light beam 113 from a light head (not illustrated passes through the read-out surface A and it is focused onto the information surface 109. The point of the focus is then called the light spot 104. As the phase of the reflection of the pit is different from that of the non-pit areas, reflection ratio decreases as a result of the optical interference. As the interference does not occur in the non-pit areas, reflection ratio increases. Due to the change of the reflection ratio, information is reproduced.

The light spot 114 on a DVD has a diameter of around $\frac{1}{1.6}$ times the diameter of a light spot on the foregoing conventional CDs due to the large numerical aperture NA of the objective lens and small wavelength $\theta$ of the light beam.

The DVDs of the physical construction described above can store about 4.7 GB of information on one side, which is almost eight times the storage capacity of the conventional CDs.

Data Construction the DVD

The whole data construction stored on the DVD can be explained as follows.

FIG. 5 shows the entire data construction of the DVD: a spiral track re-formed into a rectangle. As is apparent from this figure, the data is composed of a lead-in area, volume area, and lead-out area arranged from the center to the edge of the disc. The lead-in area stores operation stabilization data which is used when the DVD player starts reading data from the optical disc. The lead-out area informs the reproduction apparatus of the end of reproduction of the data. The volume area stores various data which make up an application: physically speaking, it is composed of a lot of logical blocks (sectors) in the shape of a spiral track on the disc. Each logical block is 2 KB and is identified by its block number (sector address). This logical block size is the minimum read unit of the reproduction apparatus.

The volume area includes a volume management area and a file area.

For the volume management area, blocks that are necessary for management of the entire disc is allocated. Conforming to ISO (International Standards Organization) 13346, the volume management area stores information showing the relation between a plurality of file names and addresses of groups of logical blocks.

The file area stores one Video Manager and at least one Video Title Set. In the present embodiment, the Video Manager and the Video Title Set are treated as one file, respectively, as it is convenient for explanation; actually, they are stored in the consecutive files on the track. The reason can be explained as follows. In the case of storing movies, as the file capacity becomes too large, it is preferable to divide the information into a plurality of consecutive files in order to realize easy management of the reproduction apparatus.

Each Video Title Set stores a Title Set. More specifically, it stores a plurality of video objects (VOBs), each showing fragments of the moving picture, audio, and still picture of an application such as an interactive movie; and reproduction management information. An example of the Title Set is a general term of a movie application in which three versions of the same movie are included, namely, an original cutting version, a theater version, and a TV version. In this case, many VOBs are shared by each of the three version and some VOBs are specific to any of them. The Video Title Sets store both types of VOBs. Due to the large storage capacity of about 4.7 Gbyte, the DVD can store a plurality of Video Title Sets so that a plurality of interactive applications can be stored such as movies and interactive movies.

The Video Manager manages the entire disc: specifically, a plurality of VOBs and reproduction management information are stored. The data construction of the Video Manager is the same as that of the Video Title Set. However, the Video Manager is used for special purposes. Specifically, the Video Manager manages Title Sets of the entire disc. Therefore, the Video Manager stores a VOB/VOBs for system menu for selecting the Title Set desired by the user at the outset of the reproduction or setting/changing reproduction management of the Title Set of the entire volume.

Data Construction of the Video Title Set (Part 1)

Figure 6:
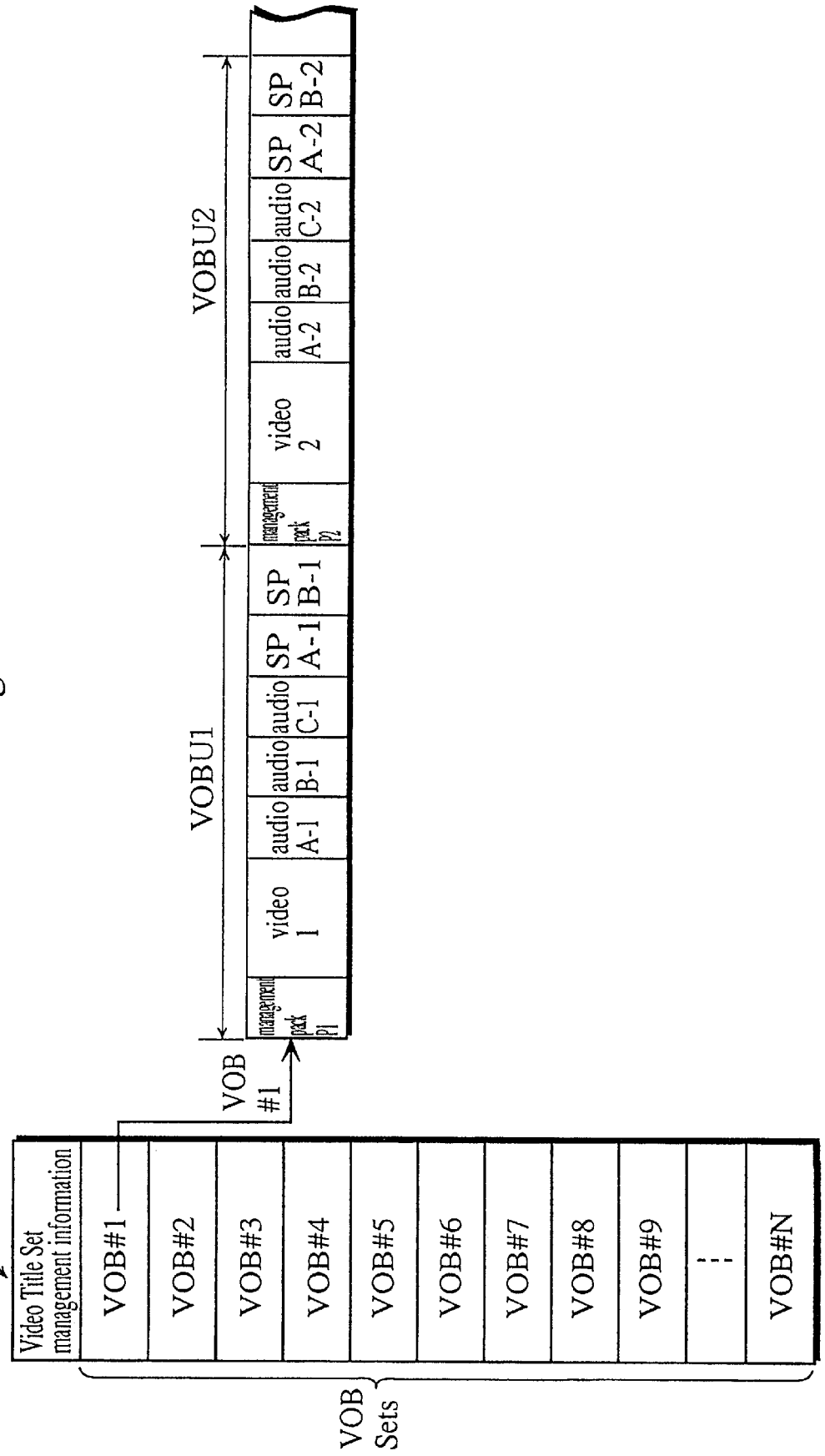
FIG. 6 shows internal construction of each Video Title Set in FIG. 5.

FIG. 6 shows the internal construction of each Video Title Set shown in FIG. 5. The Video Title Set includes a set of Video Objects (VOBs) and the Video Title Set management information that manages the reproduction route of the Video Objects (VOBs).

The VOB set is composed of all VOBs of a Title Set; that is, VOBs shared by a plurality of titles and VOBs specific to some of the titles. Each VOB is composed of the following data which is performed interleaving: moving picture data (video) of a given time unit, which is called GOP (Group of Picture); a plurality of audio data to be reproduced along with the moving picture; a plurality of sub-picture data to be reproduced along with the moving picture; and a management pack for managing all the foregoing data. As shown in FIG. 6, a VOB Unit (hereinafter referred to as VOBU) consists of a management pack, moving picture data which corresponds to the GOP, a sets of audio data, and a sets of sub-picture data. The sets of audio data and the sets of sub-picture data are selectively reproduced by the reproduction apparatus.

A set of audio data "Audio A", "Audio B", and "Audio C" can store different kinds of audio: such as voices of different languages such as Japanese and English; and female voice and male voice.

A set of sub-picture data "SP A", "SP B", are still pictures that are superimposed along with the moving picture. For example, subscripts of different languages can be stored. Other than the subscripts, menus are another important use of the sub-picture data. Therefore, at least a set of the sub-picture data can be used for storing the menu image of an interactive application.

The management pack has 2 KB data. It stores information which manages data of each VOBU. The management pack includes highlight information for managing the button display in the menu image of the sub-picture data and menu operations. Coupled with the menu image by the sub-picture data, this highlight information enhances the user s feeling of interactiveness on a VOBU basis.

Data Construction of VOB

Figure 7:
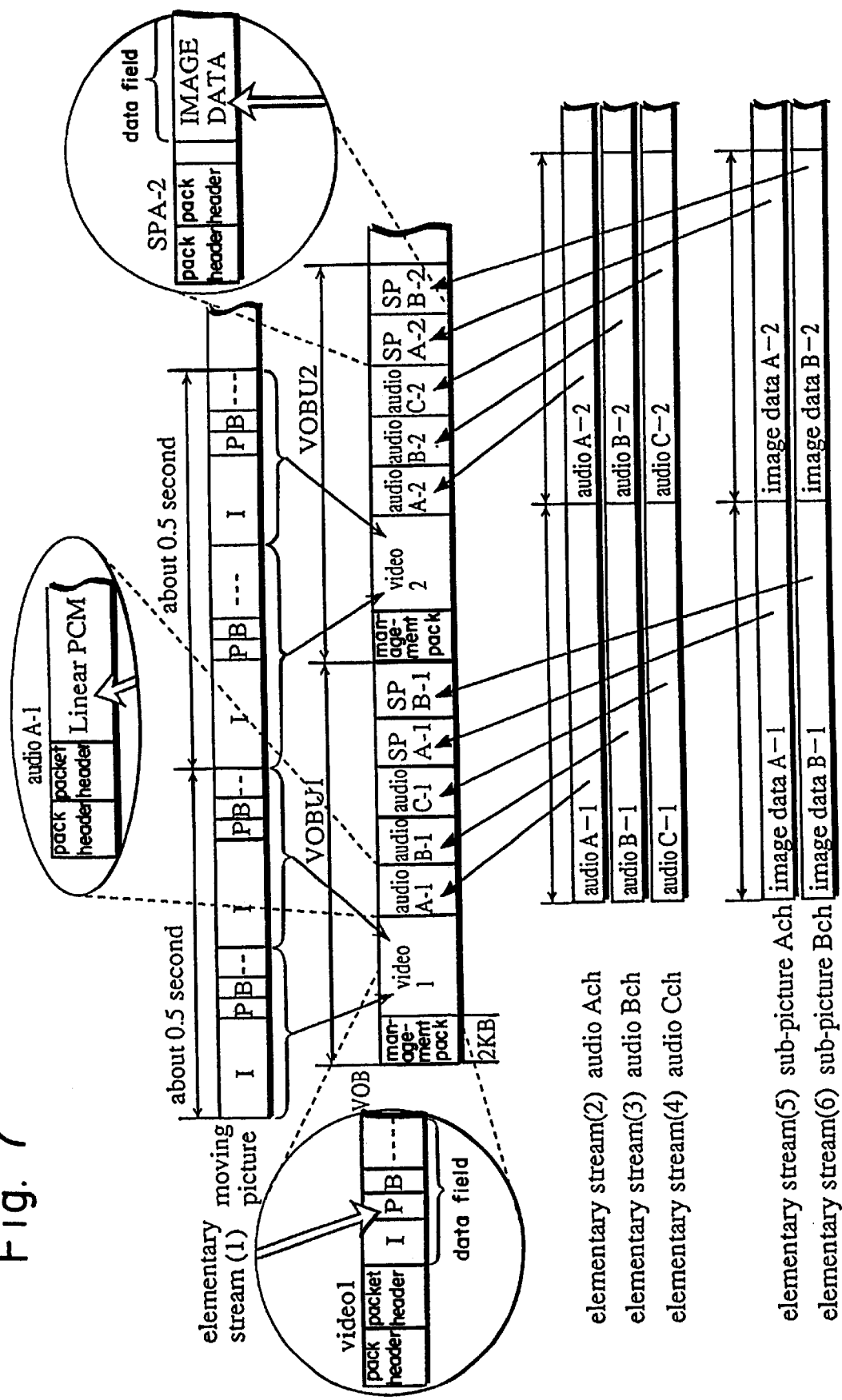
FIG. 7 shows the data construction of the highlight information in a PCI packet.

FIG. 7 shows more detailed data construction of a VOB. It shows how different kinds of material data are multiplexed into a VOB by interleaving.

The elementary streams (1)–(6) are material data to be multiplexed into a VOB.

The elementary stream (1) is a moving data compressed in accordance with MPEG 2, and it is multiplexed into each VOBU on a GOP basis by interleaving. Here, the GOP is a compressed moving picture data of about 0.5 second including at least I picture (Intra picture). A GOP is stored in a VOBU.

The elementary streams (2)–(4) are audio data (audio A–C channels), each corresponding to the moving picture data mentioned above. Part of each audio channel which almost corresponds to the GOP of moving data in terms of time is stored into the same VOBU as the moving picture.

The elementary streams (5)–(6) are sub-picture data (sub-picture A, B channel) corresponding to the above moving data. Part of each sub-picture data corresponding to the GOP of the moving picture data is stored into the same VOBU as the moving picture data.

In the multiplexed VOB, each of "video 1", "audio A-1", "audio B-1", . . . "SP A-1", and "SP B-1" is stored as a collection of 2 KB packs. For example, "video 1" is stored as a collection of packs corresponding to one GOP. The reason of the packing is that the size is the same as the logical block (sector) of 2 KB of DVD and it is the minimum read unit of the reproduction apparatus.

Data Format of Each Pack

The following is more detailed explanation on data format of each pack and management pack that constitute the moving picture data, audio data, and sub-picture data in the VOBU.

Each pack shown in FIGS. 8–11 includes one packet called PES (Packetized Elementary Stream). Each pack consists of a pack header, a packet header, and a data field, having 2 KB. As to the pack header and the packet header, points stipulated by MPEG are omitted here. Only information on identifying types of the pack is explained. According to the present embodiment, in order to identify the audio data, sub-picture data, and management pack, special packets are used. They are stipulated by MPEG 2 as private packets 1 and 2. A private packet is a packet whose contents can be defined in any way. In the present embodiment, the private packet 1 is defined as audio data and sub-picture data; and private packet 2 is defined as a management pack.

Figure 8:
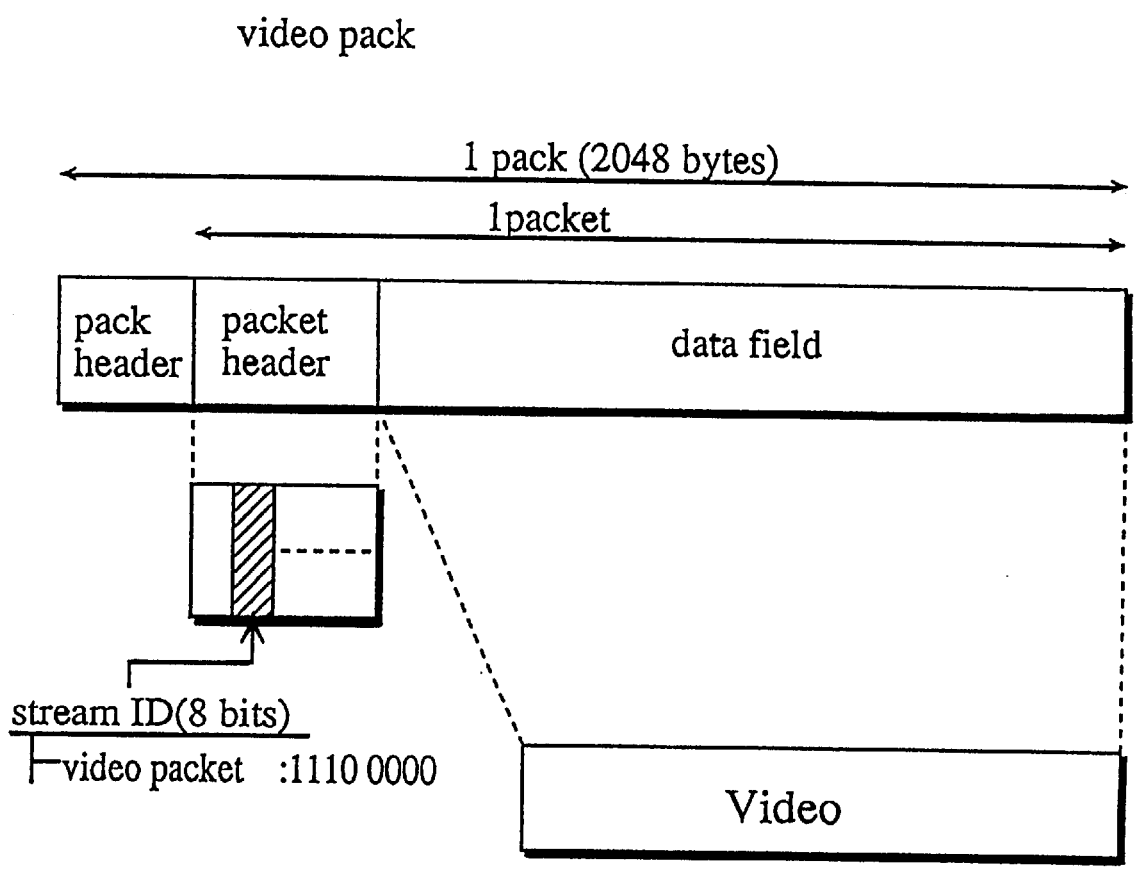
FIG. 8 shows data format of a video pack.

FIG. 8 shows the data format of the pack which will be the constituent of video 1 of FIG. 7 (hereinafter referred to as video pack). The video pack includes a pack header, a packet header, and a data field in which a part of the GOP is written. The stream ID (for example "1110 000") in the packet header is the representation of the video pack.

Figure 9:
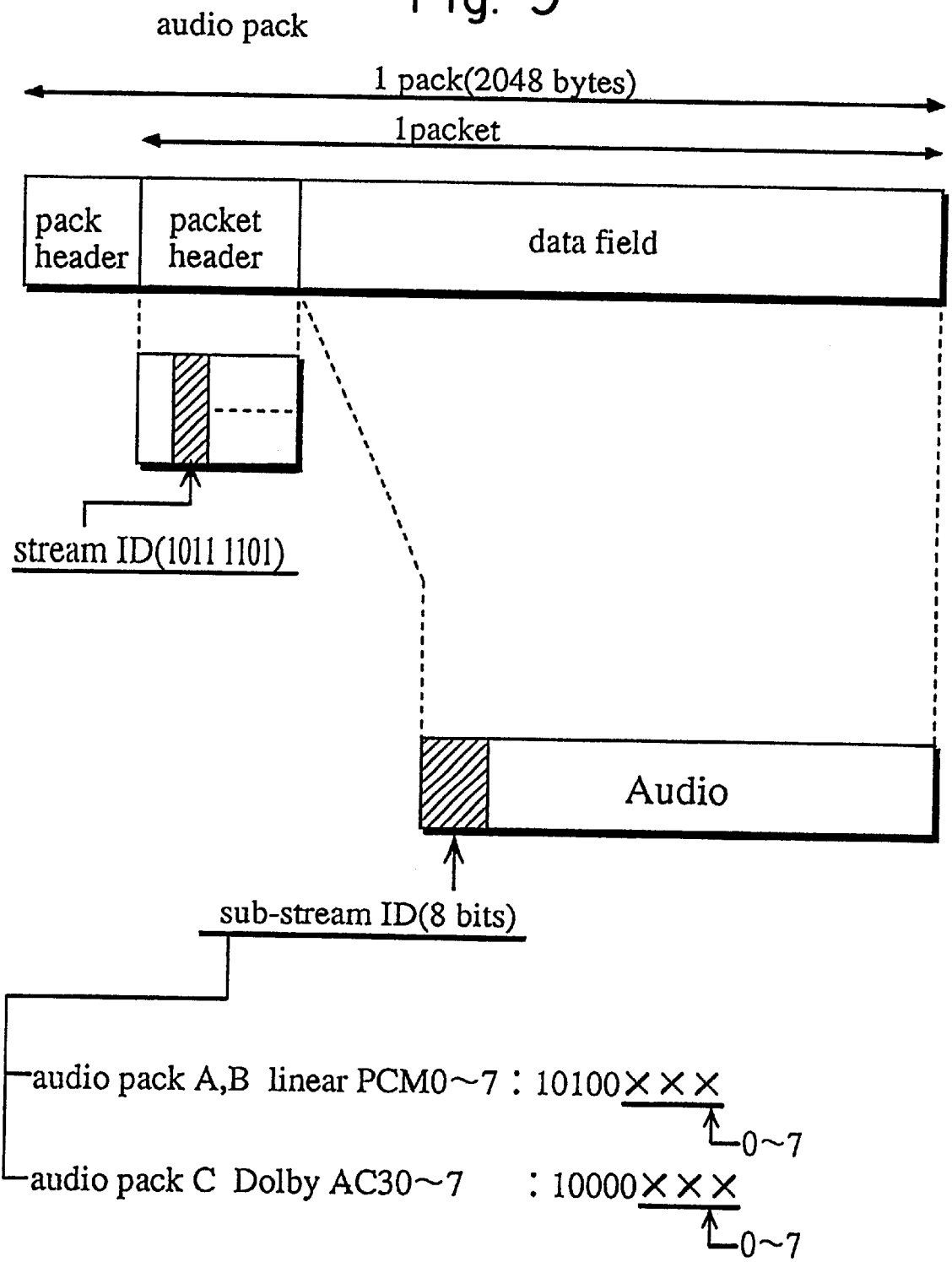
FIG. 9 shows data format of an audio pack.

FIG. 9 shows the data format of the pack which will be the constituent of "audio A-1" in FIG. 7 (hereinafter referred to as audio pack). The audio pack includes a pack header, packet header, and data field in which audio data is written. Stream ID "1011 1111" of the packet header represents the private packet 1. In the sub-stream ID "10100XXX, 1000XXX" in the data field, the upper five bits shows audio data and the coding method, and the lower three bits shows which channel is used.

Figure 10:
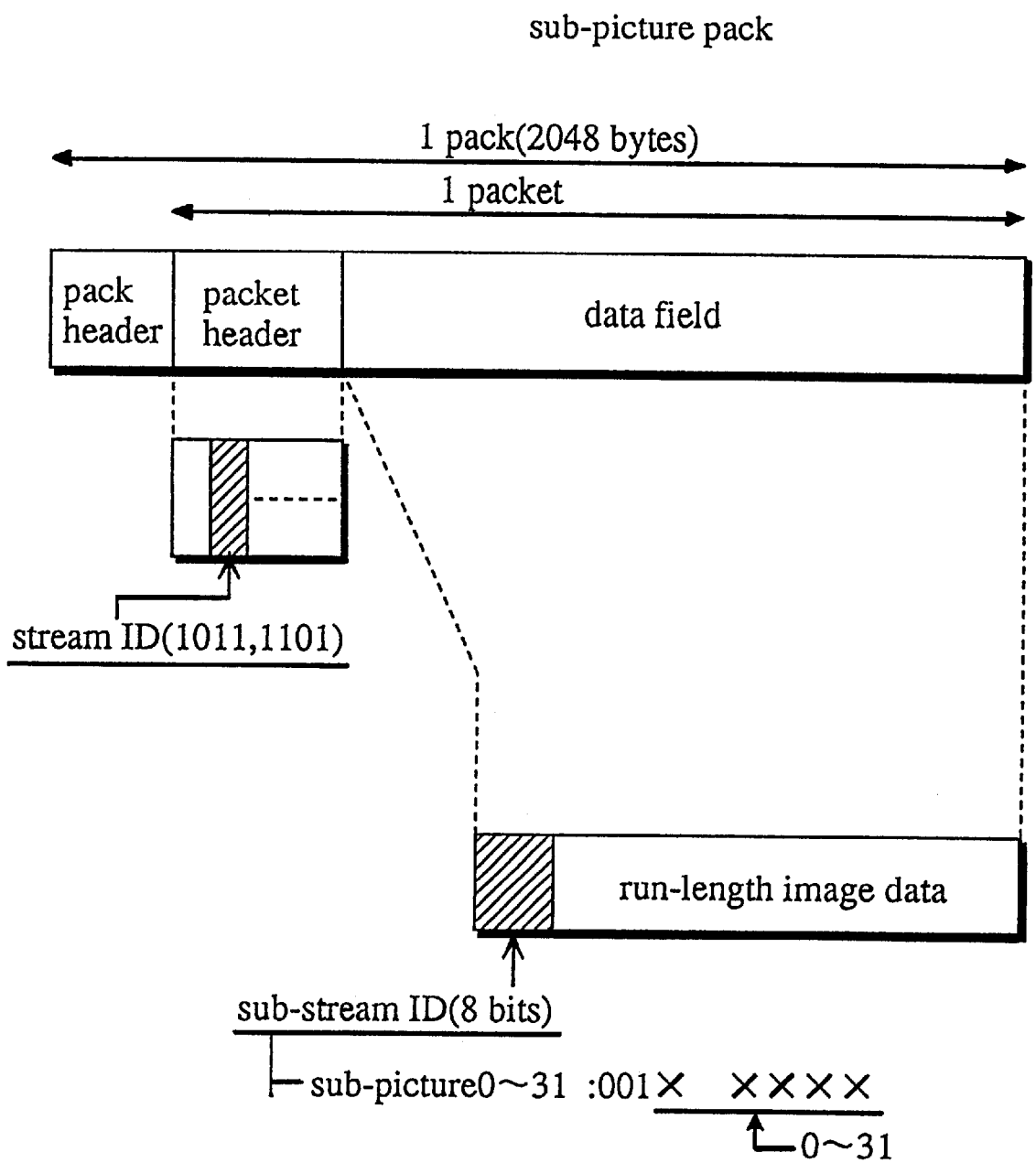
FIG. 10 sows data format of a sub-picture data pack.

FIG. 10 is a data format of the pack which is the constituent of "SP A=1" in FIG. 7 (hereinafter referred to as sub-picture pack). The audio pack consists of the pack header, packet header, and data field in which audio data is written. The stream ID "1011 1101" represents the private packet 1. In the sub-stream ID of the data field "10100XXX, 100XXX", the upper three bits show sub-picture data and coding method, and the lower five bits show which channel is used.

Figure 11:
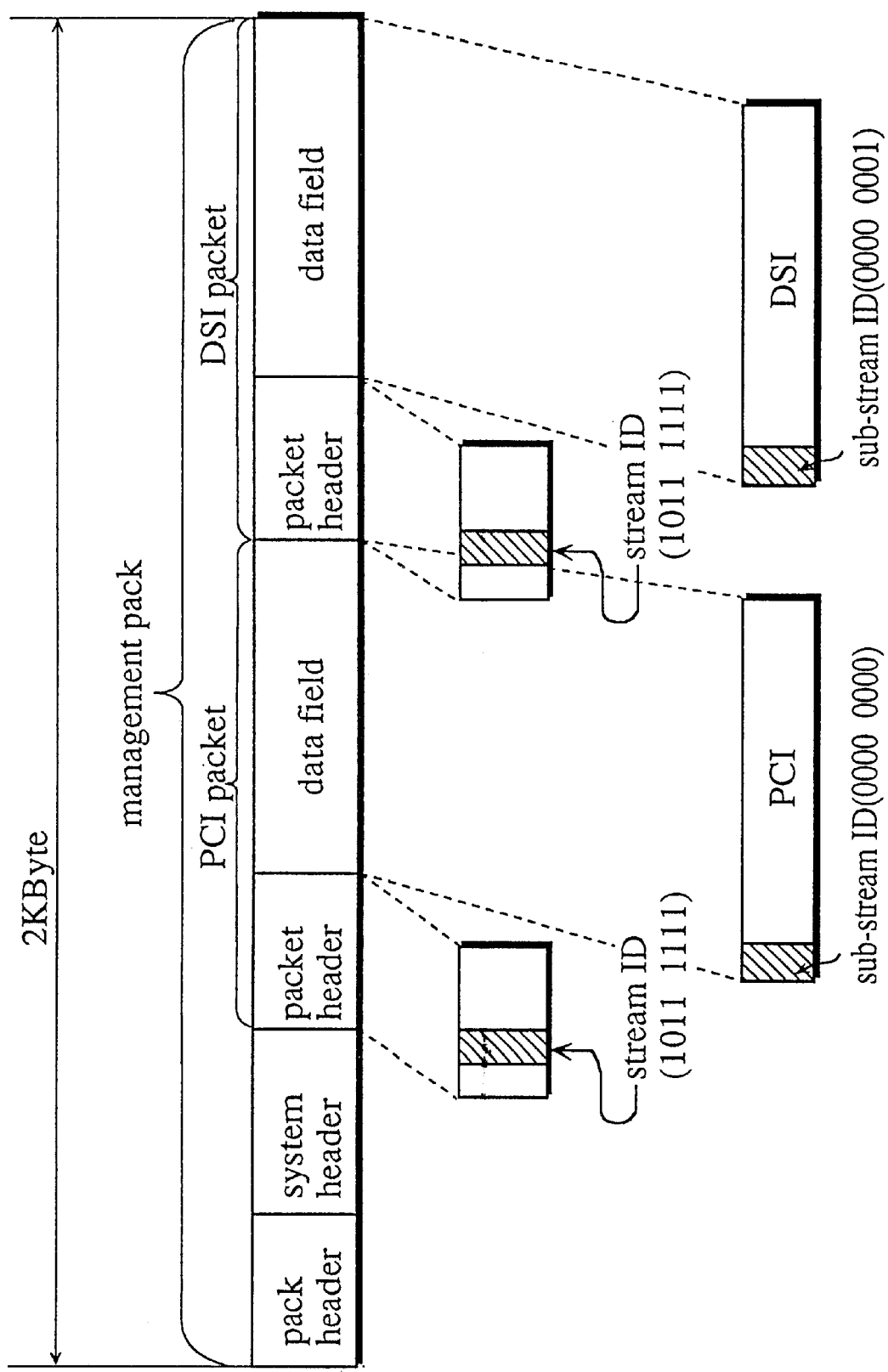
FIG. 11 shows data format of a management pack.

FIG. 11 is the data format of the management pack. The management pack comprises a pack header, PCI packet (Presentation Control Information Packet), DSI packet (Data Search Information Packet). The data stream ID "1011 1111" of the packet header shows private packet 2. In the data field, the sub-stream ID "0000 0000" represents PCI packet, and the sub-stream ID "0000 0001" represents DSI packet.

In the DSI packet, sets of information is stored for managing synchronization of the moving picture information and audio information, and information for realizing special reproduction, such as fast-forwarding and rewinding. Such information sets include return address information showing a start position of VOBU which includes the outset of the sub-picture data. The return address is used in order to resume reproduction of the application after branch to the system menu caused by the user's pressing down a MENU key on a remote controller in the course of the reproduction of the application. In the system menu, the audio streams and sub-picture streams can be switched.

The PCI packet stores the highlight information for realizing interaction between the application and the user. The highlight information includes management information for responding to the user's operation when the menu image is reproduced by the sub-picture data in the same VOBU, and auxiliary management information for substituting the user's operation for the menu. Here, the user's operation is performed by using cursor keys (arrow keys), ten keys, enter key on the remote controller of the reproduction apparatus. More specifically, the highlight information can be explained by means of the menu image example in FIG. 12. In this menu image, the following five menu items are displayed: 1-golf; 2-ski; 3-tennis; 4-canoe; go to the next menu. The highlight information for this menu image includes that there are five buttons and that the management information showing each button's selection color and activation color, and commands to be executed when each button is activated. In addition to that, as auxiliary management information mentioned above, the highlight information includes management information showing a button to be forcedly activated when the user's operation is not applied, buttons to be activated at the same time selection occurs, and a button by which selection by the ten key is prohibited.

Data Construction of the Management Pack

Figure 13:
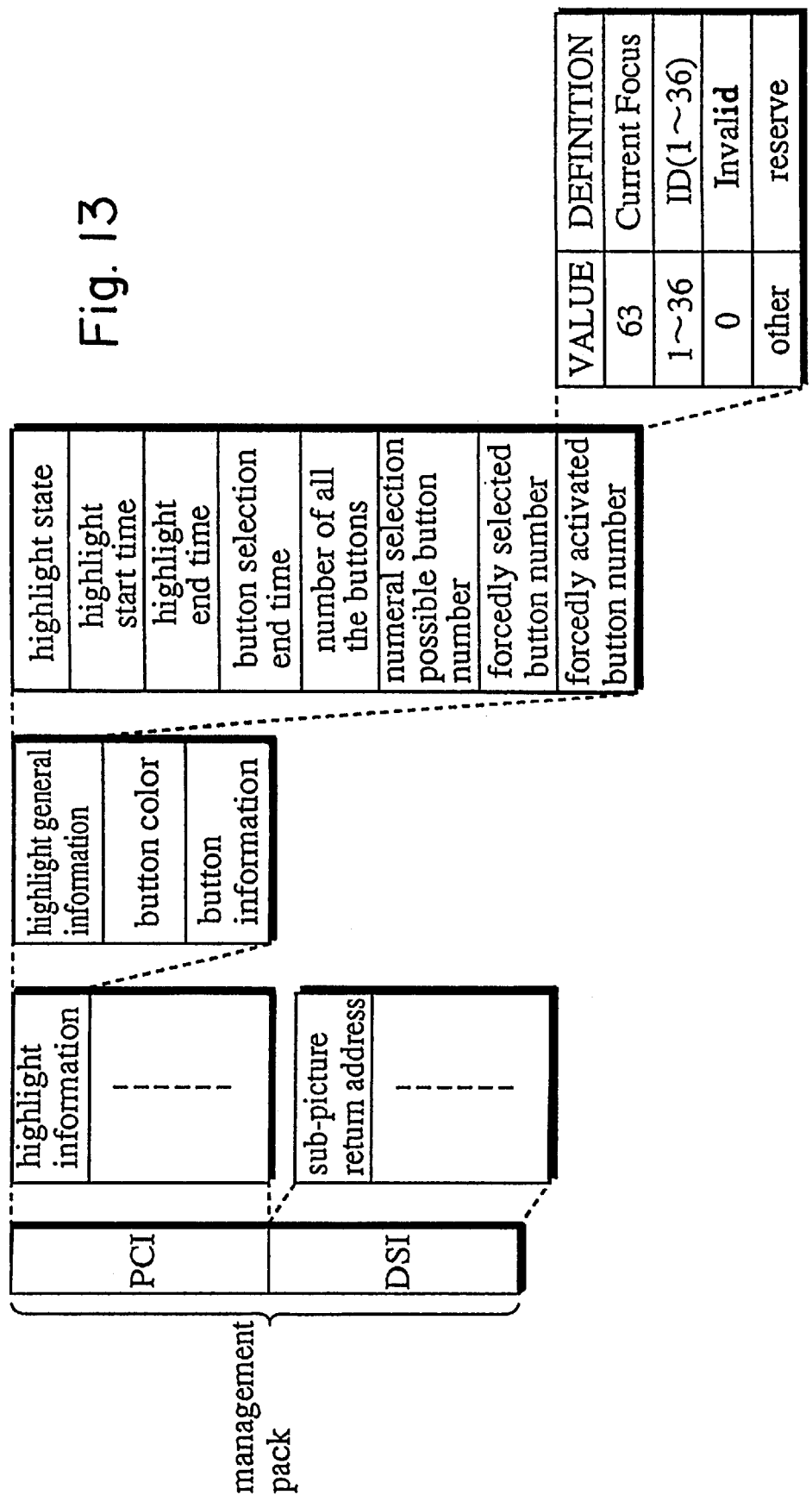
FIG. 13 is more detailed hierarchical data construction the management pack.

FIG. 13 shows more detailed hierarchical data construction of the management pack. FIG. 11 shows that the management pack has a PCI packet and a DSI packet. As is already explained, PCI includes highlight information.

Outline of Data Construction of the Highlight Information

In FIG. 13, highlight information in the PCI includes: highlight general information, button color information for changing the display color of the button in the menu, and button information for defining contents of each button. Here, the highlight display is a kind of display by which the button selected or activated out of the group of menu buttons will appear in a different color. This makes it possible to realize a menu display according to the user's operation state.

Detailed Data Construction of the Highlight Information

As shown in FIG. 13, the highlight general information includes a highlight state, highlight start time, highlight end time, button selection end time, all button number, numeral selection possible button number, forcedly selected button numbers, and forcedly activated button number.

The highlight state shows the following: whether a button exists or not in the video display section (VOBU) of about 0.5 second targeted by the PCI packet, and if so, whether the content is the same as the one of the highlight information of the preceding PCI packet.

For example, the highlight state is shown by the following two bits.

The highlight state "00" means that a button on the menu does not exist in the video display area of the VOBU.

The highlight state "01" means that a new button exists.

The highlight state "10" means that the button is the same as the one of the preceding VOBU.

The highlight state "11" means that the button is the same as the one of the preceding VOBU except for the highlight command.

The highlight start time, highlight end time, and button selection end time show the start time of the highlight display, end time of the highlight display, and end time by which the button selection is possible, respectively. These times start from the reproduction start time of the VOB. In the reproduction apparatus, as the standard clock for the entire reproduction operation, system time is measured, with the beginning being the reproduction start time of the VOB. Due to such times, the reproduction apparatus can synchronize the display of the menu image by the sub-picture data and the highlight display for the menu display.

All button number show the number of buttons being used, which is up to 36. Each button is assigned a button number out of that numeral range.

The numeral selection possible button number allows selection of numerals under the following condition: for example, when "j" is set, selection is allowed only when numerals between the range from 1 to j are inputted; in other words, regarding buttons having the number above j, selection by the numeral key is prohibited.

The forcedly selected button number shows that the initially selected button when the highlight display starts. When the forcedly selected button number is "0" meaning "invalid", it means the forcedly selected button does not exist at the initial stage. In that case, the selected button number stored in the reproduction apparatus is used.

The forcedly activated button number shows the button number which should be automatically activated when none of the buttons are selected when the button selection possible section ends. The numeral "63" and "0" are magic numbers that are not button numbers. In other words, "0" means not specified (invalid) as well as the forcedly selected button number, and "63" means the forcedly activated button which is in the selected state at the button selection end time without specifying a specific button number. In this way, the menu used in the interactive movie application makes it possible to continue the reproduction without causing interruption even if there is no user's activation.

Detailed Data Construction of the Button Color Information

Figure 14:
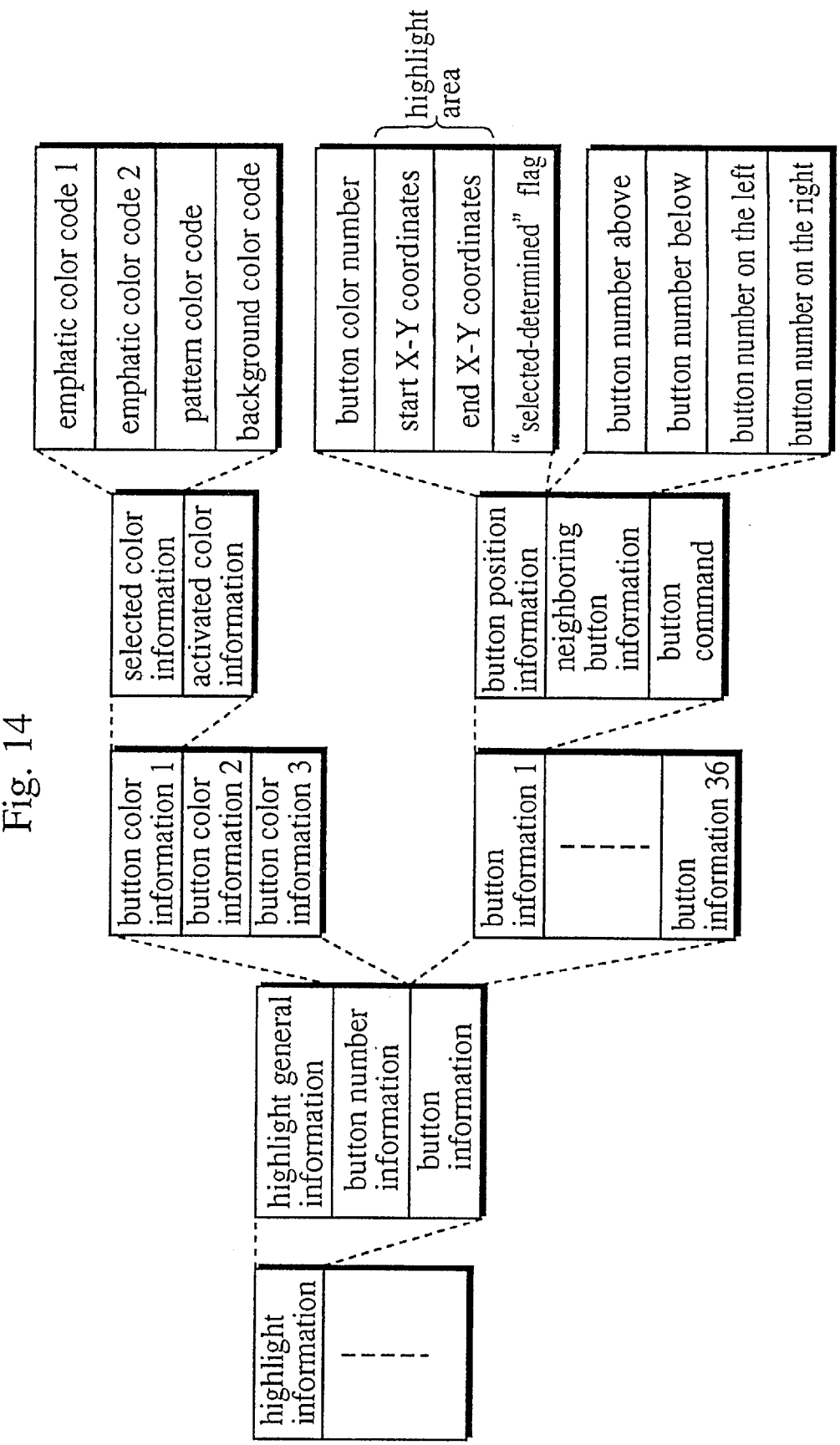
FIG. 14 shows more detailed data construction of the button color information and button information in the management pack.

FIG. 14 shows detailed data construction of the button color information and button information.

The button color information includes button color information 1, button color information 2, and button color information 3. Three types of button colors are prepared for each button on the menu and one of them is activated for each button. In the present embodiment, the number of usable buttons is 36 at the most. As it is not efficient to allocate different colors to all the buttons, each button is allocated one of the button color information 1, button color information 2, and button color information 3.

Each of the button color information 1–3 comprises selection color information and activation color information.

Figure 12:
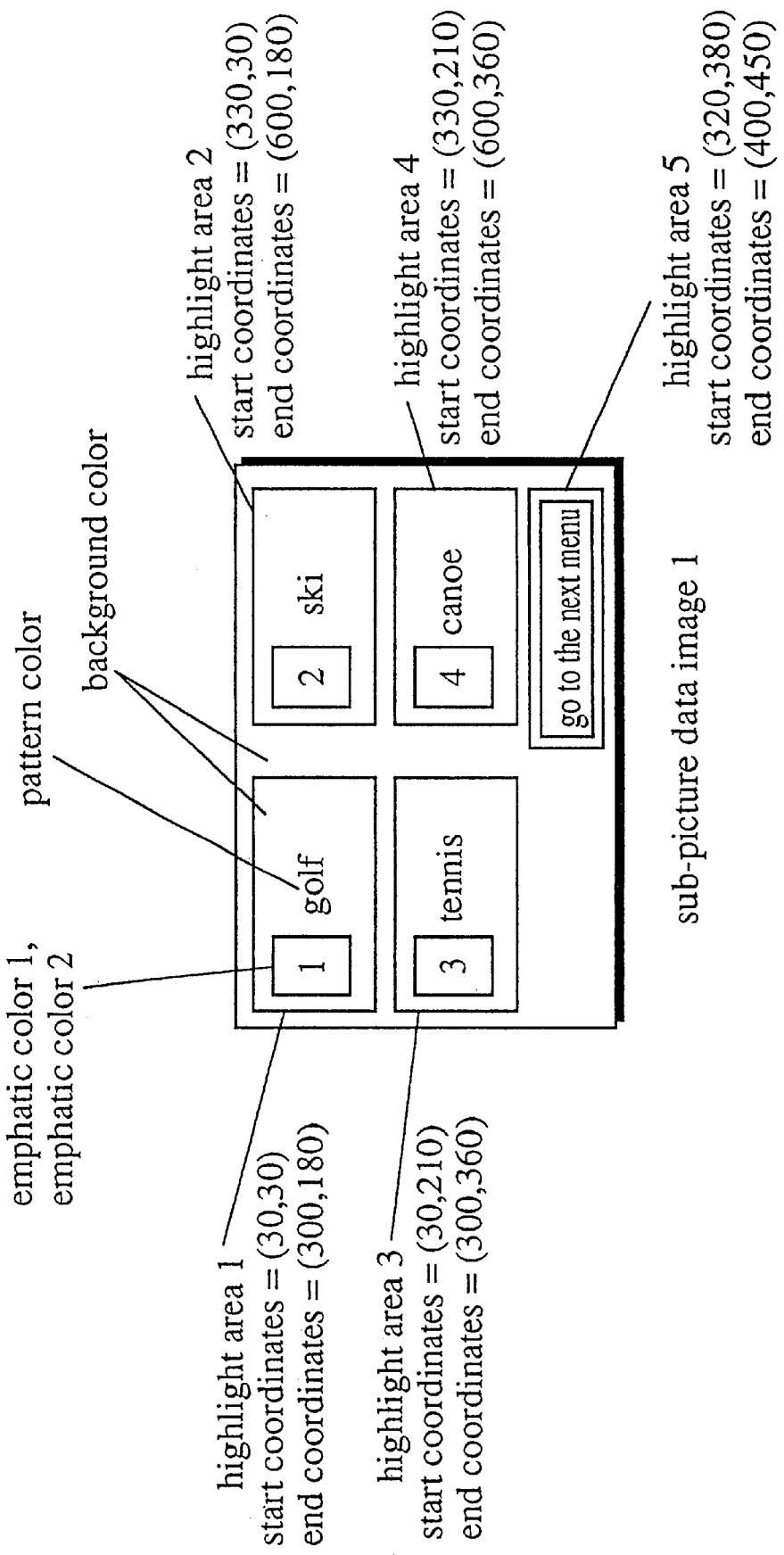
FIG. 12 shows an example of a menu image by the sub-picture data.

The selection color information shows colors to be displayed when a button is selected by an arrow key (the button is in the selected state). The selection color information includes an emphatic color code 1, emphatic color code 2, pattern color code, and background color code. FIG. 12 shows how the four colors are employed. Suppose that "4-canoe" button is in the selected state. The box enclosing "4" is displayed by the emphatic color code 1. The box enclosing "4-canoe" is displayed by the emphatic color code 2. The letter of "4-canoe" is displayed by the pattern color code. The background of the letter is displayed with the background color.

The activation color information shows a color to be displayed when the button in the selected state is put into the activated state. As well as the selection color information, the activation color information consists of the emphatic color code 1, emphatic color code 2, pattern color code, and background color code.

How each color code and menu button correspond to each other can be explained as follows.

The menu image by the sub-picture data is image data, each pixel being two bits. The two-bit code of each pixel designates one of the emphatic color 1, emphatic color 2, pattern color, and background color. The following is an example of a bit assignment.

The two bit code "00" shows background color (pixels of the background).

The two bit code "01" shows pattern color (pixels that constitute characters).

The two bit code "10" shows emphatic color 1 (a box enclosing the button, one of the double boxes).

The two bit code "11" shows emphatic color 2 (The other of the double boxes).

The emphatic color code 1, emphatic color code 2, pattern color code, and background color code in the button color information is used for converting the 2-bit-code specified for every pixel of the sub-picture data into the actual color data specified by the 24 bits. More specifically, the empathic color code 1, emphatic color code 2, pattern color code, and background color code are four-bit code, respectively, (hereinafter referred to as four bit color code) and specifies one of the 16 colors. In other words, the emphatic color code 1, emphatic color code 2, pattern color code, and background code are four bit code, respectively, for converting the 2-bit-code specified for each pixel (possible to separate four types of colors) into one of the 16 colors. These four bit codes are further converted into 24-bit color code by the color conversion table in the reproduction apparatus during reproduction.

Detailed Data Construction of the Button Information

As shown in FIG. 14, the button information stores information corresponding to the button 1–36 information (maximum 36). For the explanatory convenience, each of the buttons 1–36 information will be represented by button n information.

The button n information includes button position information, neighboring button information, and button command.

The button position information includes a button color number, start X-Y coordinates, end X-Y coordinates, and "selected=activated" flag.

The button color number specifies which of the button color information 1–3 should be employed.

As shown in FIG. 12, start X-Y coordinates, end X-Y coordinates show top left coordinates and bottom right coordinates of a rectangular, respectively, for specifying a highlight area. Both coordinates show the range of button to be colored according to the selection color information and activation color information.

The "selected=activated" flag shows, when the button is selected, whether the button should be placed into the activated state or not. Instead of user's pressing down the ENTER key, this flag reduces the number of the user's key input. The moment the button is selected by an arrow key, the button is activated without user's further pressing down the enter key.

The neighboring button information shows other button numbers that exist above, below, and on both sides of the corresponding button. Due to the neighboring button, information, the reproduction apparatus can move the button selection by operating the arrow key.

The button command stores the commands to be executed when the button is in the activated state. The examples are an instruction for designating branch and an instruction for designating operations for the register inside the reproduction apparatus.

Details of the Button Command

FIG. 15 shows examples of instructions used as button commands set for every button in the button information. Each instruction is composed of operation code and at least one operand.

In FIG. 15, the "Link" instruction designates a branch reproduction to the program chain (PGC) designated by the operand. Here, the program chain (PGC) is a string of the VOBs to be reproduced successively or a reproduction route of the VOBs. The details of PGC will be explained later.

The "CmpRegLink" instruction having a register number, an integer, a branch condition and a branch destination PGC number as operands instructs to branch to the PGC occurs only when the register value satisfies the branch condition for the integer. Branch conditions are =(equal), >(larger), <(smaller).

The "SetRegLink" instruction having a register number, an integer, an operation content, and a branch destination PGC number as operands instructs to branch to the PGC after storing the value obtained by operating the register value and the integer into the register. Here, the operands that show operation contents are =(substitution), +(plus), −(minus), *(multiplication), /(division), MOD(modulus), AND(logical product), OR(logical sum), XOR(exclusive OR).

The "SetReg" instruction having a register number, an integer, and an operation contest as operands instructs to store the operation-performed register number and integer into the register. Here, the operand that shows the operation content is the same as that of the "SetRegLink" operation.

The "Random" operation having a register number and an integer instructs value as operands instructs to generate an integral random number from 1 to the integer value to be stored into the register.

Data Construction of the Video Title Set (Part 2)

The Video Title Set management information can be explained as follows, which manages the reproduction route of the VOB.

Figure 16:
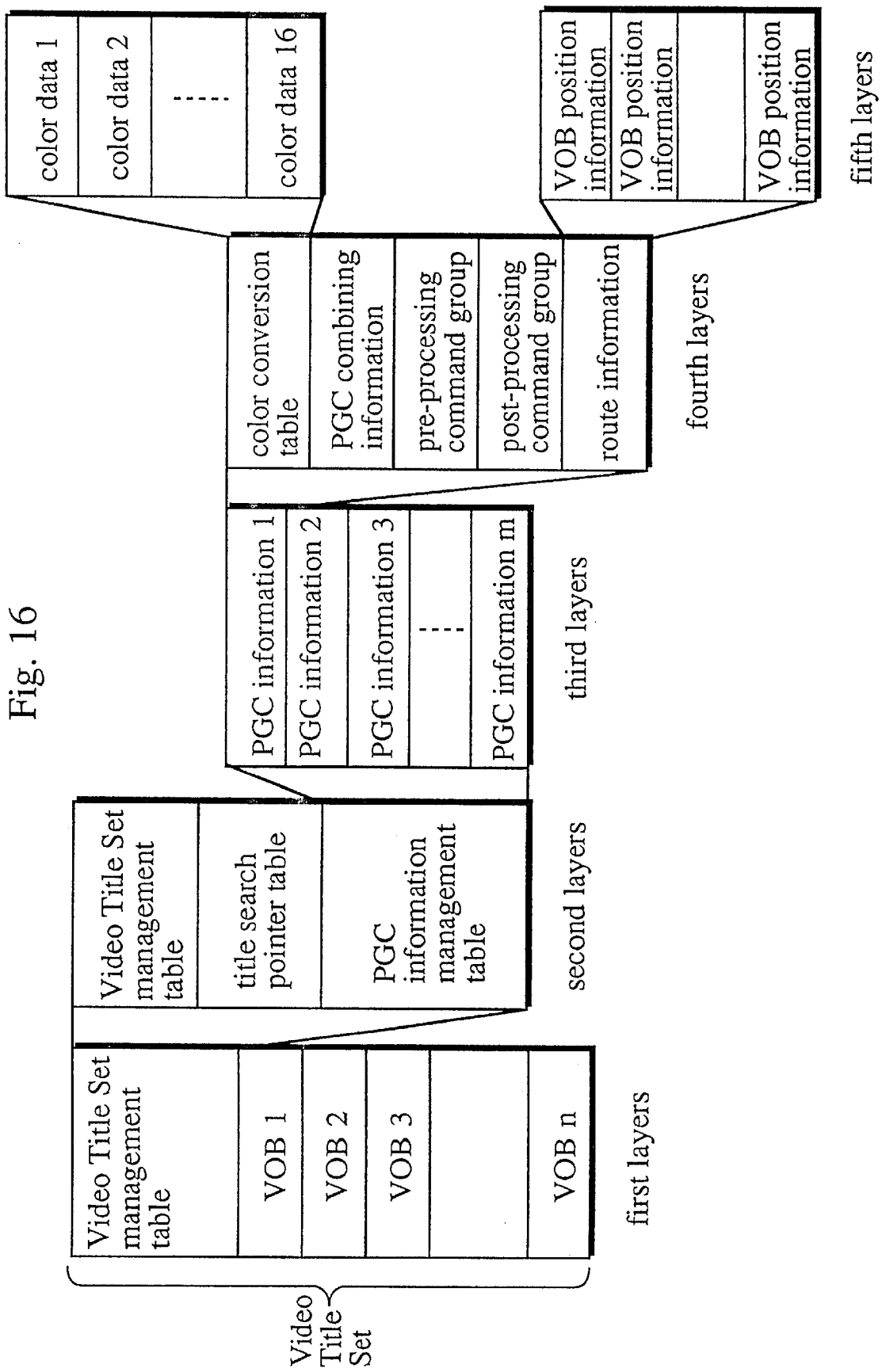
FIG. 16 shows hierarchical data construction of the Video Title Set management information in the each Video Title Set in FIG. 5.

FIG. 16 shows hierarchical data construction of the Video Title Set management information of each Video Title Set in FIG. 5. From left to right, the sets of layers are referred to as the first layer to the fifth layer, respectively.

The first layer is already explained in FIG. 6.

As is shown by the second layer, the Video Title Set management information includes a Video Title Set management table, title search pointer table, and PGC information table.

The Video Title Set management table is the header information of the Video Title Set, and stores pointers that show storage position of the PGC information management table and the title search pointer table.

The title search pointer table is an index of the PGCs stored in the PGC information management table, and stores pointers for the storage position of the PGC which should be executed firstly for each title, for example, a pointer which shows the storage position of the PGC information that shows the leading PGC of the interactive movie.

Figure 17:
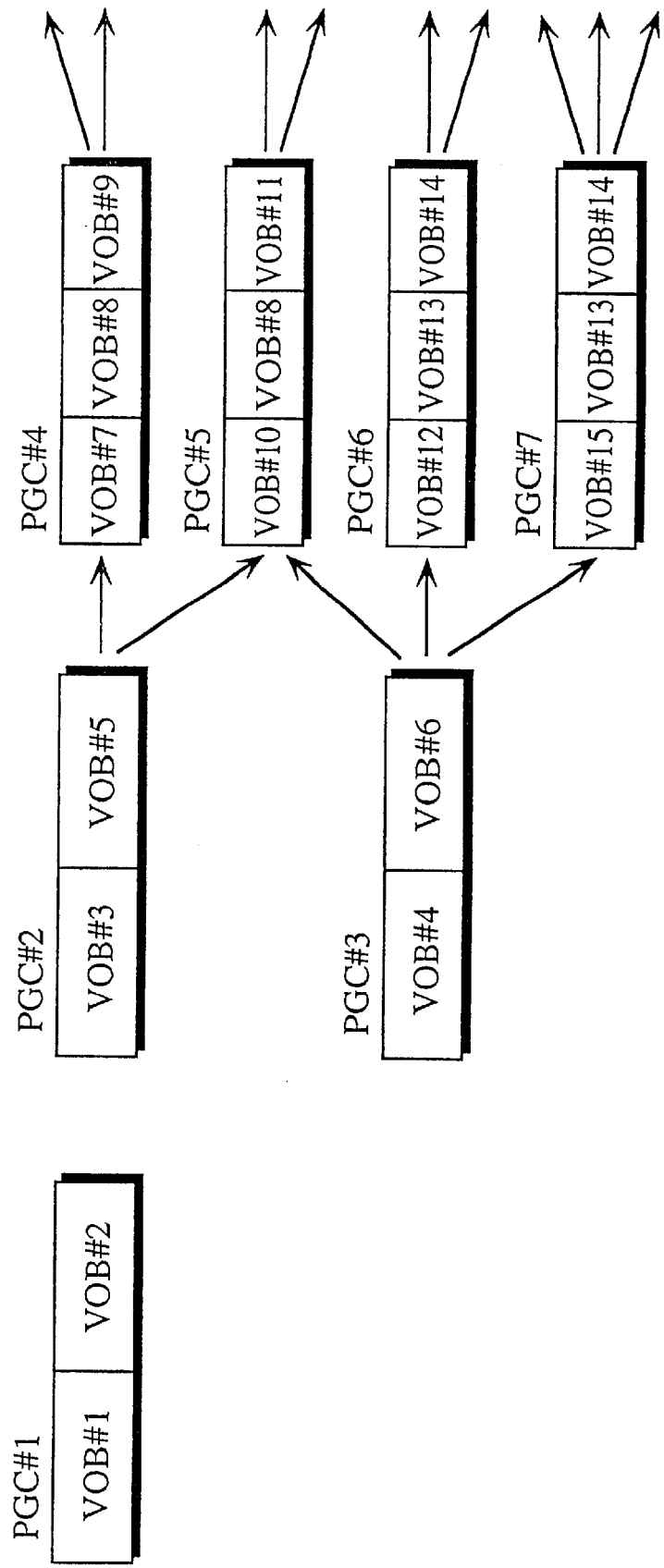
FIG. 17 is for explanation of a PGC.

The PGC information management table is a table for reproducing a given VOBs in a given order from the VOBs stored in the Video Title Set. The PGC information management table manages by the unit called PGC in which VOBs are combined according to a given order. FIG. 17 shows the PGC. In this figure, the PGC#1 shows the reproduction route from the VOB#1 to VOB#2 in the Video Title Set. The PGC#7 shows the reproduction route from the VOB#15 to VOB#14 via VOB#13.

In order to realize this, as shown in the third layers in FIG. 16, the PGC information management table comprises the PGC information #1–#m. Each PGC information specifies construction of one PGC and designates the PGC to be reproduced next.

As is shown by the fourth layers in FIG. 16, each PGC information comprises a color conversion table, PGC connection information, pre-processing command group, post-processing command group, and route information.

The route information, as shown by FIG. 5, comprises a set of VOB position information, and they are arranged according to the order of reproduction. For example, the route information of the PGC#1 in FIG. 17 consists of the VOB#1 position information and VOB#2 position information. The position information includes the logical address of the leading sector of the VOB and all the sector numbers occupied by the VOB.

The post-processing command group shows commands to be executed after the reproduction of the PGC. This command can be used as the button command in the highlight information, which is shown in FIG. 16. For example, in FIG. 17, the PGC#1 branches to either the PGC#2 or PGC#3. In order to realize this, after the PGC#1, the "CmpRegLink" instruction may be set to the processing command group.

The pre-processing command group shows commands to be executed before the reproduction of the PGC starts. This command can also set the instruction shown in FIG. 16. For example, the pre-processing command group can be used for initializing the register by the "SetReg" instruction.

The PGC connection information shows one PGC number to be reproduced next. However, when branch occurs due to a branch instruction (for example, "CmpRegLink") in the post-processing command group, the PGC connection information is neglected.

The color conversion table is for converting the foregoing four-bit color code of the sub-picture data into actual color data specified by 24 bits. This color conversion table, as shown by the fifth layers in FIG. 16, stores 24-bit color code comprising luminosity data, color difference data 1 and 2; each, four-bit-color code (colors 1–16) corresponding to any of the 24-bit-codes. How to specify the color is stipulated by ITU-R-Rec. and 601-1.

So far, the data construction of the optical disc has been explained. Next, explanation on the reproduction apparatus starts.

Appearances of the Reproduction System

Figure 18:
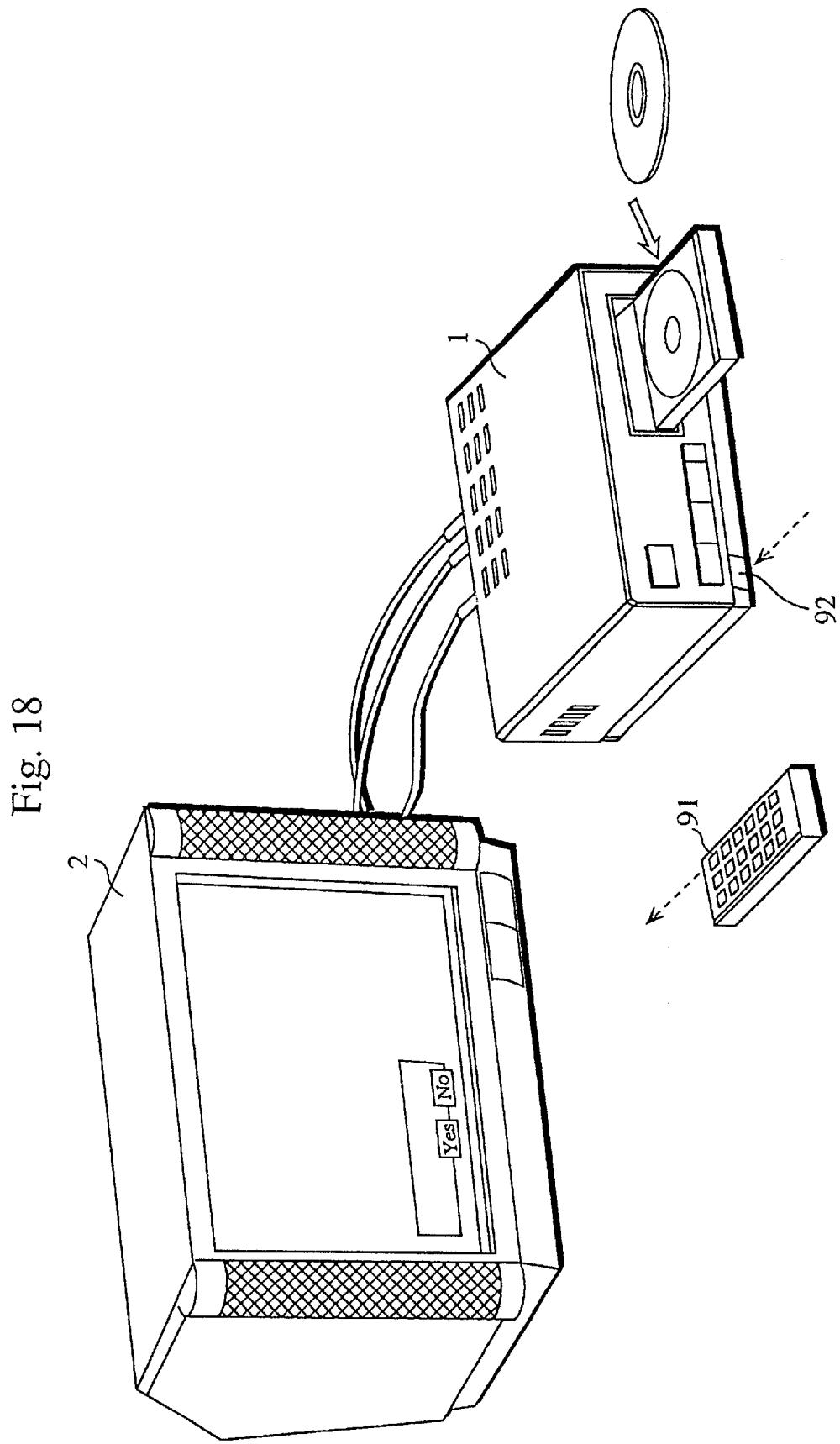
FIG. 18 is an appearance of the reproduction system in the present embodiment.

FIG. 18 shows the appearances of the reproduction system, comprising the reproduction apparatus, a monitor, and the remote controller of the present embodiment.

In this figure, the reproduction apparatus 1 reproduces the foregoing optical disc (DVD) according to an instruction from the remote controller 91, and outputs a video signal and audio signals. The instruction from the remote controller 91 is received by the remote controller reception unit 92 of the reproduction apparatus 1.

The display monitor 2 receives a video signal and audio signals from the reproduction apparatus, and outputs images and audio. This display monitor can be a common TV monitor.

Appearance of the Remote Controller

Figure 19:
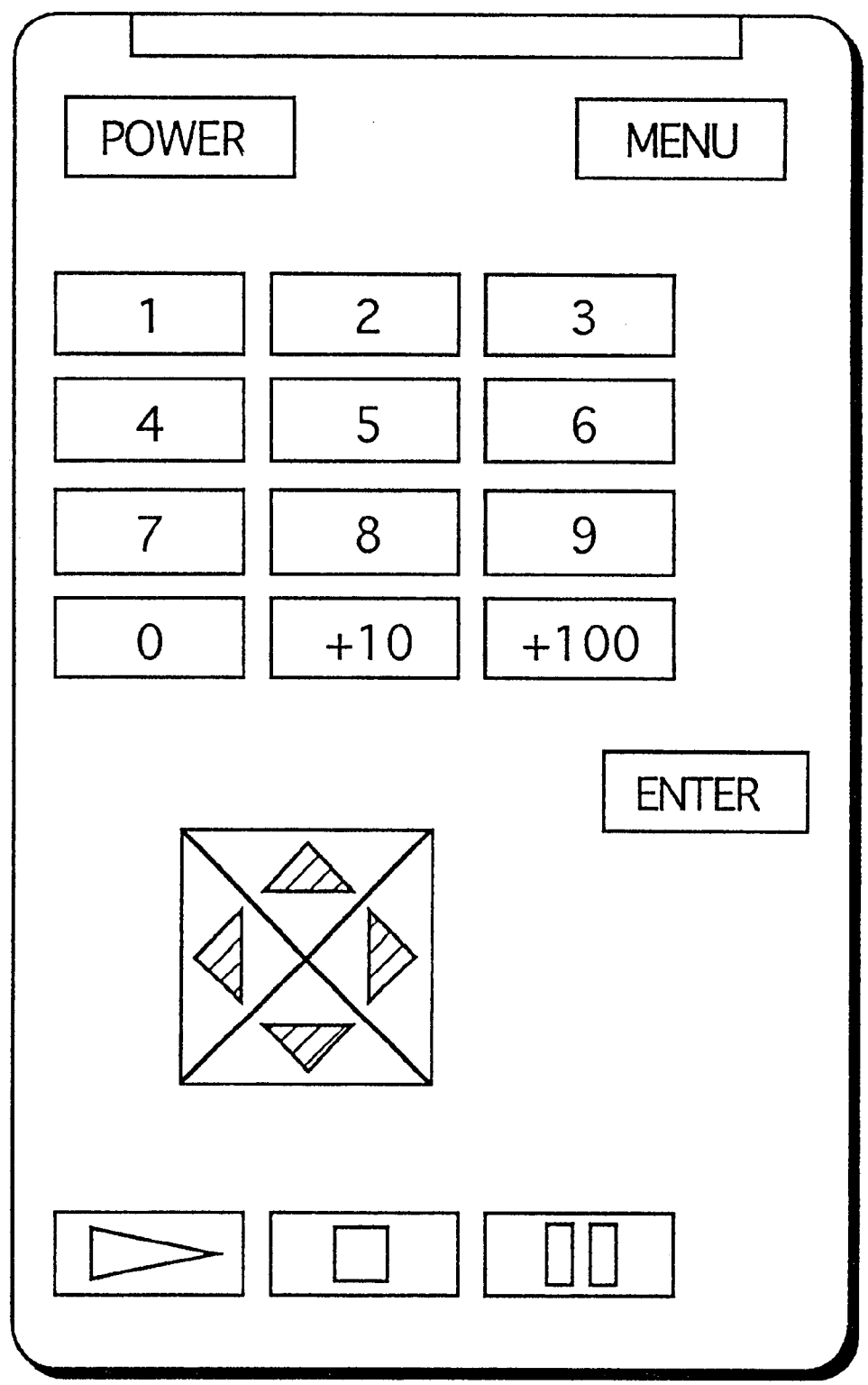
FIG. 19 is an example of key arrangement on a remote controller.

FIG. 19 shows an example of a key arrangement of the remote controller 91. Here, keys related to the present invention are explained. The MENU key is for calling the system menu by the Video Manager when some titles of an interactive movies are reproduced. The Ten keys and direction (arrow) keys are for selecting menu items. The ENTER key is for activating the selected menu item. Other keys are the same as those of other AV apparatuses.

Entire Construction of the Reproduction Apparatus

Figure 20:
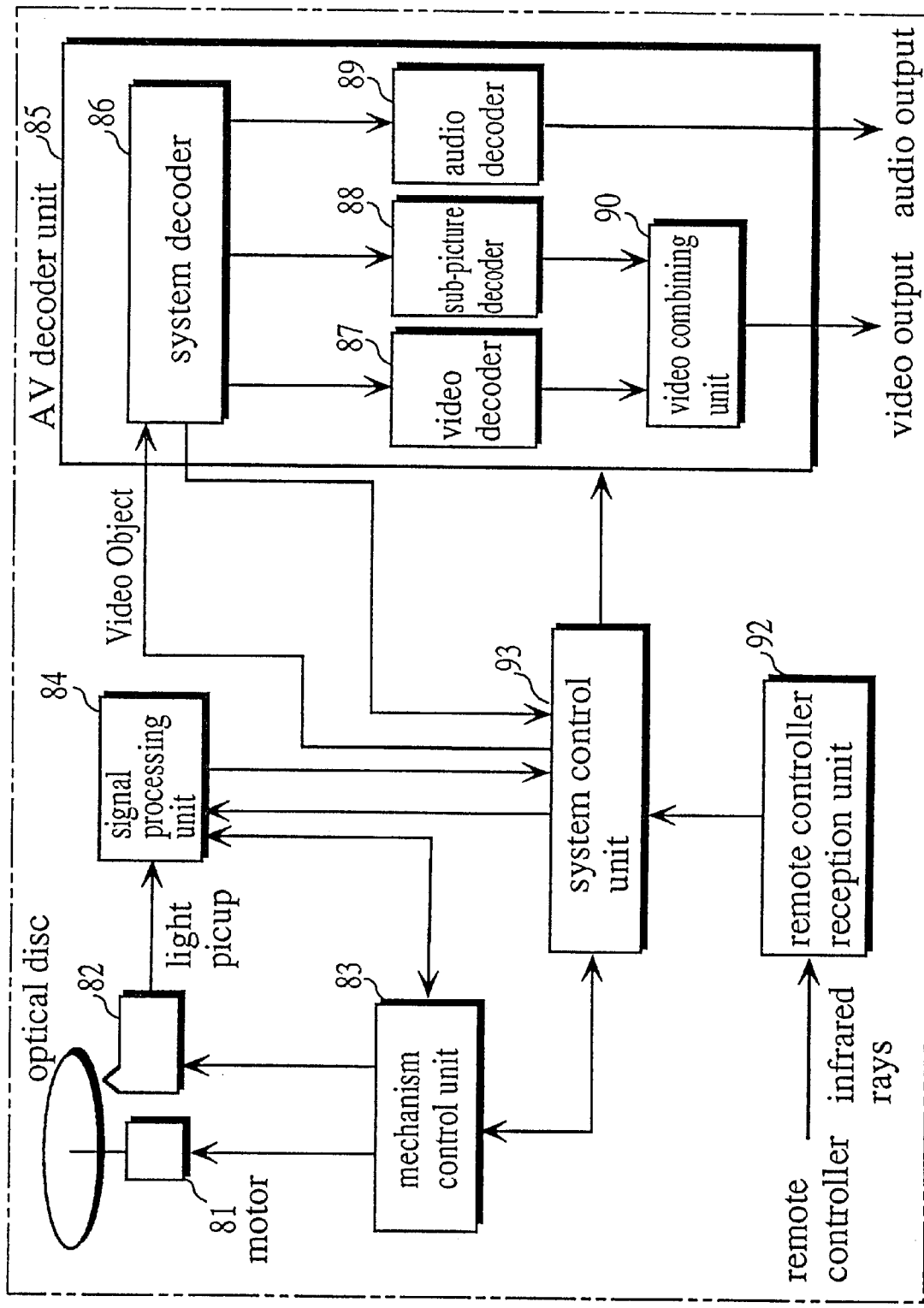
FIG. 20 is a block diagram showing the entire construction of a reproduction apparatus.

FIG. 20 shows the entire construction of the reproduction apparatus shown in FIG. 18. The reproduction apparatus 1 comprises the motor 81, light pickup 82, mechanism control unit 83, signal processing unit 84, AV decoder unit 85, remote controller reception unit 92, and system control unit 93. Furthermore, the AV decoder unit 85 comprises the system decoder 86, video decoder 87, sub-picture decoder 88, audio decoder 89, and image combining unit 90.

The mechanism control unit 83 controls the mechanical system including the motor 81 which drives the disc and the light pickup 82 which reads out the signal stored on the disc. More specifically, the mechanism control unit 83 adjusts the speed of the motor according to the track position designated by the system control unit 93, and moves the position of the pickup 82 by controlling the actuator of the light pickup 82. When the accurate track is detected by servo control, the mechanism control unit 83 waits during the rotation of the disc until the desired physical sector comes, and reads the signals successively from the desired position.

The signal processing unit 84 performs the following processing on the signal read from the light pickup 82; amplification, waveform shaping, changing to binary, decoding, and error correction. After that, the signal processing unit 84 stores the data obtained by the above processing in the buffer memory (not illustrated) into the system control unit 93. In the buffer memory, Video Title Set control information of the data is held in the system control unit 93, and the VOB of the data is transferred to the system decoder 86 by the system control unit 93.

The AV decoder 85 converts the VOB to the original video signal, audio signal, and sub-picture signal.

The system decoder 86 judges the stream ID and the sub-stream ID in each logical block (data) included in the VOB transferred from the buffer memory. And the system decoder 86 outputs the video data to the video decoder 87, the audio data to the audio decoder 89, the sub-picture data to the sub-picture decoder 88, and the management pack to the system control unit 93. At this time, the system decoder 86 outputs the audio data and the sub-picture data, each having the number (channel) designated by the system control unit 93 from the sets of the audio data and sub-picture data to the audio decoder 89 and sub-picture image decoder 88, respectively, and discards other data.

The video decoder 87 decodes the video data inputted from the system decoder 86, expands the decoded video data, and outputs the decoded-and-expanded video data to image combining unit 90 as a digital video signal.

The sub-picture data inputted from the system decoder 86 is an image data which has been performed run-length compression. The sub-picture decoder 88 decodes the inputted sub-picture data, expands the decoded sub-picture data, and outputs the decoded-and-outputted sub-picture data to the image combining unit 90 in the same form as the digital video signal.

The audio decoder 89 decodes the audio data inputted from system decoder 86, expands the decoded audio data, and outputs the decoded-and-expanded audio data as a digital audio signal.

The image combining unit 90 outputs the video signal in which the output of the video decoder 87 and output of the sub-picture decoder 88 are mixed according to the ratio designated by the system control unit 93. This present signal is converted into an analogue signal and inputted into the display apparatus.

Construction of the System Decoder

Figure 21:
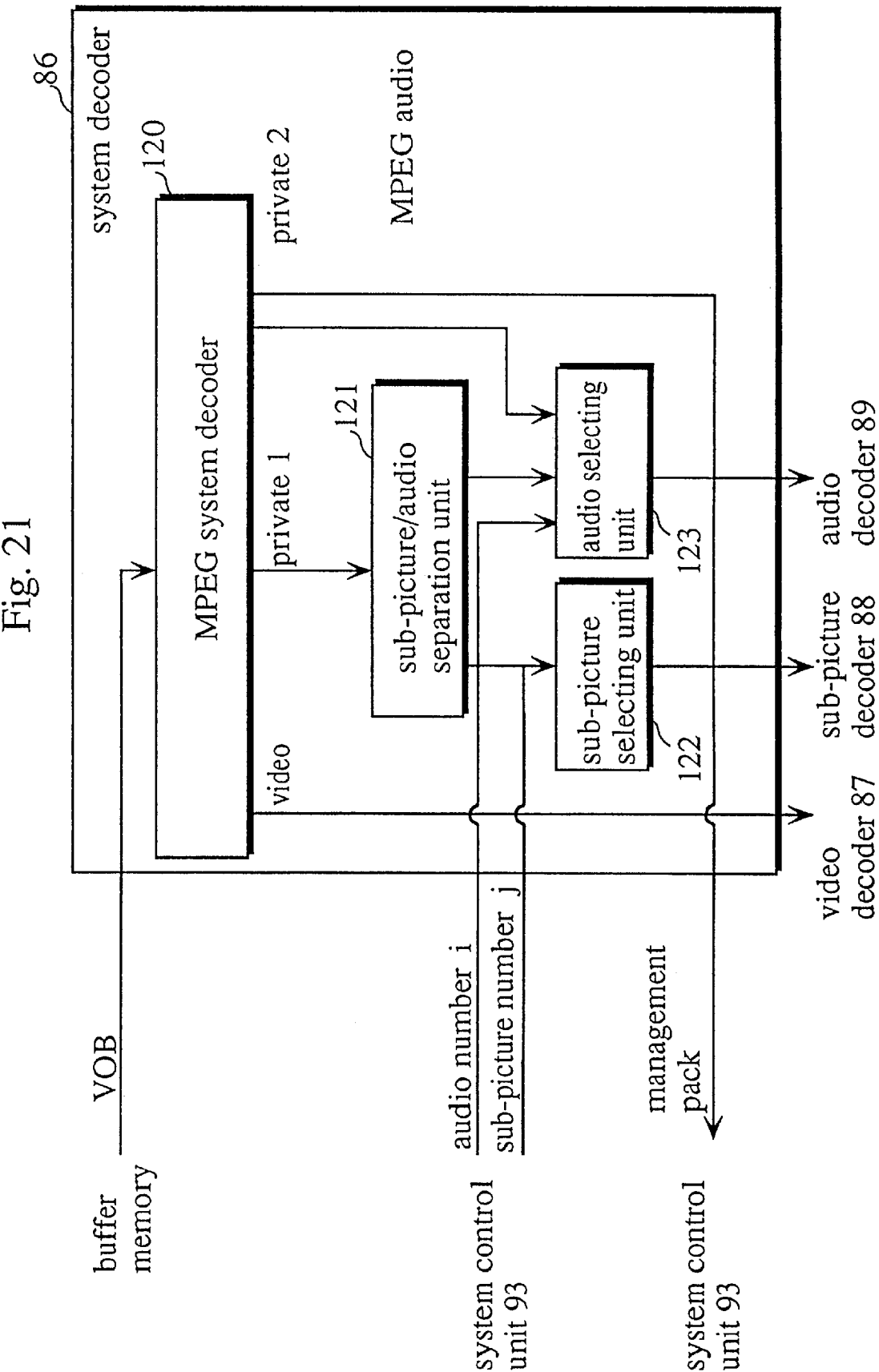
FIG. 21 is a block diagram showing construction of a system decoder.

FIG. 21 is a block diagram showing the construction of the system decoder 86 in FIG. 20. As is apparent from this figure, the system decoder 86 comprises the MPEG decoder 120, sub-picture/audio separation unit 121, sub-picture selection unit 122, and audio selection unit 123.

The MPEG decoder 120 judges the type of each data pack included in the VOB stream transferred from the buffer memory by referring to the stream ID in the pack. If it is the video packet, the MPEG decoder 120 outputs it to the video decoder 87; if it is the private packet 1, to the sup-picture/audio separation unit 121; if it is the private packet 2, to the system control unit 93, and if it is the MPEG audio packet, to the audio selection unit 123.

The sub-picture/audio separation unit 121 judges the type of the packet by referring to the sub-stream ID in the pack regarding the private packet 1 inputted from the MPEG decoder 120. If it is the sub-picture data, sub-picture/audio separation unit 121 outputs it to the sub-picture selection unit 122; and if it is the audio data, to the audio selection unit 123. As a result, the sub-picture data and audio data of all numbers are outputted to the sub-picture selection unit 122 and audio selection unit 123, respectively.

The sub-picture selection unit 122 outputs, out of the sub/picture decoder 88 from the sub-picture/audio separation unit 121, only the sub-picture data having the number designated by the system control unit 93 to the sub-picture decoder 88. The sub-picture data of the number other than the designated number are discarded.

The audio selection unit 123 outputs, out of the MPEG audio data from the MPEG decoder 120, only the audio data having the number designated by the system control unit 93. And the audio selection unit 123 outputs the audio data from the sub-picture/audio separation unit 121. The audio data of the number other than the designated number are discarded.

Construction of the System Management Unit

Figure 22:
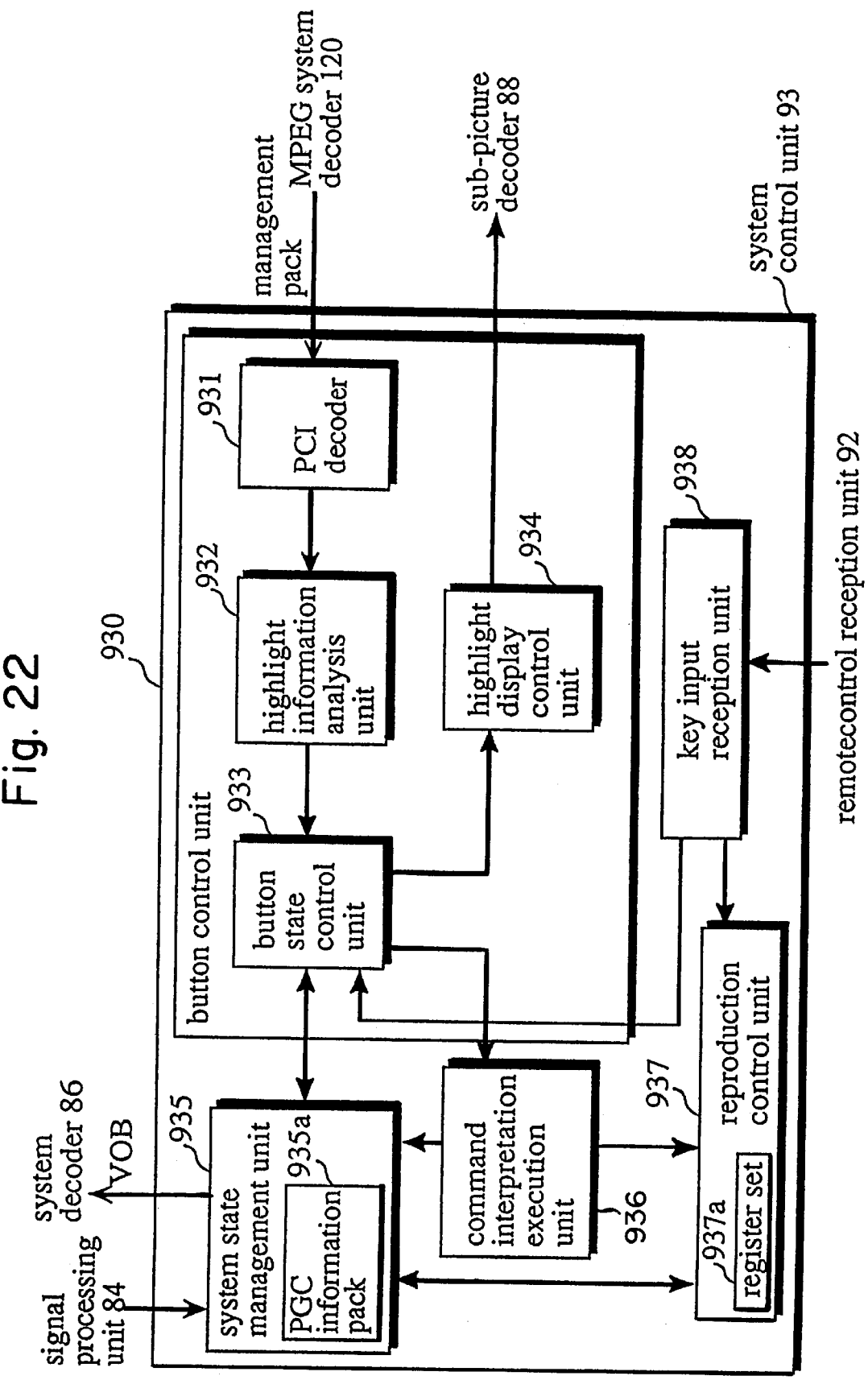
FIG. 22 is a block diagram showing construction of a system control unit.

FIG. 22 is the block diagram showing the construction of the system control unit 93 in FIG. 20.

The system control unit 93 comprises the button control unit 930, system state management unit 935, command interpretation execution unit 936, reproduction control unit 937, button state control unit 933, and key input reception unit 938. Furthermore, the button control unit 930 comprises the PCI decoder 931, highlight information analysis unit 932, and highlight display control unit 934. According to the highlight information in the management pack, the button control unit 930 controls response to the user's menu operations.

The PCI decoder 931 separates the PCI packet from the management pack transferred from the MPEG decoder 120, and transfers the highlight information to the highlight information analysis unit 932. As the management pack is performed interleaving in each VOBU as shown in FIG. 7, a new management pack is transferred every 0.5 second.

The highlight information analysis unit 932 analyses the highlight information inputted from the PCI decoder 931, and creates a button state transfer table showing how the selected state of the button transfers for all buttons on the menu image by the sub-picture data.

The button state control unit 933 stores the button state transfer table created by the highlight information analysis unit 932, stores the button number in the selected state (current state) and the button number in the activated state, and manages the state of change.

FIG. 23 shows a concrete example of the button state transfer table. This table is based on the menu image by the sub-picture data shown in FIG. 12.

In FIG. 23, "current state" column shows all the buttons that could be in the selected state. In other words, each of the S1–S5 shows that the button numbers 1–5 on the menu image are in the selected state. The number of the "current state" is created by the number of all the buttons shown by this highlight information analysis unit 932 in FIG. 13.

The "arrow key transfer information" column shows to which state the current state transfers when the arrow key of the remote controller is inputted. The arrow key transfer information is created by the highlight information analysis unit 932 according to the neighboring button information in the highlight information.

The "highlight display information" column shows highlight of each button. The highlight display information is set by the highlight information analysis unit 932 according to the highlight area composed of the start X-Y coordinates and end X-Y coordinates in FIG. 14.

The "numeral key allowance" column shows, for each state, whether the selection by the numeral key can be allowed. This information is set by the highlight information analysis unit 932 according to the number of the numeral selection possible buttons. In the case of FIG. 23, button selection is allowed for the buttons 1–4, but not for the button 5.

The "selected=determined" column shows, for every button, whether the buttons set in the selected state should be changed to activated state immediately. This information is set by the highlight information analysis unit 932 according to the "selected=determined" flag shown in FIG. 14. In the case of
FIG. 23, the "selected=determined" is set for only button 5.

The "button color number" column shows button color number of each button, and this column is set by the highlight information analysis unit 932 according to the button number shown in FIG. 14.

The "button command" column shows commands to be executed when each button is in the activated state. This column is activated by the highlight information analysis unit 932 according to the button command shown in FIG. 14.

According to the button state transfer table, the highlight display control unit 934 and the command interpretation execution unit 936 manage the response to the user's menu operations.

The highlight display control unit 934 controls the highlight display by notifying the highlight area of the button in the selected state, activated state, and color information designated by the button color number to the sub-picture decoder 88 according to the button state transfer table.

The system state management unit 935 temporarily stores the digital data inputted from the signal processing unit 84. A part of the buffer area is reserved as PGC information buffer 935a which stores PGC information. When the digital data inputted into the system state control management unit 935 is VOB, it is transferred to the system decoder 86 by the reproduction control unit 937. When it is PGC information, it is stored in the PGC information buffer 935a.

The command interpretation execution unit 936 executes a button command when the button is put into the activated state.

The reproduction control unit 937 having a register set 937a interprets the key-inputted data from the key input reception unit 938, and controls other reproduction management. The register set comprises a plurality of registers ($R_0$–$R_3$). One of the registers store a channel number of the sub-picture data being reproduced and a channel number of the audio data, and notifies them to the sub-picture selection unit 122 and the audio selection unit 123, respectively.

The key input reception unit 938 receives a key code which designates a key inputted from the remote controller reception unit 92, and notifies it to the button state control unit 933 and the reproduction control unit 937.

Detailed Construction of the Sub-Picture Decoder

FIG. 24 is a block diagram showing detailed construction of the sub-picture decoder 88. The sub-picture decoder 88 comprises the input buffer 881, sub-picture code generation unit 882, sub-picture display control unit 883, sub-picture code conversion table 884, compressed video signal generation unit 885, highlight code conversion table 886, highlight area management unit 887, sub-picture signal generation unit 888, and color conversion table 889.

The input buffer 881 stores sub-picture data of the channel selected by the sub-picture selection unit 122 in the system decoder 86.

The sub-picture code generation unit 882 converts the image data which has been performed run-length compression into a bit-map data in which each pixel is expressed by 2-bit code by expanding.

The sub-picture display control unit 883 controls display start/end of image data; carries out image processing such as color change when karaoke is used; and generates sub-picture code conversion table 884 by the color information stored in the sub-picture data.

The compressed picture signal generation unit 885 converts the two-bit code of each pixel outputted from the sub-picture code generation unit 882 into 16 color code of 4 bits by referring to the sub-picture code conversion table 884 for the sub-picture part and the highlight code conversion table 886 for the highlight area.

The highlight code conversion table 886 is a color conversion table for converting 2-bit code of the highlight part which is a part of the image data into a 4-bit code.

The highlight area management unit 887 stores the start X-Y coordinates and end X-Y coordinates of the highlight area, and prepares for readout of the compressed video signal generation unit 885.

The sub-picture signal generation unit 888 converts the 16 color code outputted from the compressed video signal generation unit 885, which is 4 bit per pixel, into about 16,000,000 color data of 24 bits.

The color conversion table 889 stores the 16 color information in the color conversion table in the PGC information to be reproduced.

Outline of Processing Flow of the Reproduction by the System Control Unit 93

Figure 25:
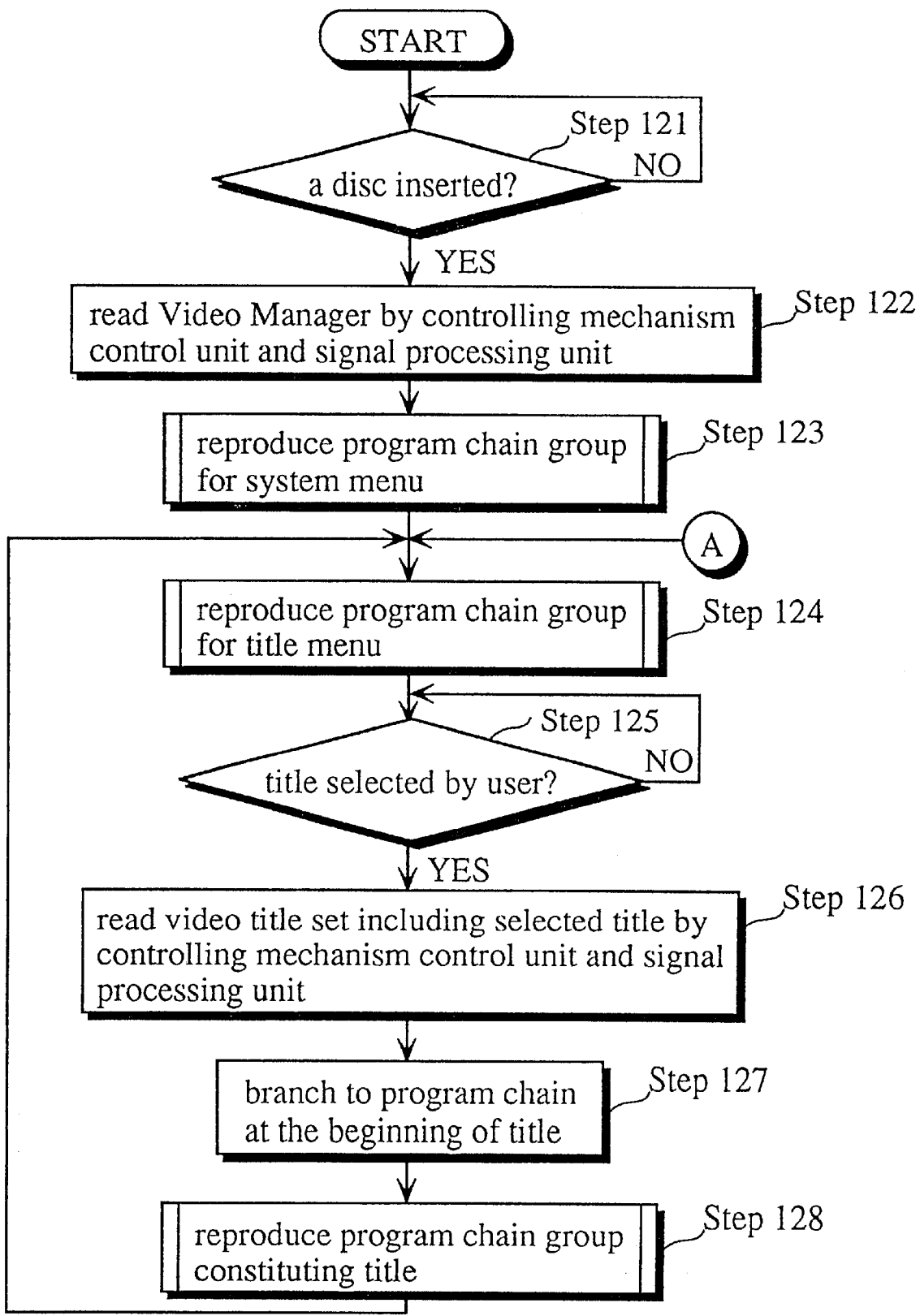
FIG. 25 is a flowchart showing outline of processing of reproduction control by the system control unit.

FIG. 25 is a schematic flowchart showing reproduction management by the system control unit 93 in FIG. 20.

On detecting that the disc is set into the reproduction apparatus, the system control unit 93, by managing the mechanism control unit 83 and the signal processing unit 84, controls the disc rotation until a stable readout is carried out, and when the stable readout is carried out, reads out the lead-in area firstly by moving the light pickup. After that, the system control unit 93 reads the volume management area, Video Manager in FIG. 5 based on the information in the volume management area (Steps 121, 122), and reproduces the PGC group for the system menu (Step 123).

According to the user's operations to the system menu, the system control 93 reproduces the PGC for the title menu in the selected Video Title Set (Step 124), based on the user's selection (Step 125), reads the Video Title Set management information corresponding to the selected title (Step 126), and branches to the leading PGC of the title (Step 127). Furthermore, after the PGC group is reproduced and finished, the system control unit 93 goes back to Step 124 (Step 128).

Flow of Reproduction Procedure of the Program Chain Group

Figure 26:
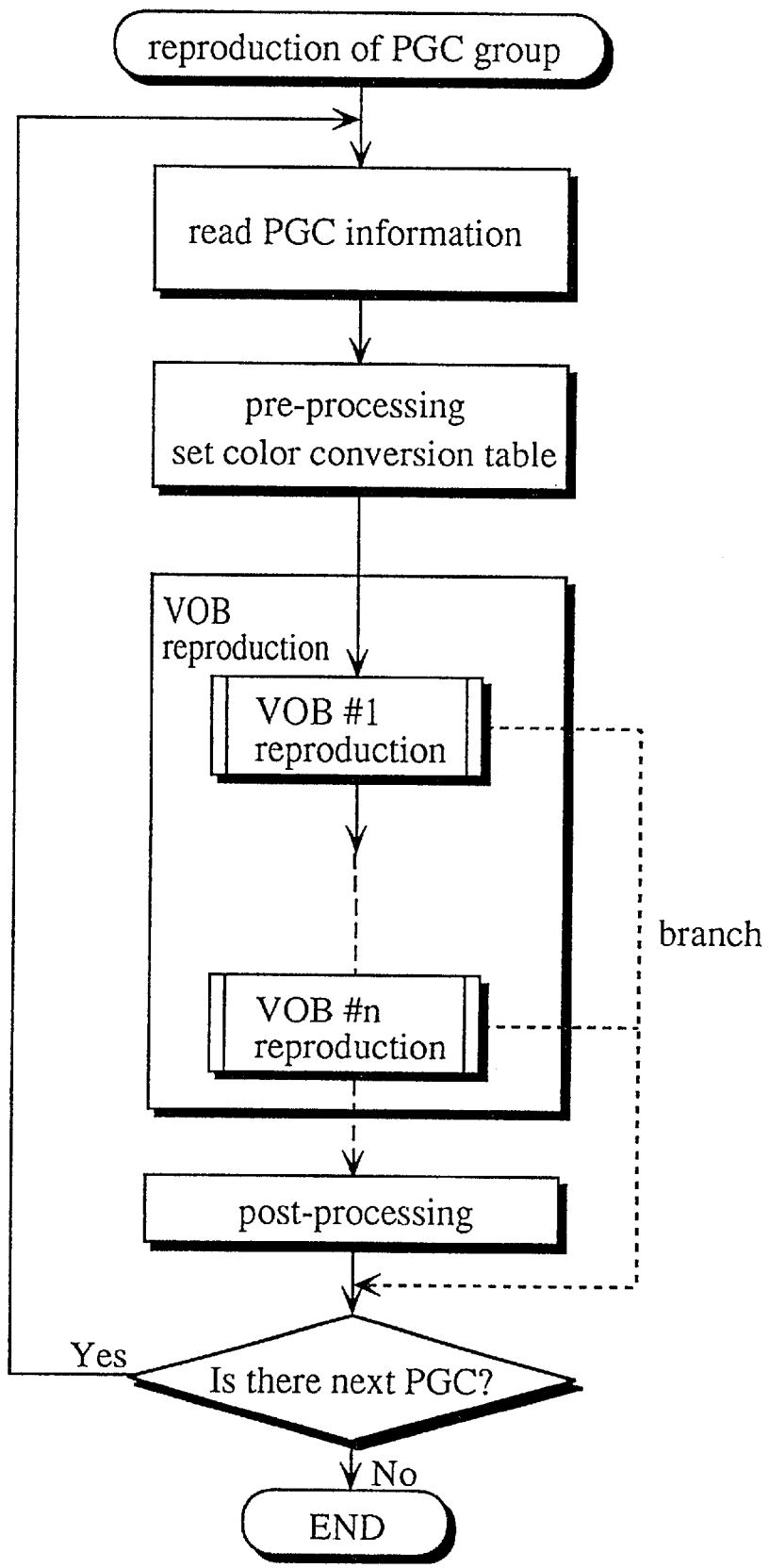
FIG. 26 is a detailed flowchart of reproduction procedure of a program chain group in FIG. 25.

FIG. 26 is a detailed flowchart of the reproduction, procedure of the program chain group in Step 128 in FIG. 25. The same things apply to Steps 123 and 124 in FIG. 25.

In FIG. 26, the system control unit 93 reads the corresponding PGC information from the Video Title Set information (Step 131). This PGC information is stored into the PGC information buffer 935a.

Next, initial setting is carried out according to the PGC information in the PGC information buffer 935a. Execution of the pre-processing command group and setting of the color conversion table are included in the initial setting (Step 132). Due to the execution of the pre-processing command group, for example, initial value of the register is set. The color conversion table shown by the fourth layers in FIG. 16 is, at this moment, stored in the buffer memory in the system state management unit 935, and it is transferred to the sub-picture code conversion table 884 in the sub-picture decoder 88 in FIG. 24.

After that, the system control unit successively reproduces the position information specified by the route information in the PGC information buffer 935a, and manages reproduction of each VOB#i (i=1–n) (Step 133). Specifically, the system control unit 93 starts reading the VOB for the mechanism control unit 83 and the signal processing unit 84 according to the position information set in the route information. The read VOB is separated and reproduced by the AV decoder 85. At this moment, the separated video and sub-picture is displayed on the screen (not illustrated) and the audio output by the audio data is started. If the branch instruction set as a button command is executed during the reproduction of the VOB, branch to the PGC specified by the branch instruction occurs (from Step 135 to Step 131). When reproduction of all the VOB is completed, the post-processing command group is executed (Step 134), and if there is a PGC to be executed next, it is reproduced (from Step 135 to Step 131). The PGC to be reproduced next is specified by the branch instruction in the post-processing command group or the PGC connection information in the PGC information.

Reproduction of the VOB

Figure 27:
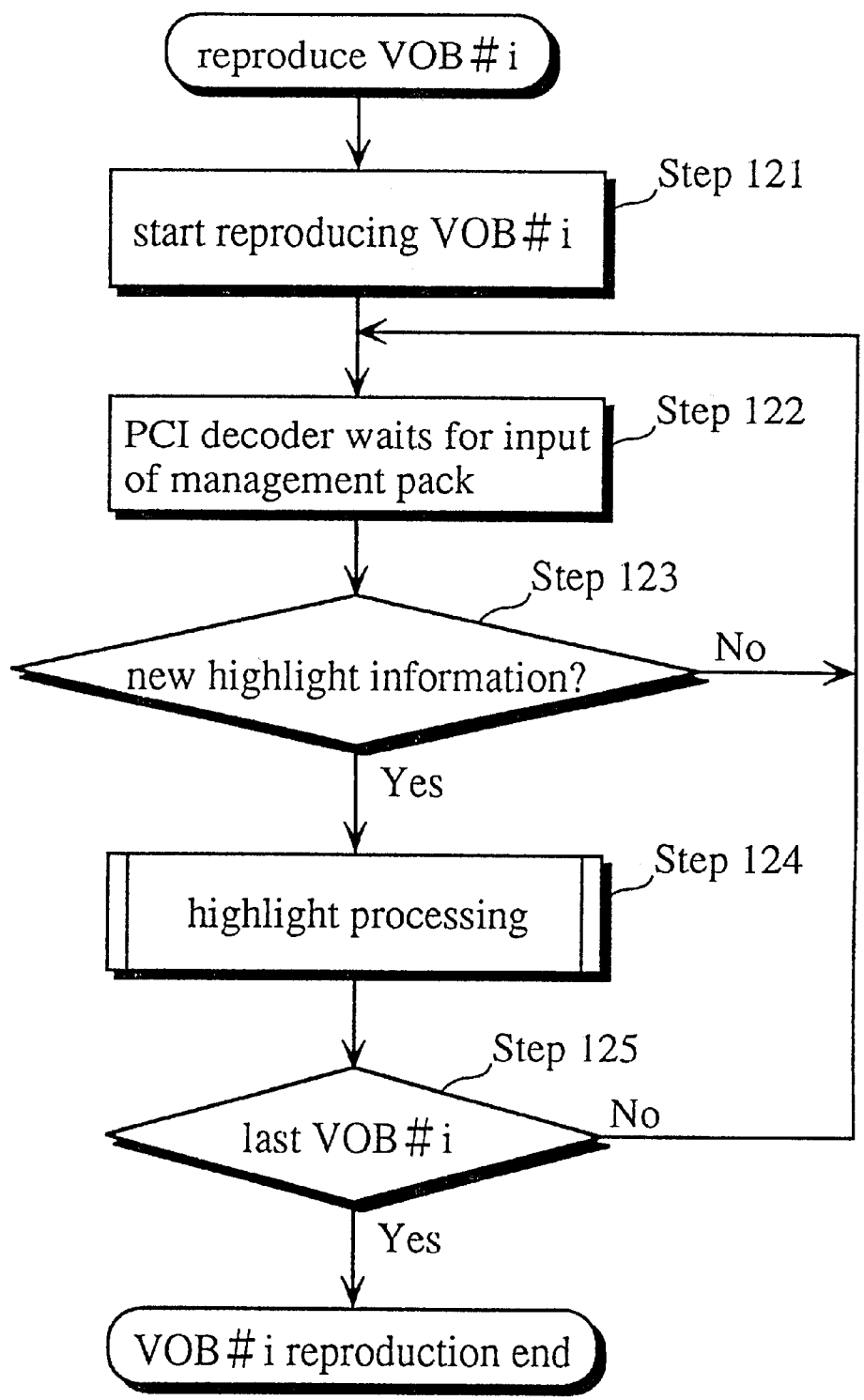
FIG. 27 is a flowchart showing VOB reproduction control processing in FIG. 26.

FIG. 27 is a flowchart showing the reproduction management processing of each VOB (VOB#i) shown by the Step 133#i in FIG. 26.

According to the ith position information in the reproduction information, the system control unit 93 controls the start of the readout from the leading address of the VOB#i (Step i1). After that, the digital data string of the VOB#i is read by the mechanism control unit 83 and the signal processing unit 84. This digital data string is successively inputted into the system decoder 86 via the system control unit 93. The system decoder 86 decodes the digital data string and judges the video pack, sub-picture pack of any channel, audio-pack of any channel, and management pack. And the system decoder 86 outputs them to the video decoder 87, sub-picture decoder 88, audio decoder 89, and the PCI decoder 931 in the system control unit 93, respectively. Then, reproduction of the moving picture, audio, and sup-picture starts. The management pack is inputted into the decoder 931 every 0.5 second.

On being inputted the management pack (Step i2), according to the highlight state shown by FIG. 13, the PCI decoder 931 judges whether new highlight information is set in the management pack (Step i3), and if it is new highlight information, the PCI decoder 931 transfers it to the highlight information analysis unit 932. The highlight information analysis unit 932 creates the button state transfer table from the transferred highlight information. The button control unit 930 carries out the highlight processing in FIG. 28 based on the button state transfer table (Step i4). Here, the highlight processing means the highlight display and the interactive management based on the highlight information.

Moreover, the system control unit 93 waits for the input of the management pack if the digital data string read from the DVD is not the last of the VOB#i (Step i2). In this case, the above processing is repeated. If it is the last of the VOB, the reproduction of the VOB#i is completed. After that, the system control unit 93 determines whether it is the last of the VOB#i or not from the number of all sectors of the VOB#i included in the position information.

Highlight Processing

Figure 28:
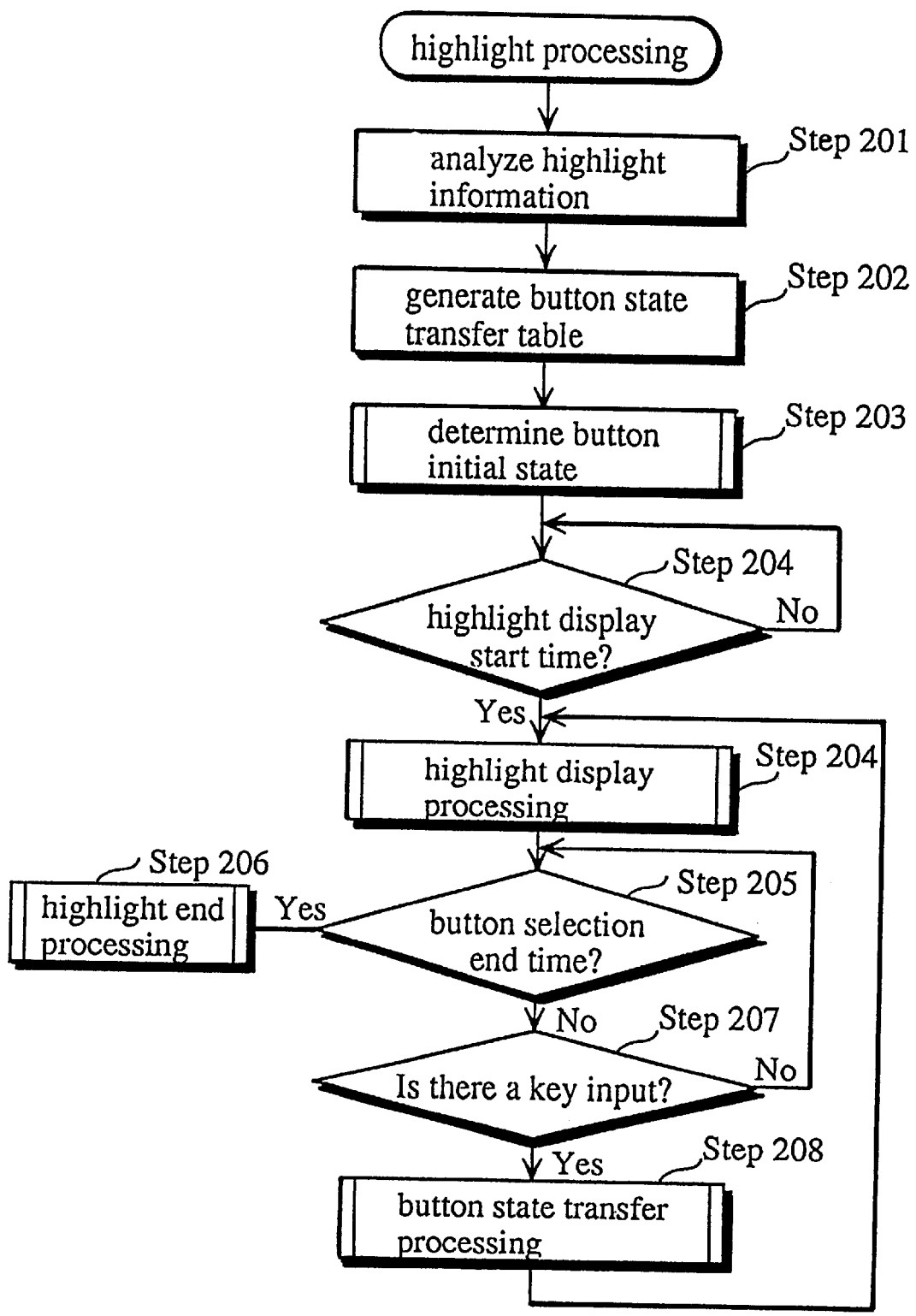
FIG. 28 is a flowchart showing outline of highlight processing in FIG. 27.

FIG. 28 is a schematic flowchart showing the highlight processing mentioned above (Step 124 in FIG. 27).

On being transferred the highlight information from the PCI decoder 931, the highlight information analysis unit 932 analyses the highlight information, creates the button state transfer table in FIG. 23. and stores it in the button state control unit 933 (Steps 201, 202). The button state control unit 933 determines the initial state of the button according to the forcedly selected button number in the highlight information (Step 203: refer to FIG. 29). Furthermore, the button state control unit 933 compares the highlight start time and the system time in the reproduction apparatus. At the highlight start time (Step 204: refer to FIG. 28), the button state control unit 933 carries out the highlight display processing via the highlight display control unit 934. After that, until the button selection end time (Step 205), every time the state transfers according to the user's key operations (Steps 207 and 208: refer to FIG. 33), the button state control unit 933 carries out the highlight display processing, and ends the processing at the button selection end time (Step 206, refer to FIG. 31).

Button Initial State Activation Processing

Figure 29:
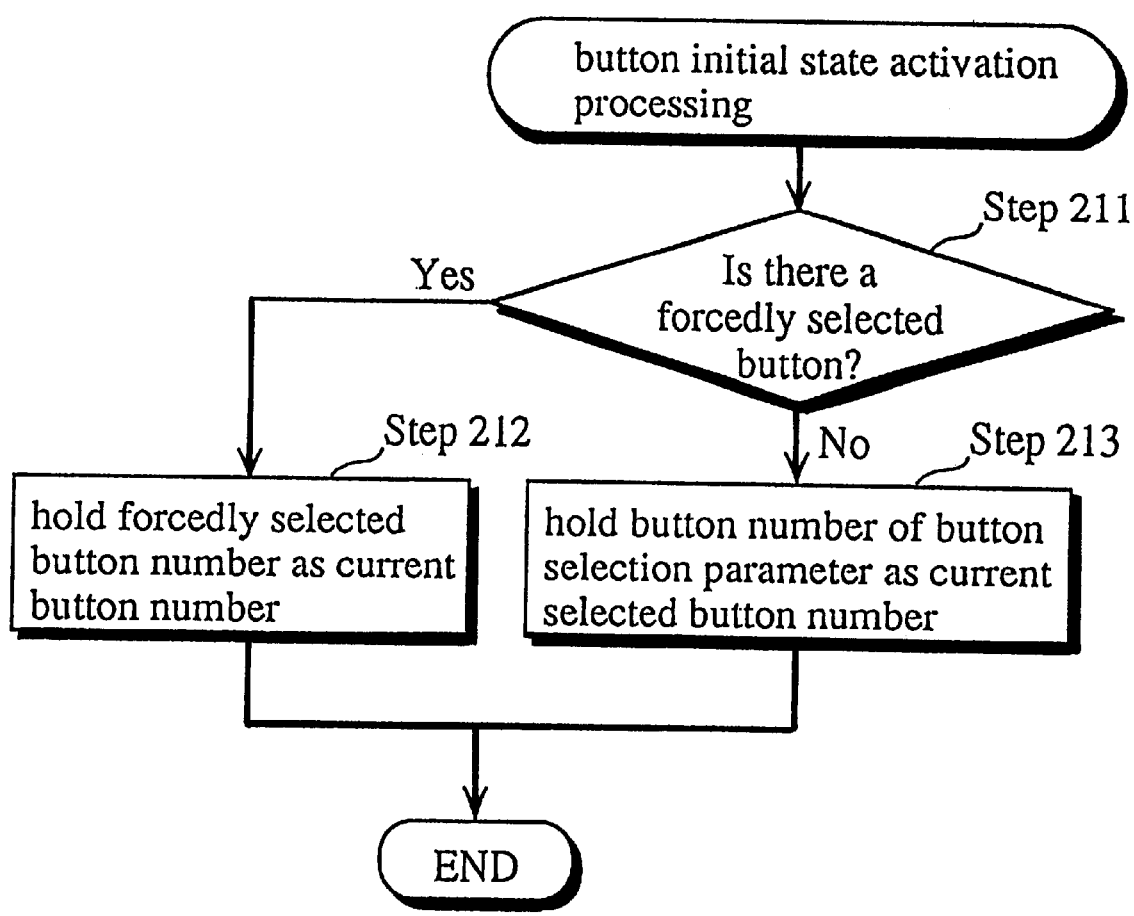
FIG. 29 is a more detailed flowchart showing button initial state activation processing in FIG. 28.

FIG. 29 is a more detailed flowchart showing the button initial state activation processing mentioned above (Step 203 in FIG. 28).

After creating the button state transfer table, if the forcedly selected button number is specified in the highlight information, the button state control unit 933 holds the button number of the current state (Steps 211, 212). If the forcedly selected button number is not specified, the button state control unit 933 holds any of the button numbers (for example, the button number held as the selected state) as the current state (Steps 211, 213).

Highlight Display Processing

Figure 30:
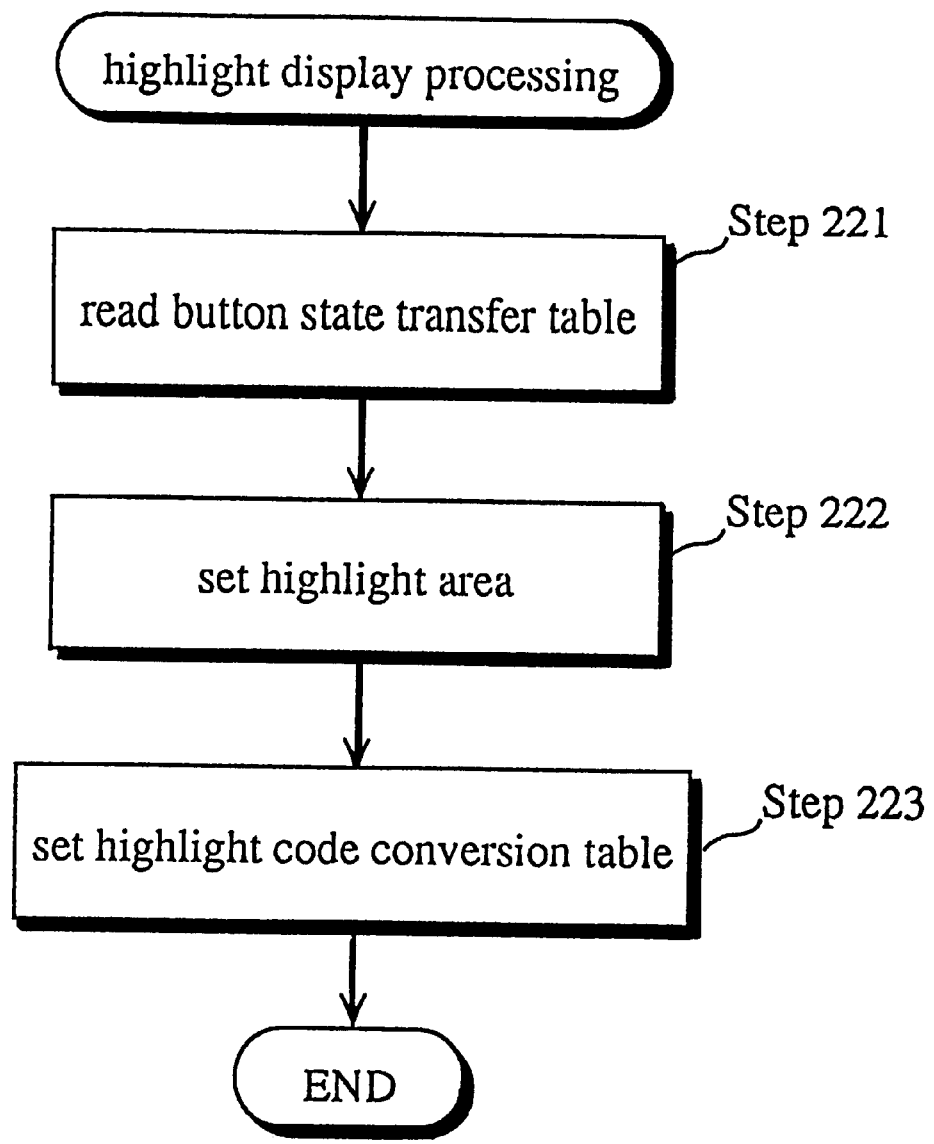
FIG. 30 is a more detailed flowchart showing highlight display processing in FIG. 28.

FIG. 30 is a more detailed flowchart showing the foregoing highlight display processing (Step 204 in FIG. 28).

When the button initial state is determined or the current state changes, the button state control unit 933 reads the highlight area in the button state transfer table that correspond to the current state (button selection number) (Step 221), and sets it in the highlight area management unit 887 in the sub-pictures decoder 88 via the highlight display control unit 934 (Step 222). At the same time, according to the button color number in the button state transfer table, the button state control unit 933 sets the selection color information in the highlight code conversion table 886 in the sub-picture decoder 88 via the highlight display control unit 934 (Step 223). In this way, the sub-picture decoder 88 changes the color of the highlight area of the sub-picture image being displayed.

Highlight End Processing

Figure 31:
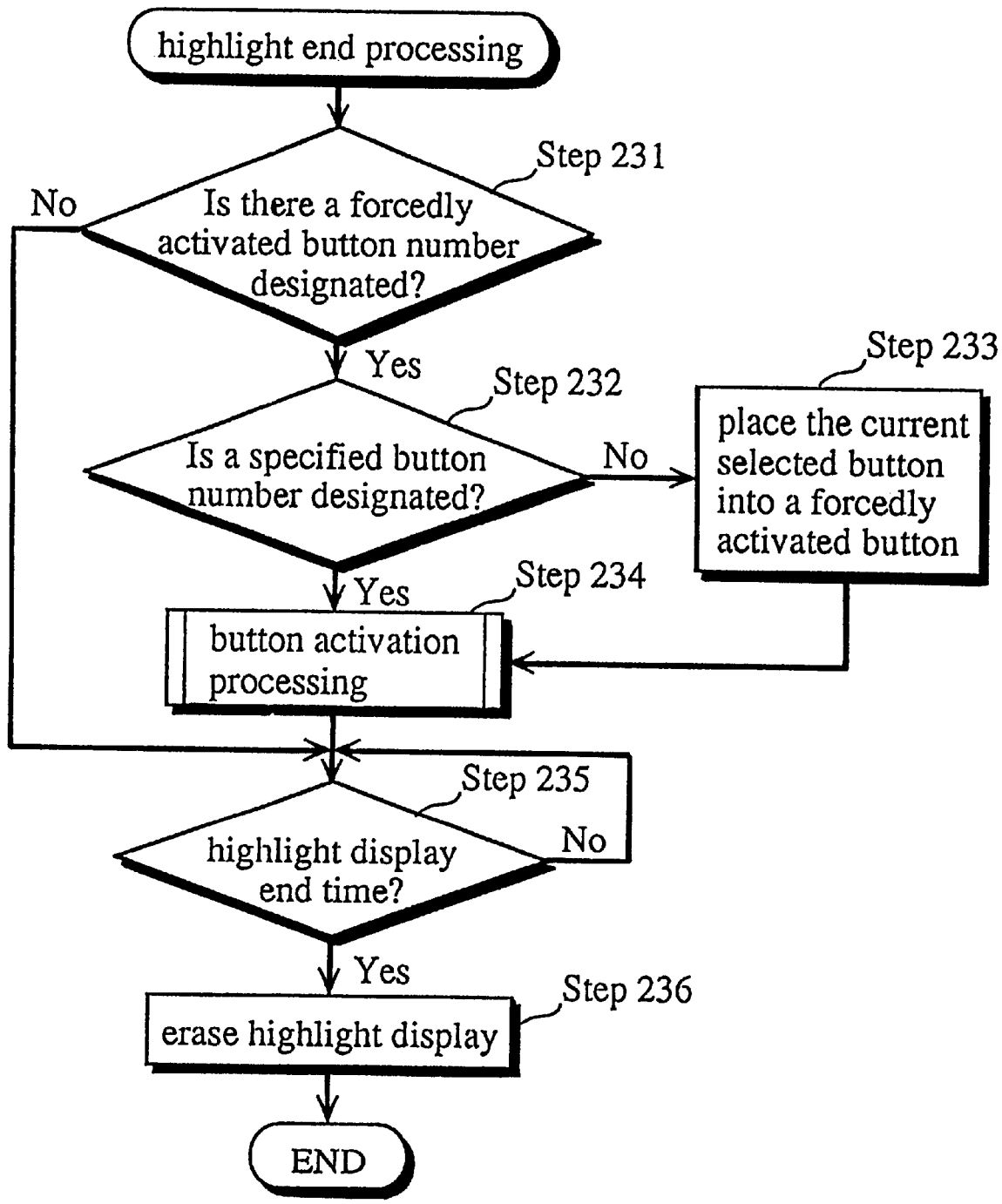
FIG. 31 is a more detailed flowchart showing highlight end processing in FIG. 31.

FIG. 31 is a more detailed flowchart showing the foregoing highlight end processing (Step 206 in FIG. 28).

At the button selection end time, the button state control unit 933 checks whether the forcedly activated button number exists in the PGC information buffer 935a (Step 231). Regarding the forcedly activated button number, if the number is any of 1–36 and 63, it means that a forcedly activated button number exist; if the number is 0, a forcedly activated button number does not exist.

When the forcedly activated button number is invalid (the value is 0), the button state control unit 933 erases the highlight display via the highlight display control unit 934 at the highlight end time (Steps 235, 236).

When the forcedly activated button number is valid (the value is other than 0), the button state control unit 933 puts the button into the activated state if a specific button number from 1–36 is designated, and puts the button in the selected state into the activated state if the button number 63 is designated (Step 233), and carries out the button activation processing (Step 234).

Button Activation Processing

Figure 32:
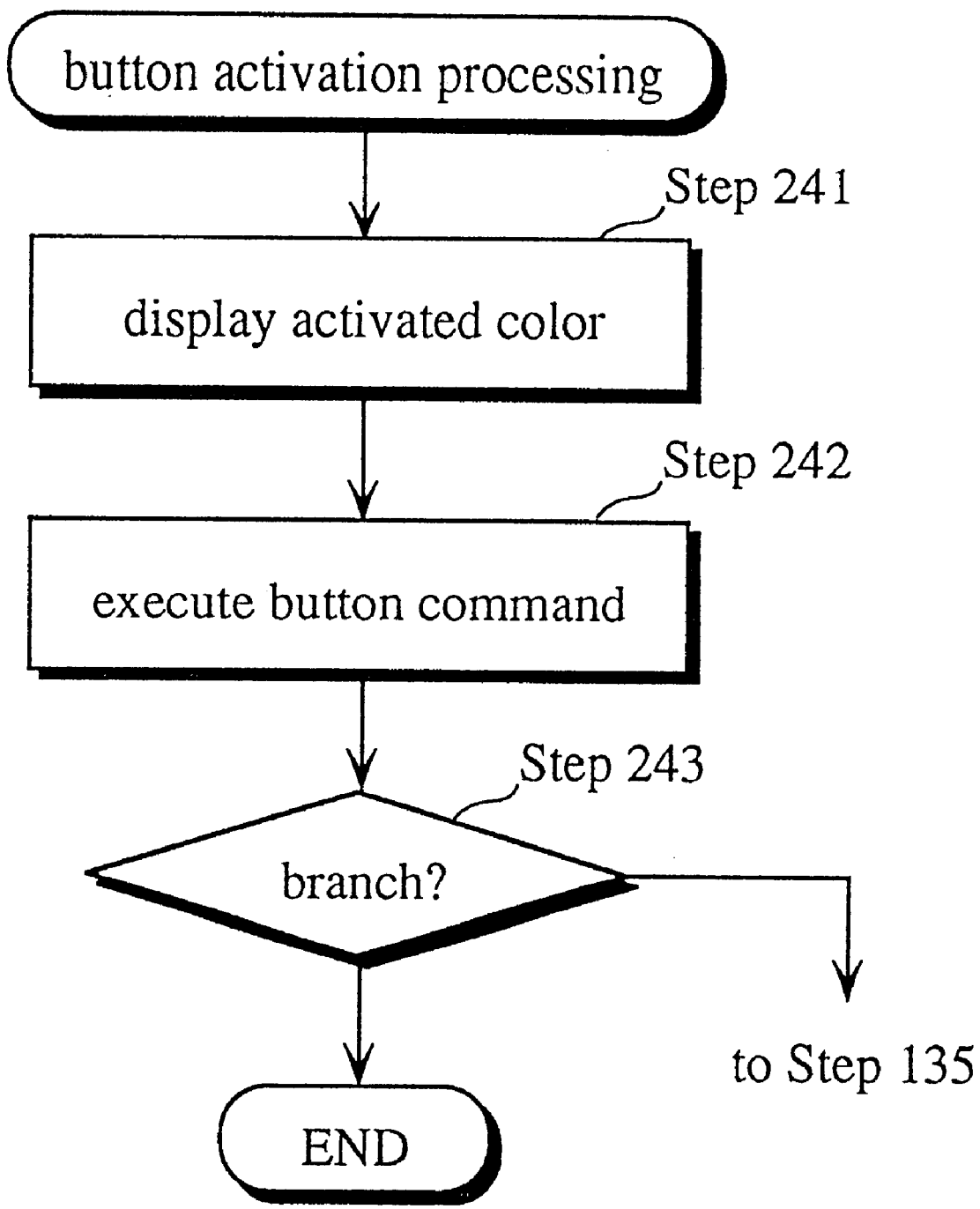
FIG. 32 is a more detailed flowchart showing button activation processing in FIG. 31.

FIG. 32 is a more detailed flowchart showing the button activation processing mentioned above (Step 234 in FIG. 31).

The button state control unit 933 displays the button in the activated state with the activation color via the highlight display control unit 934 (Step 241), reads the button command of the corresponding button from the button state transfer table and makes the command interpretation execution unit 926 carry it out (Step 242). Furthermore, the button state control unit 933 determines whether branch should occur or not due to the execution of the button command (Step 243). If that is not the case (for example, "SetReg", "Random"), the button state control unit 933 ends the button activation processing, and if that is the case (for example, "Link"), goes to Step 135 in FIG. 26 and branches to other PGC.

Button State Transfer Processing

Figure 33:
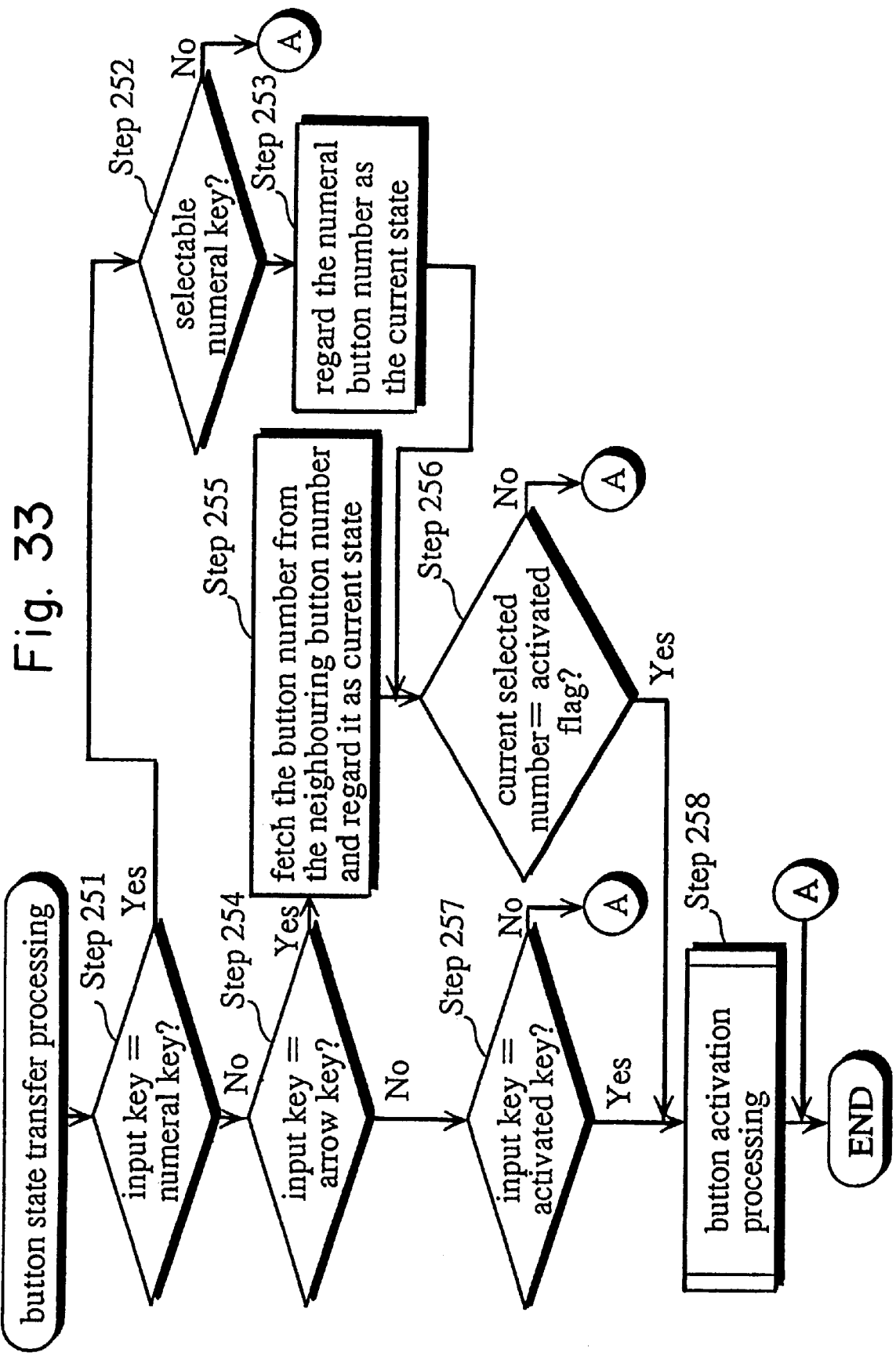
FIG. 33 is a more detailed flowchart showing button state transfer processing in FIG. 28.

FIG. 33 is a more detailed flowchart showing the foregoing button state transfer processing (Step 208 in FIG. 28).

On being inputted a key code from the key input reception unit 938, the button state control unit 933 judges the inputted key from the key code (Steps 251, 254, and 257).

When the input key is a numeral key (Step 251), and the "numeral key allowance" column corresponding to the "current state" in the button state transfer table is YES (Step 252), the button state control unit 933 holds the number as the button number of the selected state (Step 253). For example, in FIG. 23, when the current state is S1 and the numeral key 2 is an input key, the current state is changed to S2. After changing the selected state, if the "selected= activated" column is YES, the button state control unit 933 stores the number of the numeral key as the button number of the activated state (Step 256), and carries out the button activation processing (Step 258).

If the input key is an arrow key (Step 254), the button state control unit 933 fetches the button number of the transfer destination according to the "arrow key transfer information" in the button state transfer table and stores the button number as the selected state (Step 255). If the "selected= activated" column is YES, the button state control unit 933 holds the number of the numeral key as the button number in the activated state (Step 256), and carries out the button activation processing (Step 258).

If the input key is the activated key, the button state control unit 933 holds the button number being stored as the current state as the activated button number (Step 257), and carries out the button activation processing (Step 258).

Call and Return Processing for the System Menu

So far, reproduction management processing of the PGC group, especially, highlight processing, has been explained. Next explanation is about call and return processing regarding the system menu which is called when the MENU key on the remote controller 92 is pressed during the reproduction of the PGC.

Figure 34:
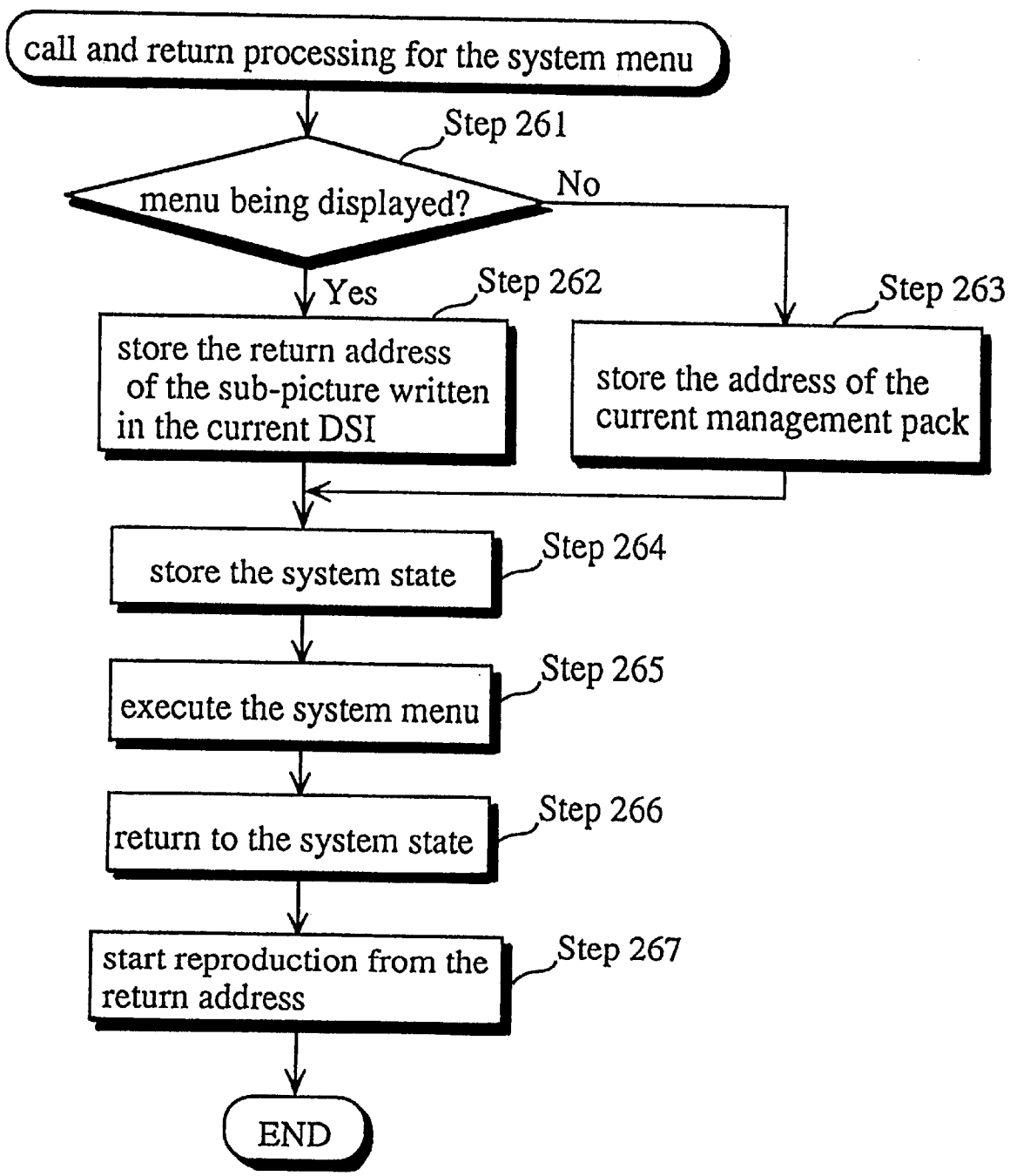
FIG. 34 is a flowchart showing call and return processing of the system menu.

FIG. 34 is a flowchart showing call and return processing for the system menu.

When the MENU key is pressed, the reproduction control unit 937 determines whether the menu by the sub-picture data is being displayed or not (Step 261). If so, the reproduction control unit 937 stores the return address of the sub-picture data set in the DSI packet of the management pack into the buffer memory in the system state management unit 935 (Step 262). Whether the menu by the sub-picture data is being displayed or not can be determined by judging whether the system time is within the highlight section (from the highlight start time to the highlight end time). That is because if the menu image is realized by the sub-picture data in the VOBU prior to the current VOBU, in order to resume the current menu display, it is necessary to resume the reproduction from the leading sub-picture data, not from the sub-picture data in the same VOBU as the current management pack.

If the menu is not being displayed, the reproduction control unit 937 stores the current VOBU start address into the buffer memory in the system state management unit 935 (Step 263).

Furthermore, the reproduction control unit 937 stores the system state showing the current reproduction state (Step 263). This system state includes the button number in the selected state.

After that, the reproduction control unit 937 manages the reproduction of the system menu (Step 265). The management of the reproduction of the system menu is the same as the one of the PGC group shown in FIG. 26. If the user, again, presses the MENU key on the system menu being displayed, the reproduction of the system menu is over. Then, the reproduction control unit 937 returns to the system state (Step 266), and resumes the reproduction from the return address (Step 267).

Operations

The operations of the multimedia optical disc and its reproduction apparatus can be explained as follows.

Example of a Forcedly Activated Button

Figure 35:
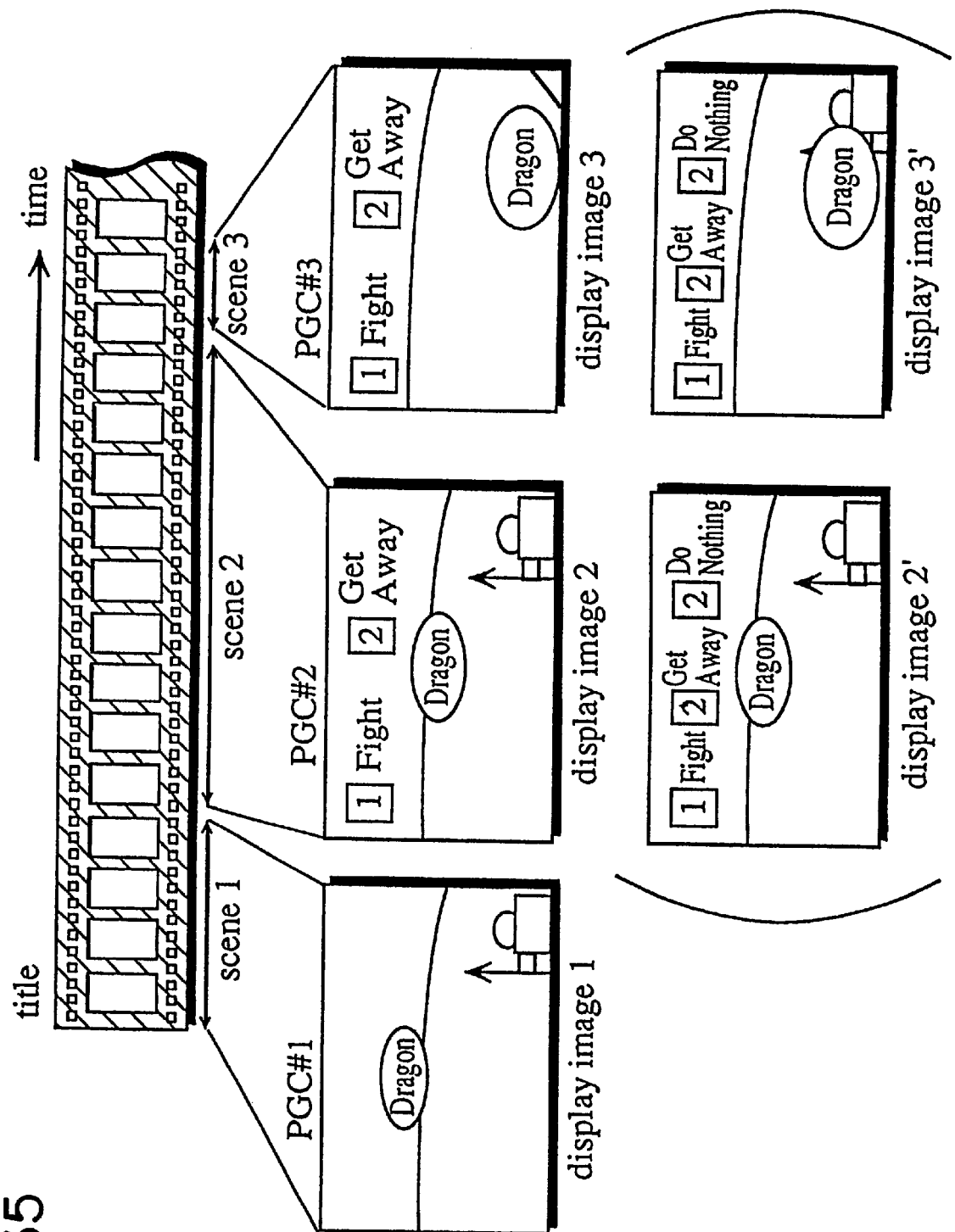
FIG. 35 is an example of an interactive title.

Here is an example of an operation in which forcedly activated button is used. FIG. 35 is a title example of an interactive application in which a dragon and a knight fight with each other. The scene 1 by the PGC#1 shows a display image 1 in which a knight encounters a dragon. The scene 2 by the PGC #2 shows a display image 2 in which a menu by the sup-picture data is superimposed. The scene 3 by the PGC#3 shows a display image 3 in which the knight gets away. For the explanatory reason, also in this example, each PGC is supposed to be one VOB.

The sub-picture data in the PGC#2 is a menu image composed of a "1—Fight" button and a "2—Get away" button. For the button command of the "1—Fight" button, "Link" instruction to the PGC (not illustrated) for showing the fighting scene is set. For the button command of the "2—Get Away" button, "Link" instruction to the PGC#3 showing the scene 3 is set. Furthermore, in this example, "63" is set as the forcedly activated button in FIG. 13. The forcedly activated button number "63" means that the current button in the selected state is forcedly activated. If the user does not press the activation key until the button selection time even if he/she had pressed "2—Get Away" in the scene 2, the reproduction control unit 937 places the "2—Get Away" button in the selected state into the activated state. Then, scene 3 is reproduced.

A title creator can determine which button should be the forcedly activated button depending on the development of the story, contents of the scene, and menu items. In the foregoing example, the "activation button" is activated based on the user's selection state. However, there are cases in which the reproduction can proceed more effectively if the title creator directly designates the activated button number.

The following is an example, which is shown in the lower row of FIG. 35. The scene 2 by the PGC#2 shows the display image 2' in which a menu is superimposed, the menu comprising the "1—Fight" button, "2—Get Away" button, and "3—Do Nothing" button. The scene 3 by the PGC#3 is the branch destination when the "3—Nothing" button is selected in the PGC#2. What is displayed on the scene is a dragon coming closer to the knight. If a direction of a story which should continue after the "3—Do Nothing" button is desired in the scene 2, what is necessary is to set the forcedly activated button number for the menu in the PGC#2 as "3". In this way, even if there is no activation operation by the user, the scene 2 changes to the scene 3. As a result, even if the user is not interested in pursuing the course of story, effective story development can be realized.

The next explanation is about the case in which hidden buttons exist other than the MENU button in the foregoing PGCs#1–#3 in FIG. 35. The hidden buttons do not necessarily appear on the screen. In all scenes, the same function is allocated to the hidden button. For example, a map button and status button exist as hidden buttons. The map button is a button for calling a map of the adventure world in which the warrior lives. The status button is a button for calling images which display parameters such as physical strength of the knight and points of the game.

In this case, it is determined that the numeral key of the map button is "7" and the one of the status button is "8". These are realized by the button information shown in FIG. 14. In other words, the "LINK" command to the PGC for displaying the foregoing map should be set in the button information 7 shown in FIG. 14, and the "LINK" command to the PGC for displaying the foregoing status should be set in the button information 8. In addition to that, if a "selected=activated" flag in the button information 7 and the one in the button information 8 are set, the user can see the map or the status by pressing the numeral key. Return to the original scene from the map or the status can be realized by the return address shown in FIG. 13.

Moreover, it is possible to determine that the map button and the status button are selected only by numeral keys, prohibiting selection by arrow keys. In such a case, the buttons 7 and 8 should not be set for any neighboring button in the button information in FIG. 13. Then, hidden buttons will not be selected by arrow keys. In other words, buttons not being displayed on the screen will not be placed into the selection state.

Also, the following setting may be possible. "2—Get Away" may be set as an initially selected button. A "selected-activated" flag may be set for each of "1—Fight" and "3—Do Nothing". Then, when the display image 2' is displayed, the user can immediately enjoy the next scene by pressing down the left arrow key or right arrow key which gives a lot of excitement and realism the the story.

An another setting as follows may be possible. The map button, status button, "Fight" button, "Get Away" button, and "Do Nothing" button may be set for "1", "2", "3", "4", and "5" in the button information, respectively, and the "numeral selection possible button number" may be set as "2". In this case, the hidden map button and status button can be selected by a numeral key. The "Fight" button, the "Get Away" button, and the "Do Nothing" button can be selected only by the right arrow key or the left arrow key.

Operation Examples of Selection, Activation, "Selected=Activated"

Figure 36:
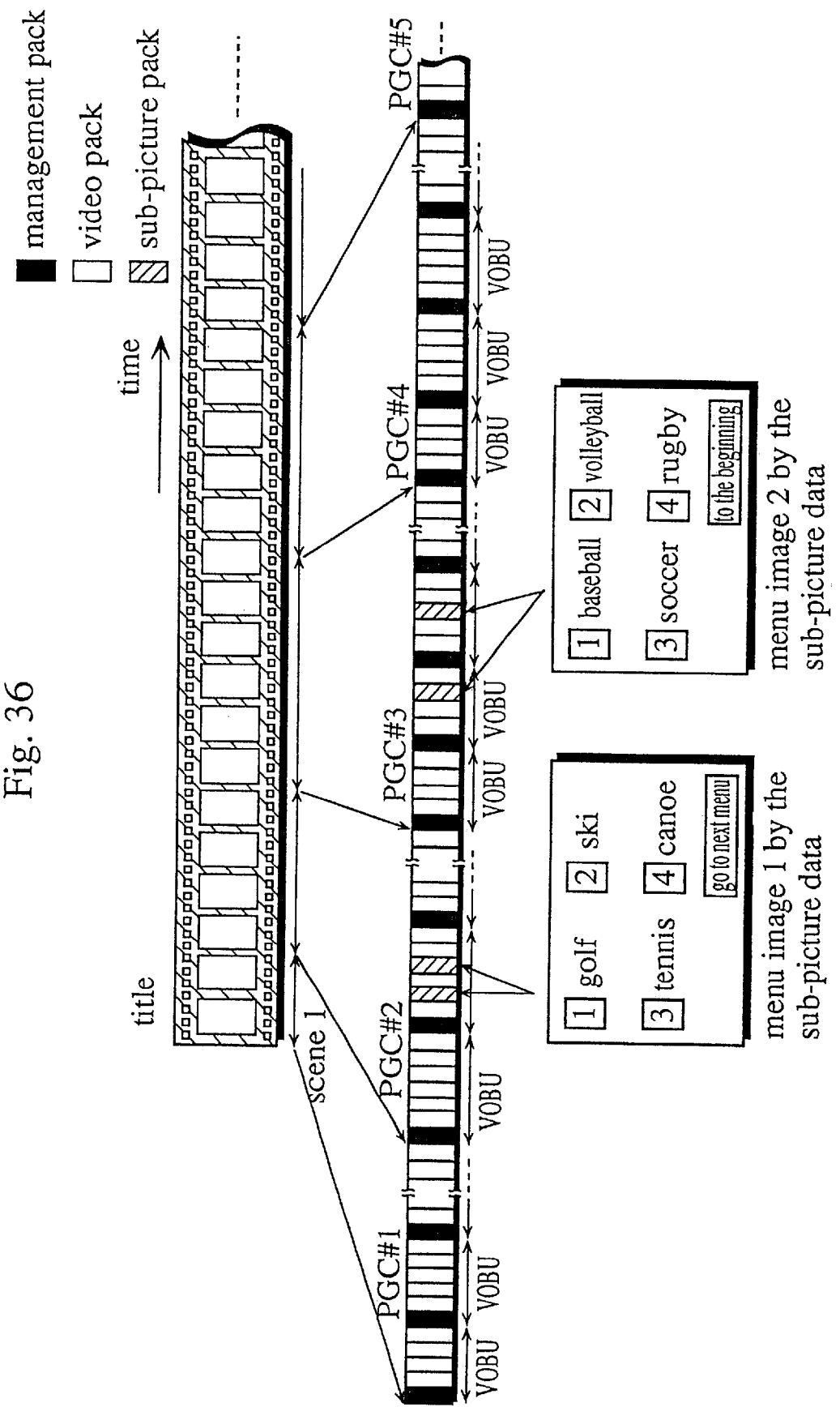
FIG. 36 is an example of an interactive title.

FIG. 36 is an example of a title. This title is an example of an interactive application which introduces various sports, the title comprising the PGC#1, #2, #3 . . . In order to understand the example readily, each PGC is supposed to be constituted by one VOB. The scene 1 by the PGC#1 is the introductory part of this title. The scene 2 by the PGC#2 is the part which appeals the fun of golf and ski. The scene 3 by the PGC#3 is the part which appeals the fun of baseball and volleyball. The PGCs after the PGC#4 introduce what each of the sports is. In each PGC in the figure, the white part shows video data, black part shows the management pack, and the slanting-line part shows the sub-picture data. The PGC #1 does not need a menu image, so there is no sub-picture data.

The PGC#2 has sub-picture data for showing image data of menu image 1 in the second VOBU. The management pack in the same VOBU stores the highlight information corresponding to the menu image 1. This menu image 1 is the same as the one in FIG. 12. The button state transfer table created from the highlight information is the same as the one in FIG. 23. The highlight section (from the highlight start time to the highlight end time) is from the start of the third VOBU reproduction to end of the PGC#2 reproduction. In the VOBUs after the third VOBU in the PGC#2, the highlight state in the highlight information is "10"; in other words, it is the same highlight information as the one of the preceding management pack. In this case, after the second VOBU reproduction in the PGC#2, the menu image is superimposed onto the video data being displayed. During that display, the user's operations by the highlight processing is possible.

As the menu image 1 is managed by the button state transfer table in FIG. 23, transfer of the button selection by an arrow key is prohibited for upward movement concerning the buttons 1 and 2, and downward movement concerning the button 3. This is because "0", which shows prohibition of transfer of the button selection, is set for the neighboring button information shown in FIG. 14 (more specifically, for the button number above the button 1 and button 2, respectively, and the button number below the button 3).

In FIG. 23, the "button 5" for showing the next menu is stored as an entry of the "button 4 in the selected state" and "'downward movement' of the arrow key transfer information". The column of "numeral key allowance" shows that the buttons 1–4 can be selected with numeral keys by the numeral key allowance flag, but the button 5 can be selected only with the downward movement of the arrow key from the button 4. In other words, the buttons 1–4 are used for continuing development of the story, and the button 5 is used for switching page menus. Therefore, it is possible to use operation keys on the remote controller according to the contents of the menu and meaning of the buttons for every scene.

Moreover, in the "selected=activated" column, only the button 5 has "yes". By the downward movement of the arrow key from the button 4 in the selected state, the activation processing automatically starts. At this time, "Link PGC#3" set as a button command of the button 5 is executed. In this way, without pressing down the activation key, it is possible to branch to the scene 3 from the middle of the reproduction of the scene 2. Therefore, when the "selected=activated" flag is set, the reproduction apparatus substitutes the operation of pressing down the activation key. The "selected=activated" state flag is a set of auxiliary management data for substituting the user's operations.

In the buttons 1–4, branch instruction to different PGCs (Link instruction) are stored, which makes it possible to realize interactive branch to the image desired by the user.

Call of a System Menu and Return

Figure 37:
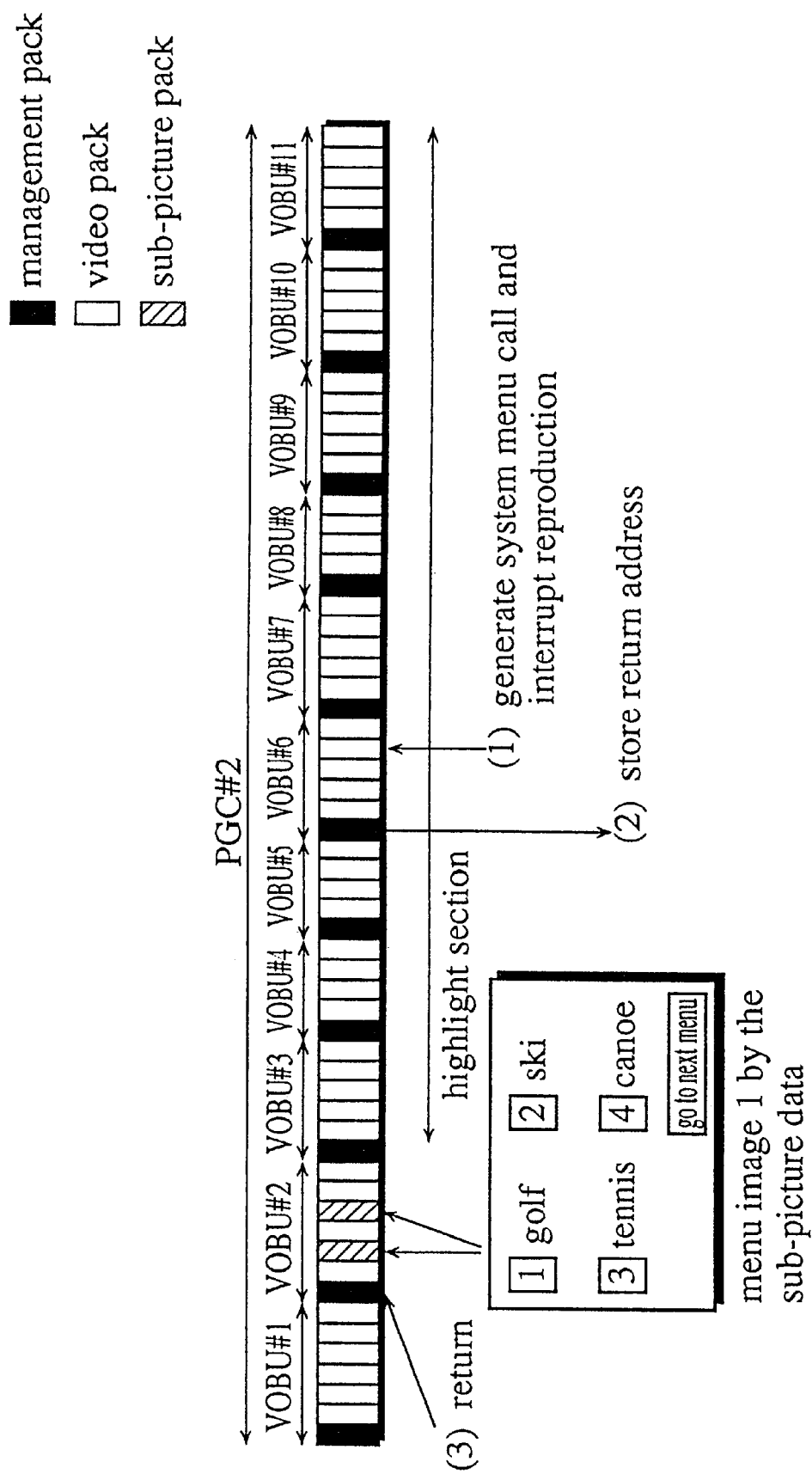
FIG. 37 explains a program chain.

The following explanation is about operations for calling the system menu and returning to the original scene during the reproduction of the PGC#2 in FIG. 36. FIG. 37 shows only the PGC#2 in FIG. 36. In FIG. 37, for the explanatory convenience, the PGC#2 is supposed to be made of one VOB.

In VOBU#2, the menu image 1 by the sub-picture data is stored in the sub-picture pack. In this case, as shown by (2), a DSI packet in each management pack in the highlight section stores a start address of the VOBU #2 shown by (3) as return address.

Here, suppose that at (1) in FIG. 37, in other words, during the reproduction of the VOBU#6, the MENU key on the remote controller is pressed.

At this time, the reproduction control unit 937 interrupts the reproduction of the PGC#2, and as it is in the highlight section, stores the return address set in the DSI packet in the management pack of the VOBU#6 into the buffer memory in the system state management unit 935. This return address is the start address of the VOBU#2. Moreover, the reproduction control unit 937 stores the system state such as the button number being in the selected state at that time.

After that, the reproduction control unit 937 controls reproduction of the system menu.

When the system menu is completed, the reproduction control unit 937 returns to the original system state, and resumes the reproduction from the VOBU#2 specified by the return address.

As mentioned above, even if the sub-picture data is prior to the highlight section or stored at the leading of the highlight section, after temporarily calling the system menu during the reproduction of the highlight section, it is possible to return to the menu which was displayed when the reproduction was interrupted.

As is already explained, the multimedia disc and its reproduction apparatus of the present embodiment readily realize responsive interactiveness.

In the present embodiment, even if there is no user's branch designation by the user in the middle of reproduction, automatic branching occurs so that a menu which does not interrupt the course of interruption can be realized.

In the present embodiment, when there is no activation operations by the user, the button being selected by the user at that time is automatically activated so that the reproduction keeps going on. Moreover, the automatic activation button can be a button which is pre-activated by an application creator or can be a button selected by a user. In the present embodiment, by setting two types of buttons, one of which can be selected by numerals and the other cannot, misoperations by the user can be prevented. Even if all the buttons are simply managed by button numbers, due to this function, numeral keys and arrow keys can be jointly used for input.

In the present embodiment, by setting a "selected= activated" flag, it is possible to reduce the two-fold operations comprising selection and activation into a single operation.

The present embodiment makes it possible to reproduce a system menu or other applications in the course of the reproduction of an interactive application.

The highlight information in the present embodiment can be categorized into two types in view of the functions: button management data for responding to the user's operation applied onto the button on the menu; and auxiliary management data for substituting the user's operations applied onto the menu. The examples of the auxiliary management data are the button selection end time, the forcedly activated button number, the numeral selection possible button number, and the sub-picture return address that are shown in FIG. 13, and the "selected=activated" flag in FIG. 14. The button management data corresponds to other highlight information.

In the present embodiment, numeral keys are used for selecting buttons, but they can be used for determining buttons. In such a case, in the flow in FIG. 33, Step 258 (activation processing) should start right after Step 253. At this time, in the auxiliary management data, the numeral selection possible button number should be regarded as the numeral activation possible button number. Moreover, the "selected=activated" flag works only for arrow keys (refer to FIG. 33). Moreover, if all the numeral keys are the buttons which can be activated by numerals, there will be a huge damage when the user misoperates the buttons, because the buttons selected by the user will be immediately put into the activated state. Therefore, by setting the numeral selection possible button number, in other words, by distinguishing the buttons which can be activated by the numerals with other buttons, the damage can be reduced.

In the present embodiment, each of the buttons which can be selected by numeral keys is assigned the button number out of the numeral range from "1" to "the numeral selection possible button number". However, other methods of setting the buttons may be possible. For example, it is possible to set an offset value in the highlight general information. If the offset value is "3" and the numeral selection possible button number is "5", the five buttons having "4" to "8" can be selected by numerals.

In the present embodiment, the optical disc is a DVD. However, as long as a large amount of digital moving picture data can be stored, other media can substitute for the DVD. Moreover, the same effects as the ROM can be obtained from an EPROM.

The media do not necessarily have to be information storage media like optical discs. So long as image information and its control information can be interleaved into the medium, the media may be wireless transmission media like broadcasting or wired transmission media like a communication line. Here, examples of the transmission media are telephone lines, internet, LAN, and satellite broadcasting. As the video objects of the present embodiment are a type of MPEG data called "system stream", in the case of the above mentioned transmission media, the video object will be transferred as transport stream into which the system streams are multiplexed.

In the present embodiment, a video object stored in a different position on the disc is selected as the branch destination in the menu. On the other hand, in the case of the transport stream, what is selected as the branch destination is an other system stream which is multiplexed into the transport stream. In this case, instead of the motor 81, the light pickup 82, and mechanism control unit 83, the reproduction apparatus should have a reception unit for receiving the transport stream.

In the present embodiment, the digital moving picture data under MPEG2 is used for the moving picture data. However, other kinds of moving picture data such as the digital moving picture data under MPEG1 and the digital moving picture data with a conversion algorithm other than DCT (Discrete Cosine Transform) under MPTEG may be used as far as the moving picture data can be the multimedia data with the audio data and the sub-picture data.

In the present embodiment, while the menu by the sub-picture data is being displayed, branch to the system menu occurs by the user's pressing down the MENU key, and return to the original menu display occurs by the user's same operation. The call of the system menu may occur while a caption by the sub-picture data is being displayed. In such a case, Step 261 in FIG. 34 determines whether the caption by the sub-picture is being displayed or not.

In the present embodiment, the management packs are included in every GOP, which is the unit of reproducing moving picture data. However, if the method for compressing digital moving pictures changes, the unit of the management information pack changes according to the compression method.

In the present embodiment, the return address of the sub-picture data was stored in the DSI packet. However, it can be stored in the PCI packet.

The management packs for storing highlight information should not necessarily be included in every VOBU. They should be included in, for example, every $\frac{1}{30}$ second of picture frame unit, which is smaller synchronous unit of picture reproduction than 0.5–1.0 second.

In the present embodiment, one VOBU includes one GOP. However, one VOBU can include a plurality of GOPs. In order to realize interactiveness characterized by excellent responsiveness, reproduction time of the moving pictures should be less than one or two seconds. In this case, the management pack is placed at the lead of the GOPs, storing effective reproduction management information for the GOPS.

Method of Producing an Optical Disc

The following is a simplified explanation of the construction of an optical disc in the embodiment of the present invention.

Figure 38:
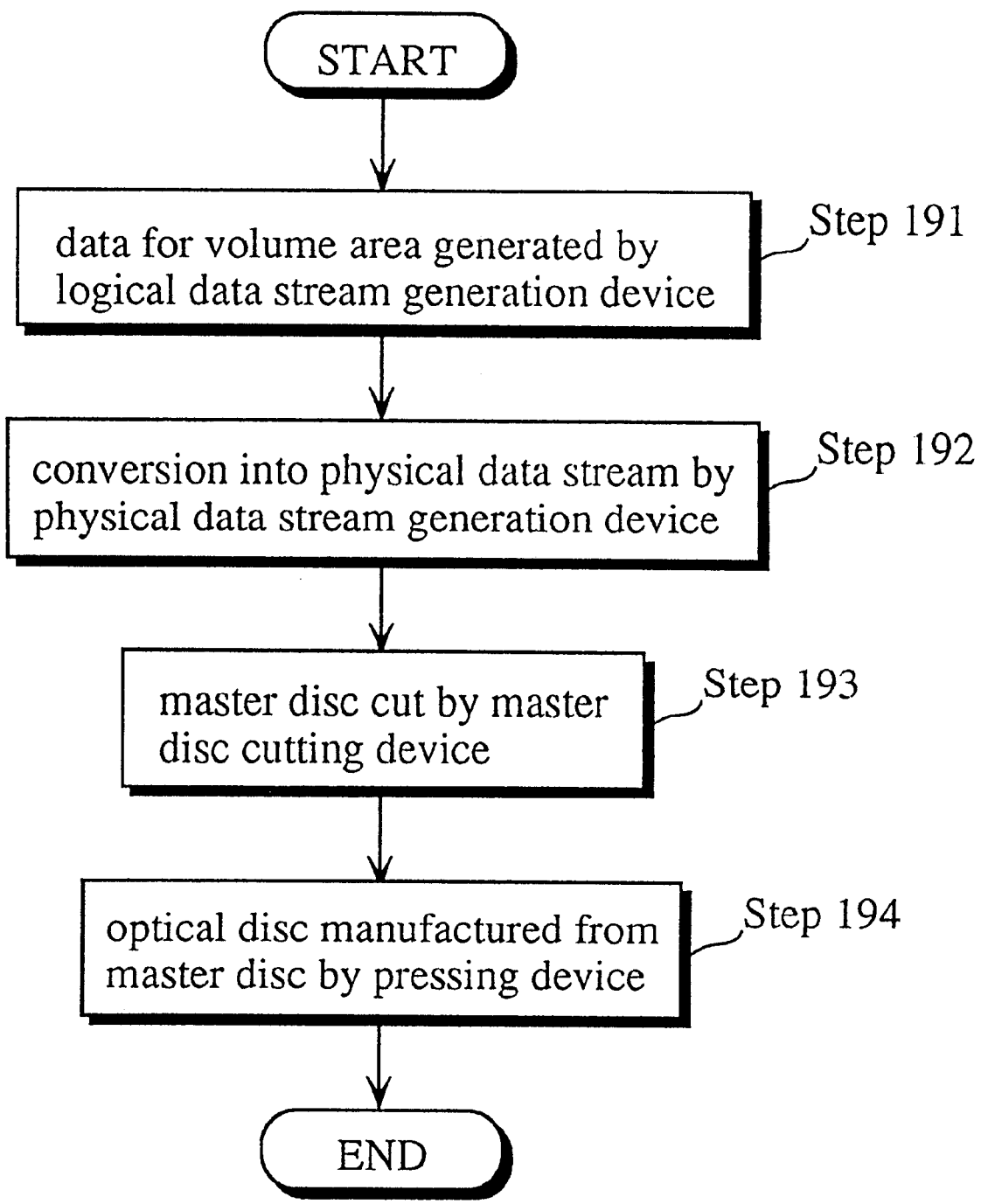
FIG. 38 is a flowchart showing production method of an optical disc.

FIG. 38 shows a flowchart for the manufacturing process of the optical disc in the present embodiment.

First, the data in the volume area shown in FIG. 6 is generated by a logical data stream generation apparatus (Step 191). This logical data stream generation apparatus uses multimedia data editing software on a personal computer or workstation and can generate volume data of the data construction shown in FIG. 6. This volume data is recorded onto a transfer medium, such as magnetic tape, and is then converted into a physical data stream by a physical data stream generation apparatus. (Step 192). This physical data stream includes an ECC (error checking code), data for the lead-in region, data for the lead-out region and the like, in addition to the volume data. A master disc cutting process then cuts a master disc for the optical discs using this physical data stream (Step 193). Finally, optical discs are manufactured from the master disc by a pressing apparatus.

Conventional CD manufacturing machines may be used for manufacturing the above-constructed optical disc except a part of logical data sequence related to the data construction of the present invention. Concerning this point, please refer to Heitaro Nakajima and Hirosi Ogawa: Compact Disc Dokuhon, Ohmu Ltd. and Applied Physics Society Optics Meeting: Optical Disc System, Asakura Shoten.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A reproduction apparatus for reproducing an optical disc comprising a data area for storing a plurality of objects, each having sub-picture data and moving picture data, wherein the data area includes a plurality of small areas, each of which includes a first sub-area and a second sub-area, with the object in the data area being stored over consecutive small areas;

the first sub-area stores the moving picture data having a predetermined reproduction time period and the sub-picture data that is reproducible within the same time period, the sub-picture data being a menu image which includes a plurality of items for display; and the second sub-area stores control information including item control data for responding to a user's operation applied onto a menu image reproduced in the first sub-area in the same small area and auxiliary control data for substituting for a user's operation when the user does not select an item on the menu image, the reproduction apparatus comprising:

readout means for reading data on the optical disc;

reproduction means for reproducing the moving picture data and sub-picture data in the first sub-area read by the readout means and outputting the moving picture data and sub-picture data as a video signal for display;

reception means for receiving a user's operation applied onto the menu image;

first control means for responding to the user's operation according to the item control data read from the second sub-area by the readout means; and second control means for substituting for the user's operation according to the auxiliary control data read from the second sub-area by the readout means, wherein the sub-picture data in the first sub-areas in a predetermined section of the object constitutes a still image; and the auxiliary control data includes address information which shows a storage position of the first small area in the predetermined section in order to return to the still image data after a branch to another object occurred, the first control means comprising:

holding means for holding item number, selection color, activation color, command for each item, end time, and forced item number by analyzing control information every time the second sub-area is read by the readout means;

item control means for controlling a change of state of each item according to a user's operation received by the reception means;

item display control means for instructing the reproduction means on the selection color and the activation color of the item on the menu image; and execution means for executing the command of the item placed into the activated state, and the second control means comprising:

detection means for detecting when the user's operation received by the reception means is a designation of a temporary reproduction of another object;

call means for storing the address information and designating the reproduction means to reproduce the other object when the reproduction designation is detected; and resume means for resuming reproduction of the still image object based on the stored address information after the reproduction of the other object is completed.

2. A reproduction apparatus for a disc having a data region for storing data, including a plurality of video objects, each video object having a plurality of data units, which include moving picture data, sub-picture data and control data to be effective within a time period in which the corresponding moving picture data is reproducible, the sub-picture data including a menu image; and the control data including address information, which shows a storage position of an initial data unit out of the plurality of data units, necessary to provide the menu image, when the menu image is displayed and a branching operation is performed from the menu image, the address information is different than a branch address from where the branch operation is initiated, the reproduction apparatus comprising:

a reading member for reading the data from the disc;

a memory for storing the read data;

a reproduction member for reproducing the moving picture data and sub-picture data read by the reading member and outputting the moving picture data and sub-picture data as a video signal for display;

a receiving member for receiving a user's input in response to the menu image; and a control member comprising:

a detection member for detecting when a branch operation, from a present display of the menu image, to a temporary reproduction of another object is received;

a call member for storing the address information to provide the menu image and designating the reproduction member to reproduce the other object when the branch operation is detected; and a resume member for resuming reproduction of the menu image based on the stored address information after the reproduction of the other object is completed.

3. A reproduction apparatus for reproducing from a disc, a data stream, including a plurality of video objects, each video object having a plurality of data units, which include moving picture data, sub-picture data an control data to be effective within a time period in which the corresponding moving picture data is reproducible, the sub-picture data including a menu image; and the control data including address information which shows a storage position of an initial data unit out of the plurality of data units on the disc, necessary to provide the menu image, when the menu image is displayed and a branching operation is performed from the menu image, the address information is different than a branch address from where the branch operation is initiated, the reproduction apparatus comprising:

an input member for inputting the data from the disc;

a memory for storing the input data stream;

a reproducing member for reproducing the moving picture data and sub-picture data read by the input member and outputting the moving picture data and sub-picture data as a video signal for display; and a receiving member for receiving a user's input;

a control member comprising:

a detection member for detecting when a branch operation, from a present display of the menu image, to a temporary reproduction of another object is received;

a call member for storing the address information to provide the menu image and designating the reproduction member to reproduce the other object when the branch operation is detected; and a resume member for resuming reproduction of the menu image based on the stored address information after the reproduction of the other object is completed.

4. The reproduction apparatus of claim 3, wherein the detection member determines when a menu image is currently being displayed when a branch operation is detected and the call member stores the address information from a management pack of the video object.

5. The reproduction apparatus of claim 4, wherein the control information includes highlight data and the status of a present display of the menu image is determined with comparison of the highlight data and a system time.

6. A method for reproducing data from a disc, the data including a plurality of video object, each video object having a plurality of data units, which include moving picture data, sub-picture data and control data to be effective within a time period in which the corresponding moving picture data is reproducible, the sub-picture data including a menu image and the control data, including address information which shows a position of an initial data unit out of the plurality of data units on the disc, necessary to provide the menu image, when the menu image is displayed and a branching operation is preformed from the menu image, the address information is different than a branch address from where the branch operation is initiated, the method includes the steps of:
reading the data from the disc;
decoding the data including the initial data unit to reproduce a menu image;
receiving a user input in response to the menu image;
branching to another image in response to the user input during reproduction of an object other than the initial object;
storing the address information necessary to provide the menu image which is different than a branch address from where the branch operation is initiated upon execution and return from the branching operation; and
and resuming reproduction of the menu image based on the stored address information.

7. A reproduction system for reproducing interactive moving picture images comprising:

a recording medium comprising a data area for storing a plurality of objects, each having sub-picture data and moving picture data, wherein the data area includes a plurality of small areas, each of which includes a first sub-area and a second sub-area, with the object in the data area being stored over consecutive small areas;

the first sub-area stores the moving picture data having a predetermined reproduction time period and the sub-picture data that is reproducible within the same time period, the sub-picture data being a menu image which includes a plurality of items for display;

the second sub-area stores control information including item control data for responding to a user's operation applied onto a menu image reproduced in the first sub-area in the same small area and auxiliary control data for substituting for a user's operation when the user does not select an item on the menu image; and a reproduction apparatus comprising:
readout means for reading data on the recording medium, reproduction means for reproducing the moving picture data and sub-picture data in the first sub-area read by the readout means and outputting the moving picture data and sub-picture data as a video signal for display;

reception means for receiving a user's operation applied onto the menu image;

first control means for responding to the user's operation according to the item control data read from the second sub-area by the readout means; and second control means for substituting for the user's operation according to the auxiliary control data read from the second sub-area by the readout means, wherein the sub-picture data in the first sub-areas in a predetermined section of the object constitutes a still image; and the auxiliary control data includes address information which shows a storage position of the first small area in the predetermined section in order to return to the still image data after a branch to another object occurred, the first control means comprising:
holding means for holding item number, selection color, activation color, command for each item, end time, and forced item number by analyzing control information every time the second sub-area is read by the readout means;
item control means for controlling a change of state of each item according to a user's operation received by the reception means;
item display control means for instructing the reproduction means on the selection color and the activation color of the item on the menu image; and
execution means for executing the command of the item placed into the activated state, and the second control means comprising:
detection means for detecting when the user's operation received by the reception means is a designation of a temporary reproduction of another object;
call means for storing the address information and designating the reproduction means to reproduce the other object when the reproduction designation is detected; and
resume means for resuming reproduction of the still image object based on the stored address information after the reproduction of the other object is completed.

8. A reproduction system for reproducing interactive images comprising:

a recording medium having a data region for storing data, including a plurality of video objects, each video object having a plurality of data units, which include moving picture data, sub-picture data and control data to be effective within a time period in which the corresponding moving picture data is reproducible, the sub-picture data including a menu image;

the control data including address information, which shows a storage position of an initial data unit out of the plurality of data units, necessary to provide the menu image, when the menu image is displayed and a branching operation is performed from the menu image, the address information is different than a branch address from where the branch operation is initiated; and a reproduction apparatus comprising:

a reading member for reading the data from the recording medium;

a memory for storing the read data;

a reproduction member for reproducing the moving picture data and sub-picture data read by the reading member and outputting the moving picture data and sub-picture data as a video signal for display;

a receiving member for receiving a user's input in response to the menu image; and a control member comprising:

a detection member for detecting when a branch operation, from a present display of the menu image, to a temporary reproduction of another object is received;

a call member for storing the address information to provide the menu image and designating the reproduction member to reproduce the other object when the branch operation is detected; and a resume member for resuming reproduction of the menu image based on the stored address information after the reproduction of the other object is completed.

* * * * *

UNITED STATES PATENT AND TRADEMARK OFFICE
CERTIFICATE OF CORRECTION

PATENT NO. : 6,285,823 B1
DATED : September 4, 2001
INVENTOR(S) : Kazuhiro Tsuga It is certified that error appears in the above-identified patent and that said Letters Patent is hereby corrected as shown below:

Title page,
Item [75], delete "Shinichi Saeki", "Kazuhiko Yamauchi", "Masayuki Kozuka", and "Kaoru Murase" as inventors.
Item [12], delete "Saeki et al" should read -- Tsuga --
ABSTRACT
Line 10, delete ",".

Column 9,
Line 55, after "illustrated" insert -- ) --;
Line 67, delete "$\theta$" and insert -- $\lambda$ --;

Column 12,
Line 40, delete "100XXX" and insert -- 1000XXX --;

Column 23,
Line 51, delete "sub-pictures" and insert -- sub-picture --;

Column 24,
Line 22, delete "926" and insert -- 936 --;

Column 26,
Line 9, delete "3-Nothing" and insert -- 3-Do Nothing --; and
Line 55, after "right arrow key" insert -- , --.

Column 32,
Line 43, delete "an" and insert -- and --;
Line 56, after "data" insert -- stream --; and

UNITED STATES PATENT AND TRADEMARK OFFICE
CERTIFICATE OF CORRECTION

PATENT NO. : 6,285,823 B1
DATED : September 4, 2001
INVENTOR(S) : Kazuhiro Tsuga It is certified that error appears in the above-identified patent and that said Letters Patent is hereby corrected as shown below:

<u>Column 33,</u>
Line 19, delete the first occurrence of "object" and insert -- objects --.

Signed and Sealed this

Twenty-fifth Day of June, 2002

*Attest:*

*Attesting Officer*

JAMES E. ROGAN
*Director of the United States Patent and Trademark Office*